US007109967B2

(12) United States Patent
Hioki et al.

(10) Patent No.: US 7,109,967 B2
(45) Date of Patent: Sep. 19, 2006

(54) DISPLAY INPUT DEVICE AND DISPLAY INPUT SYSTEM

(75) Inventors: Tsuyoshi Hioki, Kanagawa-ken (JP); Masahiko Akiyama, Tokyo (JP); Kenichi Kameyama, Kanagawa-ken (JP); Kazuki Taira, Tokyo (JP); Isao Mihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 393 days.

(21) Appl. No.: 10/401,584

(22) Filed: Mar. 31, 2003

(65) Prior Publication Data

US 2003/0227441 A1 Dec. 11, 2003

(30) Foreign Application Priority Data

Mar. 29, 2002 (JP) ............................. 2002-093812
May 17, 2002 (JP) ............................. 2002-143181

(51) Int. Cl.
*G09G 3/36* (2006.01)
*G09G 5/00* (2006.01)

(52) U.S. Cl. ...................................... 345/104; 345/173
(58) Field of Classification Search .. 178/18.01–20.04; 345/156–184, 104, 901
See application file for complete search history.

(56) References Cited

U.S. PATENT DOCUMENTS 4,947,156 A * 8/1990 Sato et al. .................. 345/178
5,510,813 A * 4/1996 Makinwa et al. ........... 345/173
6,587,097 B1 * 7/2003 Aufderheide et al. ....... 345/173
6,744,420 B1 * 6/2004 Mohri ......................... 345/157
6,806,867 B1 * 10/2004 Arruda et al. ............... 345/173
2001/0013861 A1 * 8/2001 Shimizu ...................... 345/173
2002/0063695 A1 * 5/2002 Canova, Jr. ................. 345/173
2002/0140674 A1 * 10/2002 Okuno et al. ............... 345/158
2002/0190961 A1 * 12/2002 Chen .......................... 345/173
2003/0098857 A1 * 5/2003 Gettemy et al. ............ 345/173

OTHER PUBLICATIONS

T. Hioki, et al., IDW '02 Proceedings, pp. 319-322, "A Flexible 8.4-In. Color Low-Temperature Poly-Si TFT-LCD", Dec. 4, 2002.
U.S. Appl. No. 10/787,462, filed Feb. 27, 2004, Akiyama et al.
U.S. Appl. No. 10/388,615, filed Mar. 17, 2003, Akiyama et al.

* cited by examiner

*Primary Examiner*—Richard Hjerpe
*Assistant Examiner*—M. Fatahiyar
(74) *Attorney, Agent, or Firm*—Oblon, Spivak, McClelland, Maier & Neustadt, P.C.

(57) ABSTRACT

A display input device comprises a display unit having a flexibility; and a first form change detection unit having a flexibility. The first form change detection unit is able to detect a deformation ascribed to the flexibility as a change in a electrical property. A display input system further comprises a display driving unit that supplies a display signal to the display unit and a signal judging unit that judges a input data based on the change in a electrical property in the first form change detection unit. The input of a first data can be performed by adding the deformation to the display input device.

20 Claims, 41 Drawing Sheets

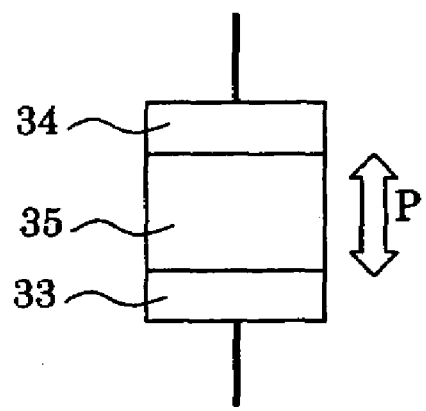 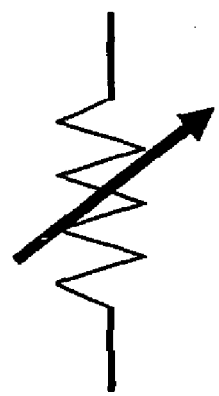
FIG.7A  FIG.7B
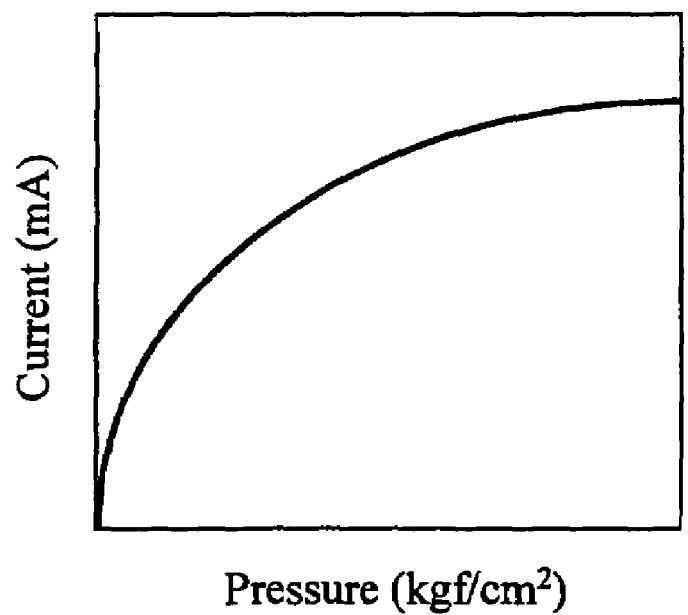
FIG.8

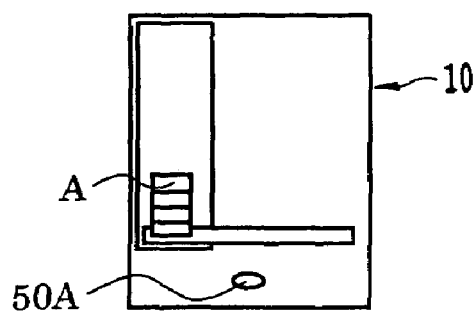
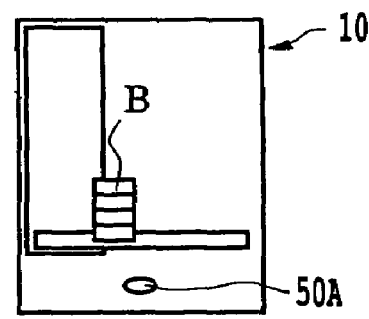
FIG.57A          FIG.57B
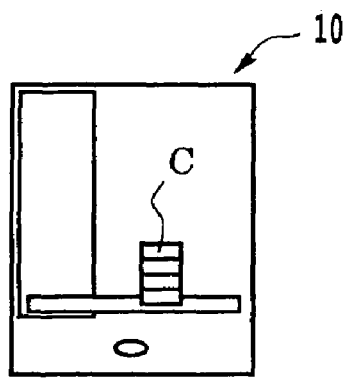
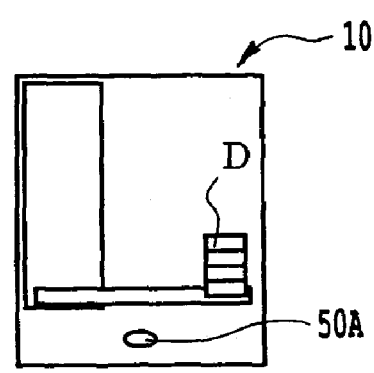
FIG.57C          FIG.57D
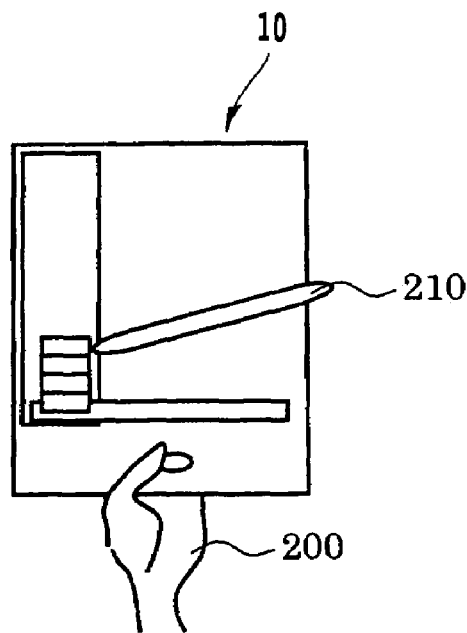
FIG.58

FIG.64A Top View
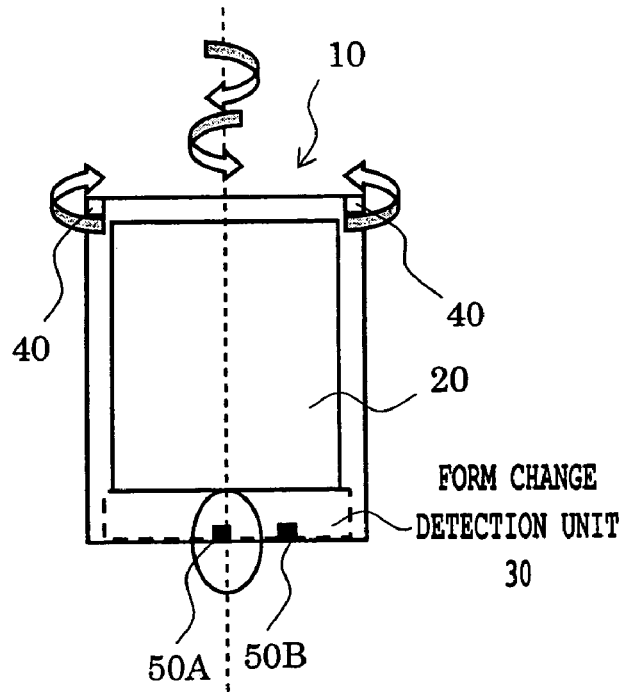
FIG.64B Side View
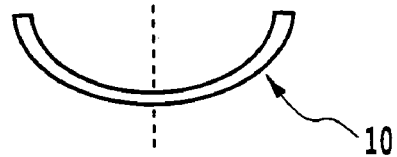
FIG.65
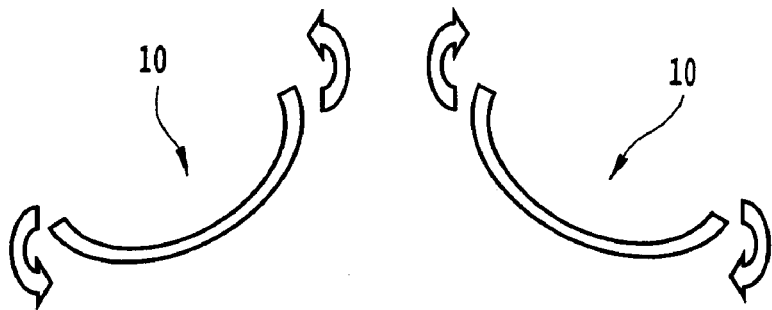

FIG.66A Top View
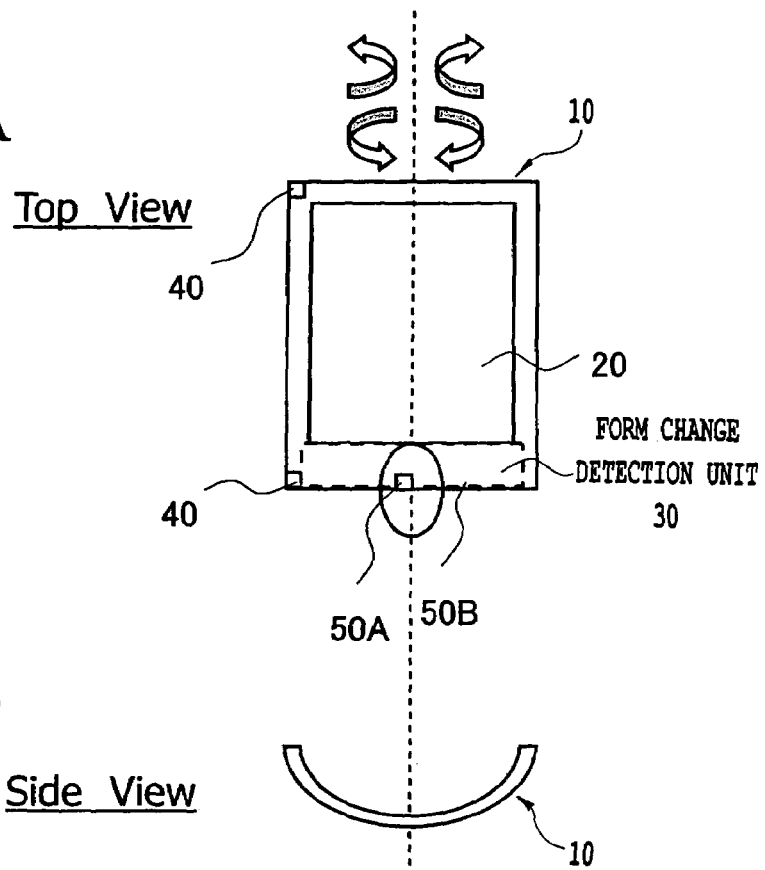
FIG.66B Side View
FIG.67
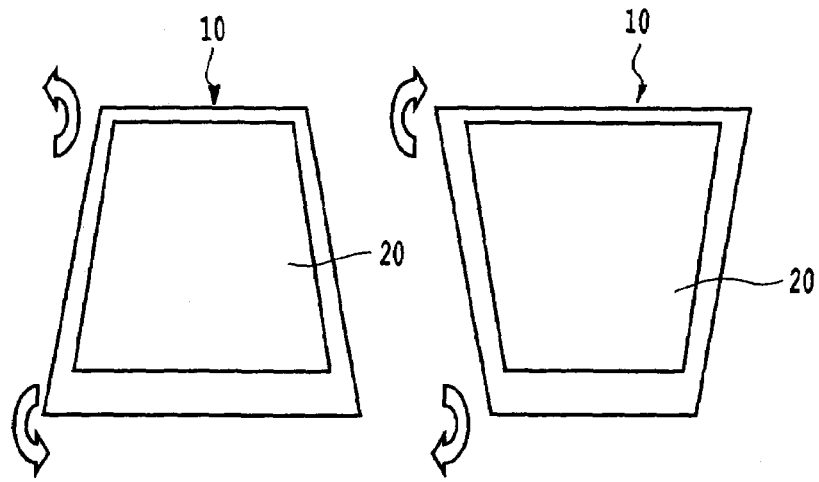

DISPLAY INPUT DEVICE AND DISPLAY INPUT SYSTEM

CROSS-REFERENCE TO RELATED APPLICATIONS

This application is based upon and claims the benefit of priority from the prior Japanese Patent Application No 2002-093812, filed on Mar. 29, 2002, and the prior Japanese Patent Application No. 2002-143181, filed on May 17, 2002; the entire contents of which are incorporated herein by reference.

BACKGROUND OF THE INVENTION

This invention relates to a display input device and a display input system, and more particularly, to a display input device with which data input of not only digital information but also analog information or vector information become possible by combining a display unit which has a pliability to form change and an input part which can detect the form change, and to the data input system comprising the data input device.

As an input device which can be combined with a display, a "touch panel" can be mentioned, for example. Such a device has a matrix-like signal input mechanism on a display screen, for example, and enables a signal input by detecting the existence and its coordinate position of a signal input. That is, a user contacts an input part corresponding to a button displayed on the display. Corresponding to this, the device can detect the existence of an input and the position information.

By such an input method, although a coordinate position is detectable, the signal is substantially restricted to binary signals of ON/OFF. This is because it is not easy for the user to control the thrust precisely when contacting the input part. For this reason, in order to input multi-value information or analog information, it is necessary to combine techniques, such as a numerical selection type input and a ten-key input, separately, for example, to obtain an amount of signals corresponding to that button display position.

That is, in order to carry out a multi-value input or an analog value input, in view of a position by the side of a user, it is necessary to perform selection of an input item, and an input of an analog value separately. On the other hand, research and development of a display called electronic paper which combines the features of paper and an electronic display are performed in recent years (for example, JP2002-072257A etc.). Although electronic paper does not attain to commercial production yet, a device of an experimental production level is seen.

However, when it is apparatus for which portability is needed especially, it is desirable that various information can be inputted by the easiest possible operation from a viewpoint of the use form. As such a portable device, an "electronic book" to which development is advanced can be mentioned, for example. In reproducing contents, such as a novel, a magazine and a newspaper, using the electronic book, it becomes main operation to turn over pages or to scroll the display screen. It is also possible to use the touch-sensitive input method like the conventional example for this operation. However, in the case of contents like a magazine or a newspaper, the contents are various and discrete. For this reason, random access which jumps over several pages or tens pages will be needed, and a function to input multi-values or an analog value like the number of pages or the amount of scroll is needed. However, operationality and portability are restricted when the conventional ten-key input or a numerical selection type input is used.

On the other hand, when displaying information on a large area like map information, only the part is displayed on a screen from restrictions of area of a display, or the degree of minuteness in many cases. In such a case, in order to search a position which a user wishes to obtain, a scroll function etc. is used. In the case of apparatus having input devices, such as a mouse and a pointing device, the analog input of the scroll direction and the amount of movements can be carried out. However, since a touch panel is mainly adopted as an input device in the case of apparatus excellent in portability, it is necessary to input separately the scroll direction and its amount of movements of a screen.

Thus, there is no simple method of inputting the amount of signals as an analog value with a device which combines a conventional display and a conventional input device. For this reason, for example, in switching a display over tens pages, both hands will surely be needed in the case of an input, or many operations will be required of the user side, and a burden by the side of a user increases.

SUMMARY OF THE INVENTION

According to an embodiment of the invention, there is provided a display input device comprising: a display unit having a flexibility; and a first form change detection unit having a flexibility, and being able to detect a deformation ascribed to the flexibility as a change in a electrical property.

According to other embodiment of the invention, there is provided a display input system comprising: a display input device including: a display unit having a flexibility; and a first form change detection unit having a flexibility, and being able to detect a deformation ascribed to the flexibility as a change in an electrical property; a display driving unit that supplies a display signal to the display unit; and a signal judging unit that judges a input data based on the change in the electrical property in the first form change detection unit, a input of a first data being performed by adding the deformation to the display input device.

According to other embodiment of the invention, there is provided a display input system comprising: a display input device including: a display unit having a flexibility; and a first form change detection unit having a flexibility, and being able to detect a deformation ascribed to the flexibility as a change in a electrical property; a display driving unit that supplies a display signal to the display unit; and a signal judging unit that judges a input data based on the change in a electrical property in the first form change detection unit, wherein the change in the electrical property corresponds to an amount of the deformation, the electrical property changes continuously in accordance with the amount of the deformation, and the signal judging unit converts the change in the electrical property into a numerical data.

According to other embodiment of the invention, there is provided a display input system comprising: a display input device including: a display unit having a flexibility; a first form change detection unit having a flexibility, and being able to detect a deformation ascribed to the flexibility as a change in a electrical property; and a second form change detection unit laminated with the form change detection unit, the second form change detection unit having a flexibility, and being able to detect a de formation ascribed to the flexibility as a change in a electrical property, a display driving unit that supplies a display signal to the display unit; and a signal judging unit that judges a input data based on the change in a electrical property in the first form change detection unit, wherein the changes in the electrical property of the first and second form change detecting units being different when the deformation is added to the display device, and an input of a first data that depends on a direction of the deformation is enabled.

In the specification the term "deformation" includes form changes of at least "bending", "rounding", "turning over" and "torsion".

According to the invention, based on the completely different concept from the prior art, the display input device with which analog data input by easy and intuitive operation can be offered, and various display input system comprising the same can be also offered, and thus the merit on industry is great.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings;

FIGS. 7A and 7B are schematic diagrams explaining a function of the perception layer 35 made of a resistance material;

FIG. 8 is graph which illustrates the response characteristic of a cell shown in FIGS. 7A and 7B;

FIGS. 56A through 58 are conceptual diagrams showing the operating procedure;

FIGS. 64A and 64B are schematic diagrams showing the display input system concerning the example;

FIG. 65 shows that while pushing the first data input part 50A and adding the bending, the user inclines the whole device;

FIGS. 66A and 66B are schematic diagrams showing the display input system concerning the example; and FIG. 67 shows that page turning over of the up-and-down direction can be performed by making equipment 10 incline forward and backward.

DETAILED DESCRIPTION

Figure 1:
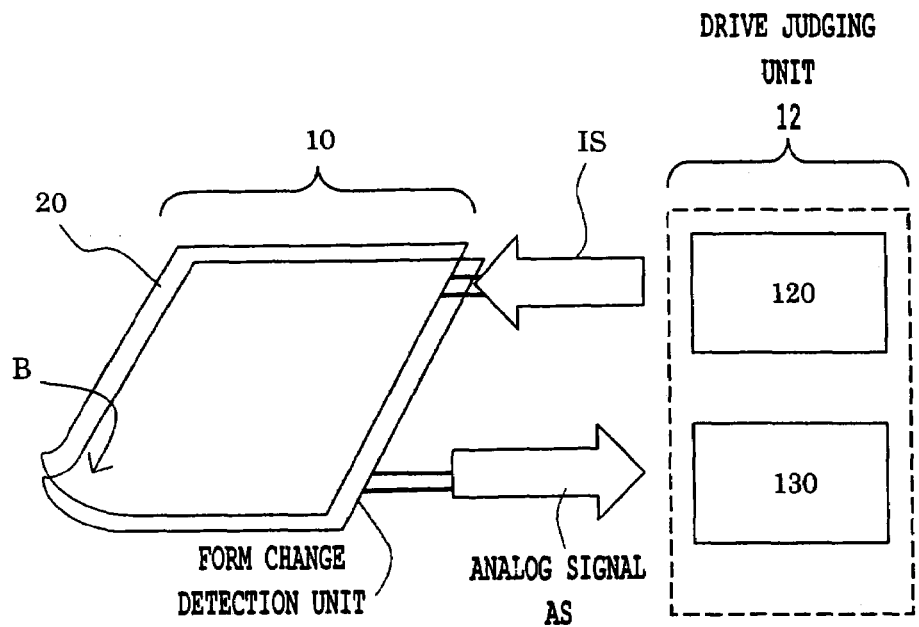
FIG. 1 is a conceptual diagram showing the display input system according of the embodiment of the invention.

Hereafter, some embodiments of the invention will be explained in detail referring to the drawings.

FIG. 1 is a conceptual diagram showing the display input system according of the embodiment of the invention. That is, the display input system of this embodiment has the display input device 10 and the drive judging unit 12.

The display input device 10 has the structure where the display unit 20 and the form change input part 30 are laminated. It is possible to use various kinds of methods such as a liquid crystal, EL (elctroluminescence) and ECD (electrochromic device), for example, as the displaying method of the display unit 20.

On the other hand, the form change detection unit 30 has a structure where a perception layer whose resistance changes with the stress impressed is interposed between a pair of electrode layers, for example. If a deformation is added to a display input device 10 which has pliability, the form change detection unit 30 can detect such deformation as change of the electric characteristic. As such a form change, "bending", "rounding", "turning over", "torsion", etc. can be mentioned, for example. In the specification, these form changes will be simply called "bending".

The display unit 20 and a form change detection unit 30 may share some of their parts, as will be explained in full detail later. Alternatively, the form change detection unit 30 may be incorporated into the display unit 20. Or, the display unit 20 may be incorporated into the form change detection unit 30. On the other hand, as for the display unit 20 and the form change detection unit 30, those whole parts do not need to be laminated completely.

The form change detection unit 30 may be laminated only on a part of display unit 20, as will be explained later with reference to FIG. 14, for example. Alternatively, the display unit 20 and the form change detection unit 30 may not be laminated, but they may be arranged adjacently, as will be explained later with reference to FIG. 51, for example.

The drive judging unit 12 has the display drive unit 120 and fi the signal judging unit 130. The display drive unit 120 has the role to output a display signal IS to the display unit 20, and a predetermined picture is displayed on the display unit 20. On the other hand, the signal judging unit 130 judges the inputted information based on the signal received from the form change detection unit 30. These display drive unit 120 and a signal judging unit 130 may be integrated in the display input devices 10, or they may be provided in the exterior of the display input device 10 as the separate elements.

The display unit 20 and the form change detection unit 30 have a flexibility in "bending". In the embodiment, a stress is impressed to the display input device 10 and a deformation such as "bending" B is created in order to input a predetermined data. Then, the form change detection unit 30 detects the "bending" B and the signal about the direction and amount of stress is outputted. That is, an analog output AS corresponding to the quantity of the "bending" is given.

A signal judging unit 130 judges the inputted data. The signal judging unit 130 may also change this analog signal AS to a signal, such as a voltage signal, suitable for an output to external apparatus.

The place where bending B is added may be an image displaying area of the display units 20 (not shown), or may be domains other than an image displaying area. If the detection of bending B is enabled in an image display area, various forms of data input in conjunction with an image display and a position of data input will become possible, as will be explained in more detail later.

A place where bending B is added may be near the center of a display input device. Alternatively, a bending which covers the whole display input device 10 and makes it in a shape of a concave or a convex may be added.

If a substrate which consists of organic material, such as a plastic film, is used as a support substrate of the display unit 20 and the form change detection unit 30, not only improvement in a weight saving or impact resistance, but also an excellent flexibility in "bending" can be obtained. That is, it becomes easy to create bending into the form change detection unit 30 by impressing stress from the outside. A user can hold the display input device 10 with one hand or both hands, and can arbitrarily adjust the position, the condition and the area to add the bending.

For example, it is as the following when a user holds a display input device 10 of the shape of a film of A4 size with the left hand. That is, the user can add the bending near the upper end on the left-hand side of the film, or he can add the bending near the lower end. Moreover, he can adjust the conditions such as the power to create the bending, curvature of the bending, speed and acceleration to create the bending. Thus, he can input a data in an analog fashion.

These information is detected by the electric signal transformation of the form change detection unit 30, and signal processing is carried out in a signal judging unit 130. As the result, information which the user inputted with the left hand is judged.

Figure 2A:
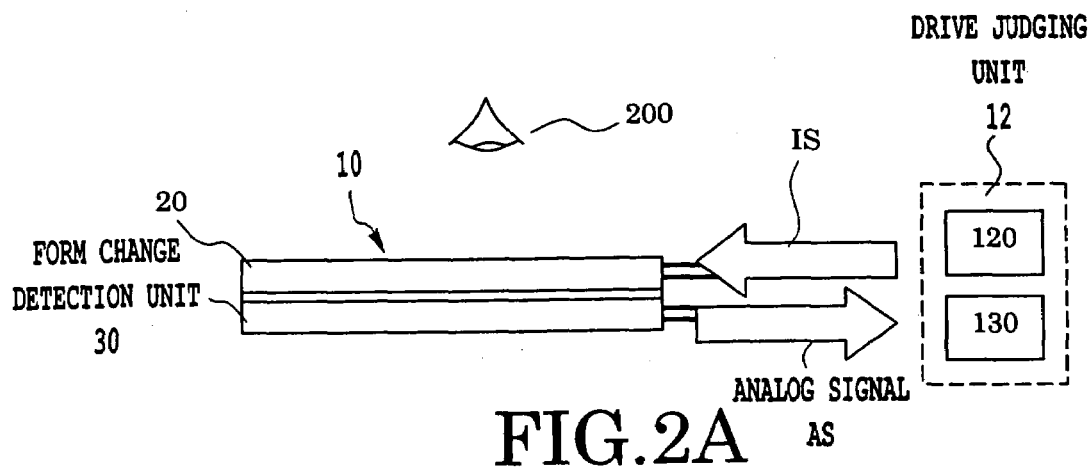
FIGS. 2A and 2B are schematic diagrams which illustrate the fundamental sectional structures of the display input devices of the embodiment.

FIGS. 2A and 23 are schematic diagrams which illustrate the fundamental sectional structures of the display input devices of the embodiment. As shown in FIG. 2A, the form change detection unit 30 can be made to laminate to the back side of the display unit 20.

When reflective-liquid-crystal mode is adopted for the display unit 20, it becomes unnecessary for a form change detection unit 30 to have optical transparency. Therefore, the form change detection unit 30 can be formed by opaque materials.

Figure 2B:
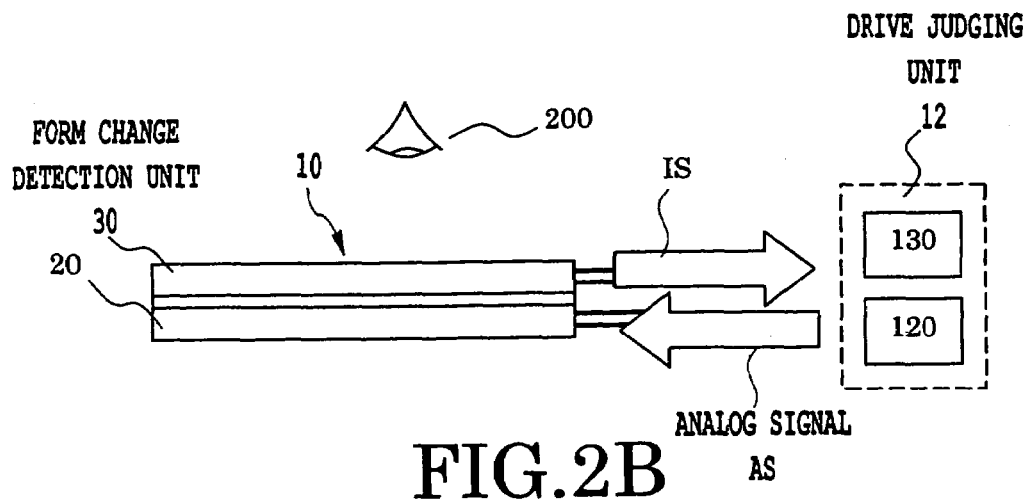

On the other hand, as shown in FIG. 2B, the form change detection unit 30 may be laminated on the front side of the display unit 20. In this case, it is needed for the form change detection unit 30 to have predetermined transparency so that the display of the display unit 20 may not be interrupted.

Figure 3:
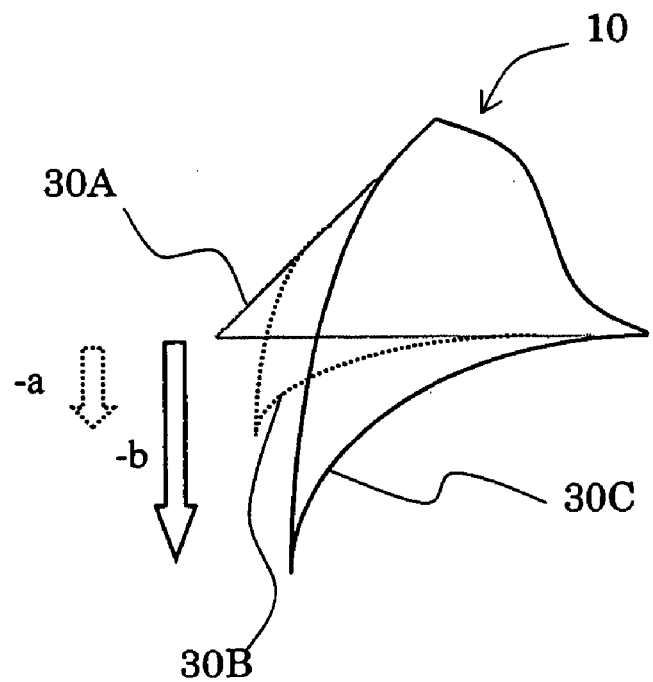
FIG. 3 is a schematic diagram showing the principle for inputting data in an analog fashion in the embodiment.

FIG. 3 is a schematic diagram showing the principle for inputting data in an analog fashion in the embodiment. That is, this figure is a perspective diagram showing a corner of the display input device of the embodiment.

When bending is not added, the display input device (form change detection unit 30) shall be substantially in a flat state 30A, Then, a certain stress is added in a downward direction as shown by the arrow −a, a predetermined quantity of bending is added to form the state 30B. On the other hand, if a larger stress is added in a downward direction as shown by the arrow −b, a larger bending is added to form the state 30C. In the embodiment, analog-information can be input by using the deformation quantity of the bending, the area of the bending, of those products, for example.

On the other hand in the invention, analog input can also be possible according to the speed or acceleration of the bending, apart from the deformation quantity of the bending.

Figure 4:
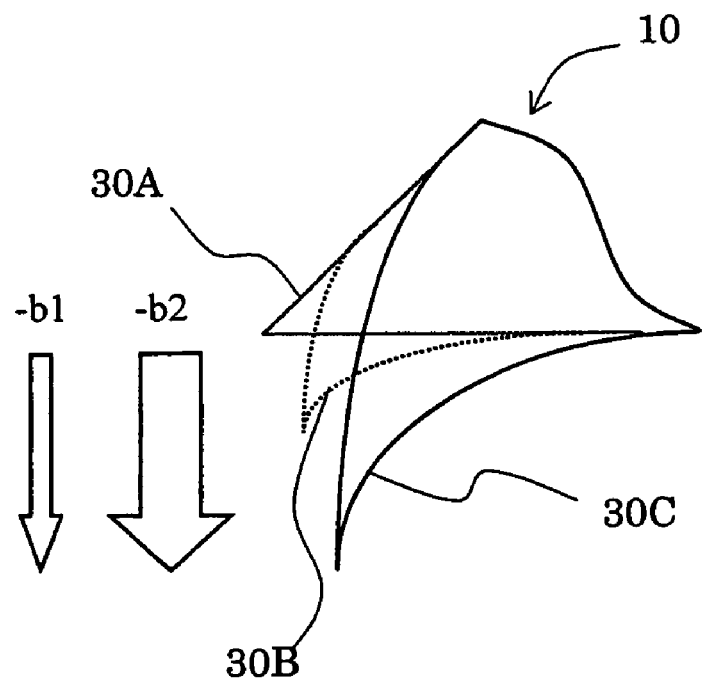
FIG. 4 is a schematic diagram showing the case where the bending is added to the initial state 30A to create the final state 30C.

FIG. 4 is a schematic diagram showing the case where the bending is added to the initial state 30A to create the final state 30C. In this case, according to speed with which the bending is added, the amount of inputs of information can be changed. For example, when the bending is added slowly (arrow—b1), the amount of inputs can be made smaller and, when bending is added fast (arrow—b2), the amount of inputs can be made larger. Here, speed or acceleration of the bending can be determined by measuring the time dependence of the amount of the deformation.

Figure 5:
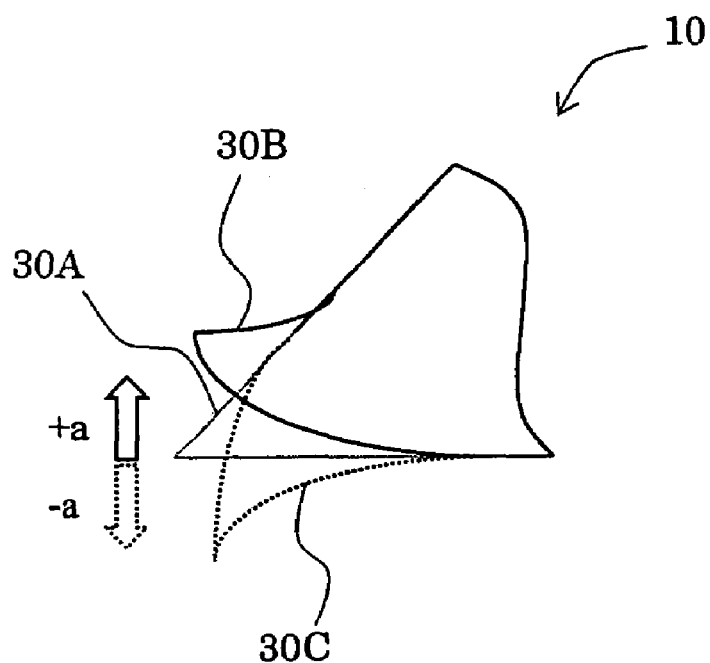
FIG. 5 is a schematic diagram showing a principle for distinguishing an input by the direction of the bending in the embodiment.

FIG. 5 is a schematic diagram showing a principle for distinguishing an input by the direction of the bending in the embodiment. That is, this figure is also a perspective diagram showing the corner of the display input device of the embodiment.

As illustrated in this figure, when adding the bending to the corner of the display input device 10 from the flat state (30A), the user can bend in the direction of arrow +a, i.e. the upward direction (30B), and can bend in a direction of arrow −a, i.e. the downward direction (30C). And in these status, according to the direction of the bending, the sign of the input data can be distinguished. Alternatively, the range of the input data can be extended, or the kinds of the data can be increased according to the direction of the bending.

For example, when bent in the direction of arrow +a, the input data may be determined to be plus, and when bent in the direction of arrow −a, the input data may be determined to be minus. In both cases, the absolute value of the input data can be determined according to the deformation quantity of the bending.

Alternatively, a range of the data which the user can arbitrarily select may correspond to the range between the state 30B and the state 30C.

Alternatively, when a user bends in the direction of arrow +a, a first data range may be chosen, and when the user bends in the direction of arrow −a, a second data range different from the first data range may be chosen.

In order to identify the direction of the bending, two sheets of the form detection parts 30 can be laminated, as will be explained in more detail later.

In a case where two or more form change detection units 30 are laminated and bending is added, the curvature, the stress, and the displacement may differ between each of the form change detection units 30. Therefore, the direction of the bending can be determined by detecting a difference of these parameters between upper and lower form change detection units 30.

Figure 6:
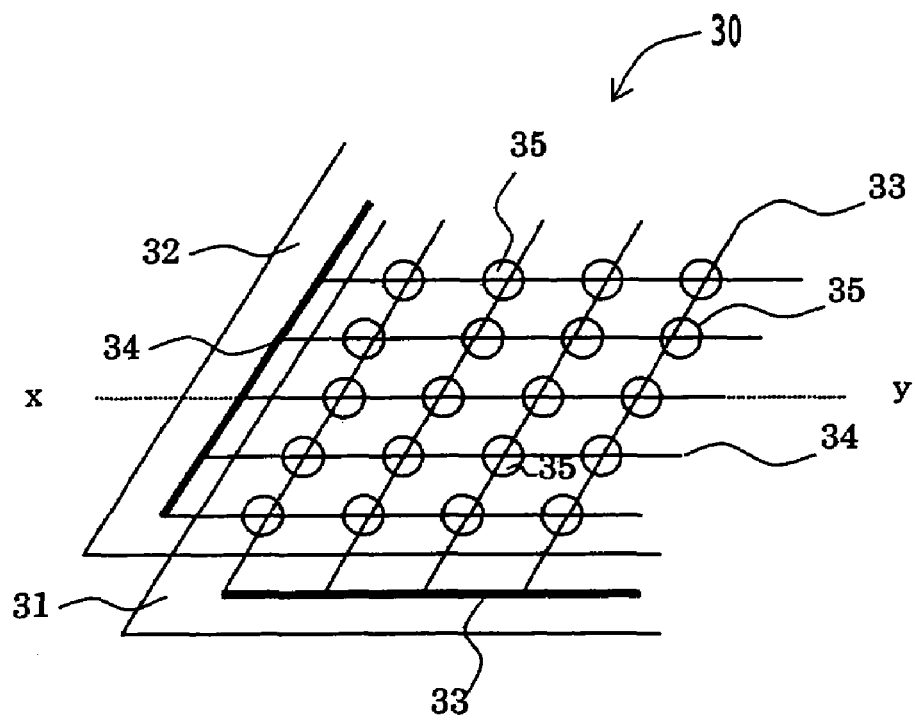
FIG. 6 is a conceptual diagram which illustrates the structure of the form change detection unit 30.

FIG. 6 is a conceptual diagram which illustrates the structure of the form change detection unit 30. That is, the electrode patterns 33 and 34 are formed in the inner surface of a pair of substrates 31 and 32 which have flexibility, respectively. And the perception layer 35 is provided between these electrode patterns. The perception layer 35 is a layer which has the character that an electric property changes by at least one of stress and displacement. Using this character, stress or displacement impressed in each area divided in the form of a matrix with upper and lower electrode patterns 33 and 34 can be detected.

As the substrates 31 and 32, plates or films which consist of resin which has flexibility can be used. As electrode patterns 33 and 34, metal or a conductive material is suitably formed by methods, such as printing, plating, sputtering, and vacuum deposition, and then it is suitably puttered.

As a perception layer 35, an organic material of resistance, the charge of non-equipments, a semiconducting material, etc. can be chosen suitably, and can be used, for example. Or a piezoelectric material and a dielectric material may be used. As a material of resistance, polyvinylidene-fluoride (PVDF) or fluid-like polyvinyl alcohol may be used. Alternatively, the pair of electrode patterns can be hold with a predetermined distance therebetween without filling the space.

The perception layer 35 does not need to be provided for every division area of the matrix. Instead, the perception layer 35 may be continuously formed between the substrates 31 and 32 without dividing. For example, when forming the perception layer 35 with a resistance film, generally compared with a lengthwise direction (the direction of thickness), resistance along a lateral direction (the direction parallel to the surface of a substrate 31) is far high. For this reason, leakage along the lateral direction can be neglected. Therefore, the perception layer 35 can be formed continuously between the substrates 31 and 32 without dividing.

FIGS. 7A and 7B are schematic diagrams explaining a function of the perception layer 35 made of a resistance material. That is, as illustrated in FIG. 7A, when the perception layer 35 of resistance is provided via the electrode which is not illustrated among substrates 31 and 32, this cell is electrically equivalent to the variable resistor as shown in FIG. 7B. And the amount of resistance changes depending on the stress (pressure) P impressed in the direction of thickness of the perception layer 35.

FIG. 8 is graph which illustrates the response characteristic of a cell shown in FIGS. 7A and 7B. That is, the horizontal axis of this figure expresses stress impressed in the direction of thickness of a perception layer 35, and the vertical axis expresses current which flows where constant voltage is impressed among electrodes 33 and 34, respectively. Thus, if compressive stress is impressed to a perception layer 35, current between electrodes will increase and resistance will decrease. By detecting such a resistance change, the quantity of the stress or the displacement can be detected. By investigating time differentiation of such resistance change, the speed or acceleration of the bending can be determined as mentioned with reference to FIG. 4.

In FIG. 8, although the case where current changes continuously depending on the quantity of stress or deformation is illustrated, the invention is not limited to this. For example, even if the quantity of the stress and displacement changes continuously, physical properties may change discretely. Such a discrete response may happen depending on the physical properties of the perception layer 35. In the specification, such a discrete response is also included in a term "analog".

Figure 9A:
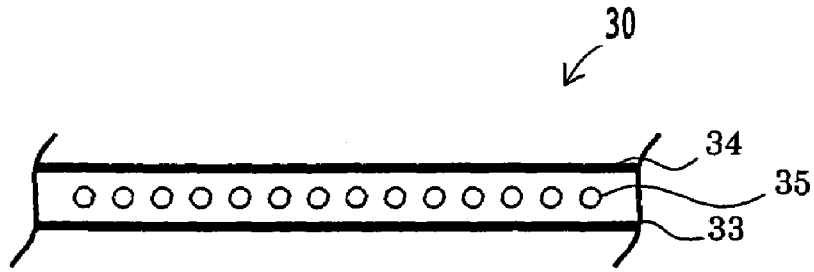
FIGS. 9A through 9C are conceptual diagrams explaining the states where bending is added to a form change detection unit 30.
Figure 9B:
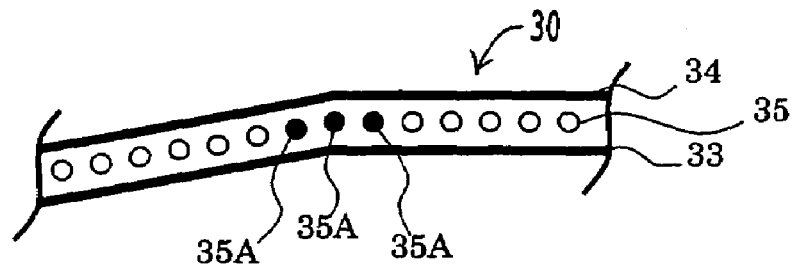
Figure 9C:
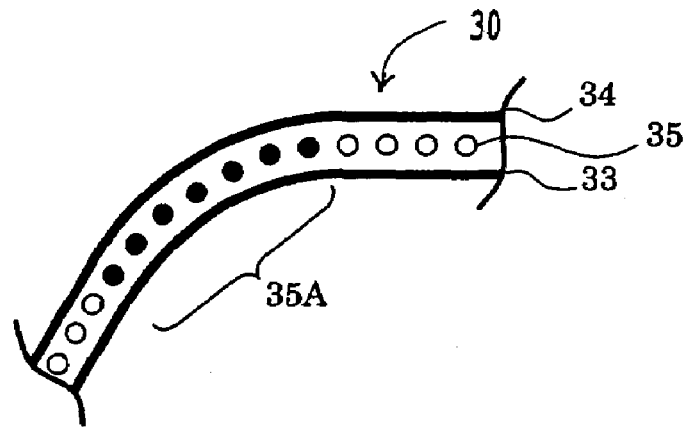

FIGS. 9A through 9C are conceptual diagrams explaining the states where bending is added to a form change detection unit 30. Namely, as shown in FIG. 9A, in a state with a flat form change detection unit 30, each of the divided parts of the perception layer 35 provided in the shape of a matrix is uniform.

On the other hand, if the bending is added as shown in FIG. 9B, stress will be added to the perception layer 35A of a deformation portion, and physical properties, such as resistance, changes locally. By detecting such a local change, the bending can be detected.

For example, in a portion to which the bending is added, when compression stress of the direction of thickness is added to perception layer 35A made of a resistance material, resistance between electrodes decreases as shown in FIG. 8. Since this amount of decrease has the correlation with the amount of the deformation, the part of the perception layer 35A with the largest amount of deformation shows reduction of strongest resistance among the perception layer 35A.

And as shown in FIG. 9C, when still larger bending is added, the deformed part expands and larger part of the perception layer 35A comes to show change in resistance. The amount of change which the deformed part of the perception layer 35A shows also becomes larger.

Thus, amount of the bending is quantitatively detectable with the number of the divided parts and/or amount of resistance change of the perception layer 35 at the deformed part. A speed or acceleration of the bending which was mentioned above with reference to FIG. 4 can also be obtained by investigating time differentiation of change of the physical-properties value of the perception layer 35.

In the invention, the perception layer 35 may give so-called "digital" response. That is, the amount of physical properties of the perception layer 35 may change discretely, if stress or displacement more than a certain level is given. As the response characteristic of the perception layer 35, binary reaction may be shown to one threshold, or multi-valued response may be shown according to the stress level.

Alternatively, in order not to detect a very small change at the time of operation as a signal, signals under a certain fixed amount may not be regarded as a signal input, and signals more than this limit may be outputted as an inputted analog signal.

When such a perception layer 35 is used, as shown in FIG. 9, according to the amount of the bending, the number of changing perception layers 35 differs. That is, a signal from a form change detection unit 30 which totaled the detected change turns into a signal which is not continuous but discrete, even when the amount of the bending is changed continuously.

In the specification, such a case is also included in the term of "analog" input.

Figure 10:
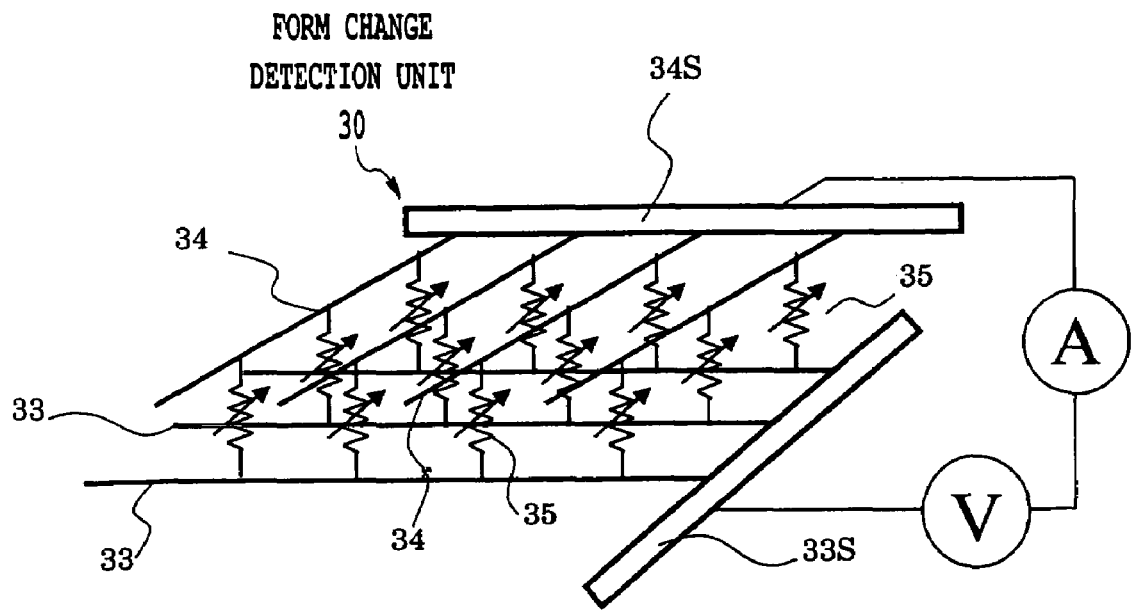
FIG. 10 is a schematic diagram which illustrates the circuit structure of the form change detection unit 30.

FIG. 10 is a schematic diagram which illustrates the circuit structure of the form change detection unit 30. Namely, in the case of this example, each of the electrodes 33 and 34 wired in the shape of an in-every-direction matrix can be switched by the scanning circuits 33S and 34S for every electrode line. That is, a scanning of the upper and lower electrode lines is enabled one by one. As a result, it becomes possible to detect the part to which the stress is impressed, and to detect the amount of change and change speed quantitatively.

Figure 11:
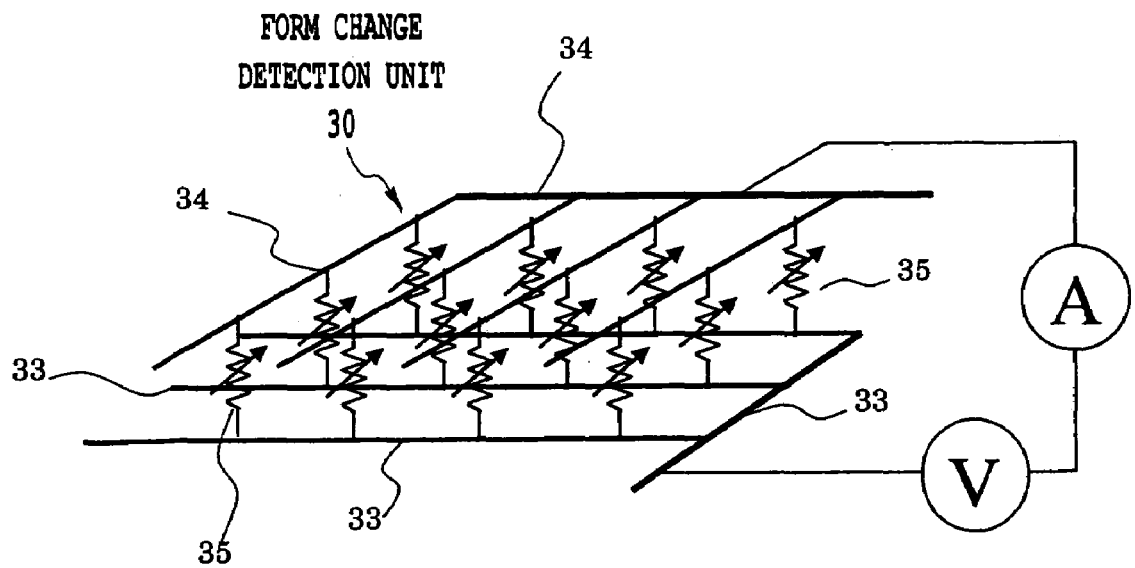
FIG. 11 is a schematic diagram which illustrates another circuit structure of the form change detection unit 30.

FIG. 11 is a schematic diagram which illustrates another circuit structure of the form change detection unit 30. That is, in the case of this example, common connection of each of electrodes 33 and 34 is made. And voltage is impressed between electrodes by source V of voltage, and current therethrough can be measured. Thus, when common connection of each of the electrodes 33 and 34 is made, it is difficult to detect the position of the bending added to a form change detection unit 30. However, it becomes easy to detect the quantity of the bending and the speed or acceleration thereof quantitatively. Since it is not necessary to provide the scanning circuits 33S and 34S which are shown in FIG. 10 to the circumference of electrodes 33 and 34, it becomes very easy to form the form change detection unit 30 on a substrate such as the form of a film.

Figure 12:
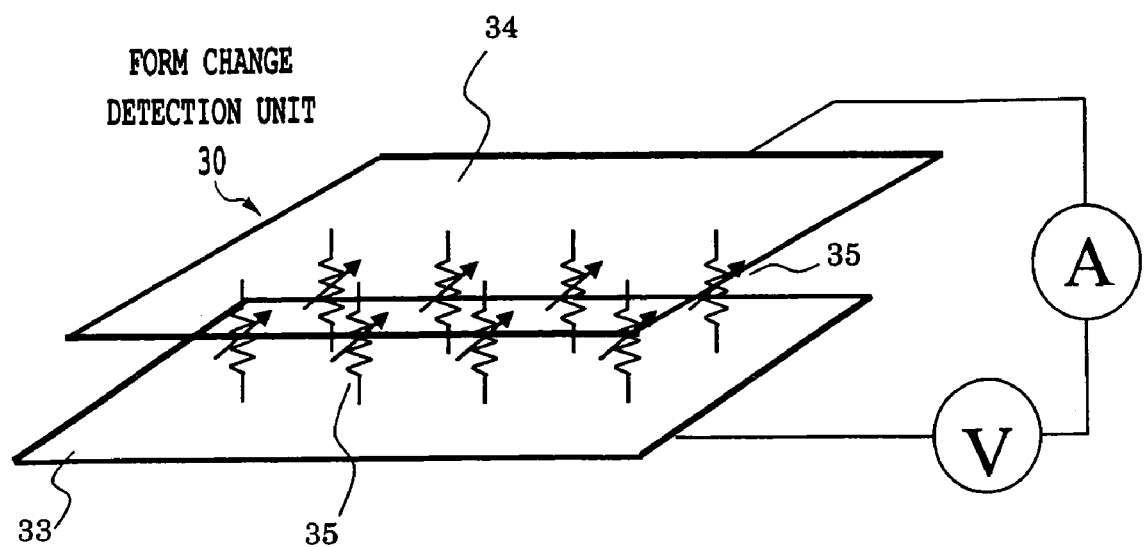
FIG. 12 is a schematic diagram showing another structure of the form change detection unit 30.

FIG. 12 is a schematic diagram showing another structure of the form change detection unit 30. In this example, the electrodes 33 and 34 which constitute a form change detection unit 30 are formed continuously on the whole surface of the substrates 33 and 34. That is, puttering of the electrodes 33 and 34 does not have to be carried out, and they may not necessarily be formed in the shape of a stripe etc. And a perception layer 35 may be continuously inserted among such whole surface electrodes 33 and 34.

That is, in a the invention, a form change detection unit 30 may need to detect only amount or change speed of the bending, and may not need to detect the position thereof. In such a case, so-called matrix structure is not necessarily employed in the form change detection unit 30.

Figure 13:
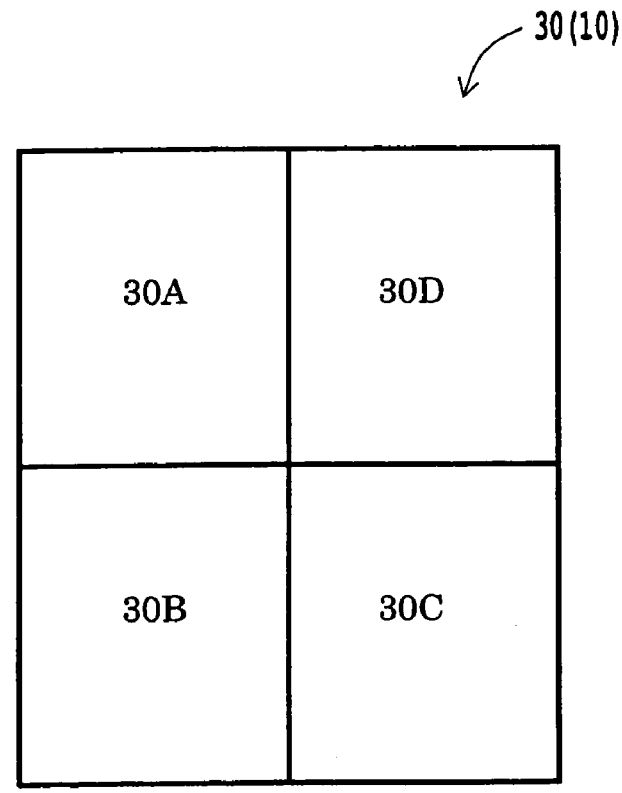
FIG. 13 is a schematic diagram which shows a structure where the form change detection unit 30 is divided.

FIG. 13 is a schematic diagram which shows a structure where the form change detection unit 30 is divided. That is, in the case of this example, the form change detection unit 30 consists of four divided parts 30A–30D. Each of these divided parts may have a structure where common connection of each of upper and lower electrodes 33 and 34 is made as illustrated in FIG. 11. Or each of these divided parts may have a structure where electrodes 33 and 34 and the perception layer 35 are not puttered as shown in FIG. 12.

When a form change detection unit of structure of FIG. 11 or 12 is adopted, it is difficult to pinpoint a position of the bending within each of the divided parts 30A–30D. However, since it is detectable to which divided part the bending is added, it may be practically enough in many cases.

For example, four kinds of selection information can be suitably displayed on a display unit 20 corresponding to the divided parts 30A–30D. And a user can add bending to any one of the upper right corner, the lower right corner, the upper left corner, the lower left corner of the display input device 10(20) according to the four kinds of selection information. Thus, any one of four kinds of data items can be chosen, and it becomes possible to input data in an analog fashion according to amount or changing speed of the bending. Further, it becomes possible to input data of a different item by adding the bending to two or more corners simultaneously.

When such a function is applied to scrolling, various kinds of games, etc. of a screen, very comfortable operationality is acquired. For example, a display area currently displayed on a display unit 20 can be scrolled in the arbitrary directions at arbitrary quantity or speed by adding the bending of a predetermined quantity or predetermined speed to at least any one of the divided parts 30A–30D. Or it becomes possible to input simply the move direction, the amount of movements, or movement speed of a character, such as a person, vehicles, and an airplane which are displayed on a screen.

FIG. 13 only shows one specific example of the invention. The arrangement, the shape and the number of the divided parts of the form change detection unit 30 can be suitably determined according to an application, the purpose, etc. For example, the number of divided parts is not limited to four, but can be divided into two or more arbitrary numbers.

Figure 14A:
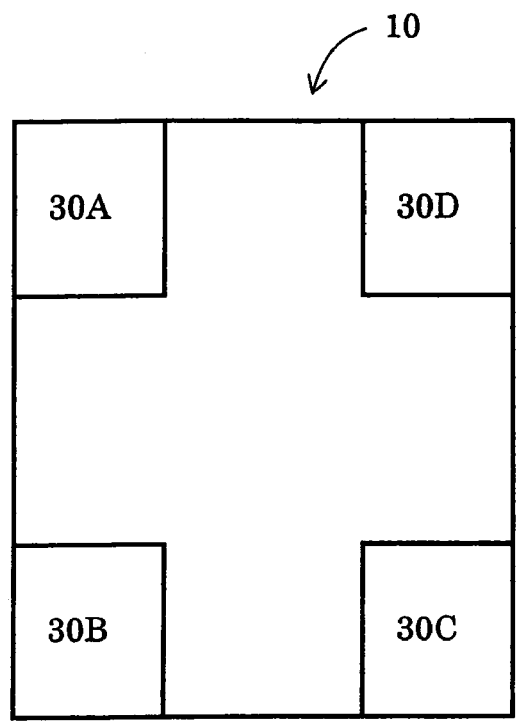
FIGS. 14A and 14B are also schematic diagrams showing the display input devices where the form change detection units 30 are divided.
Figure 14B:
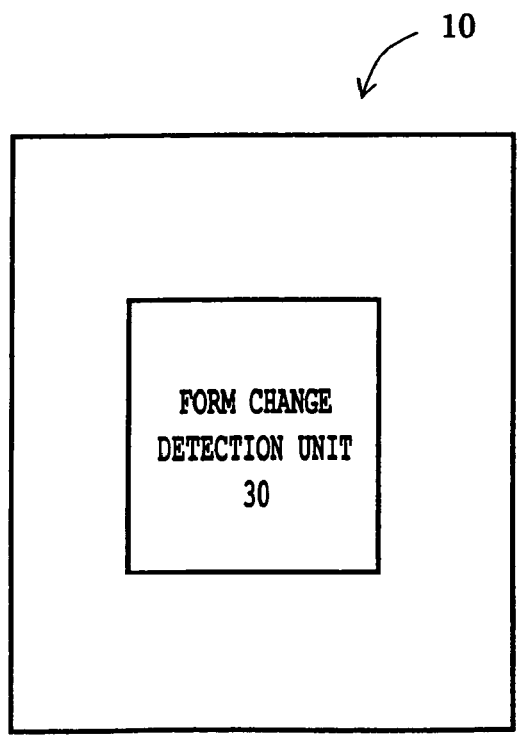

FIGS. 14A and 14B are also schematic diagrams showing the display input devices where the form change detection units 30 are divided. However, in the cases of these examples, the form change detection units 30 do not cover the whole surface of a device 10.

That is, in an example shown in FIG. 14A, four divided parts 30A–30D are provided only near the four corners of the display input device 10, and the form change detection unit 30 is not provided near the center. When the positions to which bending for data input is added can be limited to the corners of the device, form change detection units 30A–30D may be provided only near four corners in this way.

When the form change detection unit 30 is provided only on a part of the display input device 10, the remaining part of the display input device 10 may not need to have flexibility. That is, only the portions in which form change detection units 30A–30D are provided must have flexibility over bending among display input devices 10, and remaining part may be made mechanically more rigid. For this purpose, a reinforcement object of the shape of a plate with high strength can be provided. Thus, bending can be added only to the form change detection unit at four corners while maintaining the center part of the screen in a flat state.

On the other hand, as illustrated in FIG. 14B, the form change detection unit 30 may be provided only near the center of the display input device 10. That is, when adding the bending only near the center of the device, the form change detection unit 30 may be restrictively provided near the center in this way. In this case, a user may give the bending only near the center locally, or the whole device may be deformed in a convex or a concave fashion.

Figure 15:
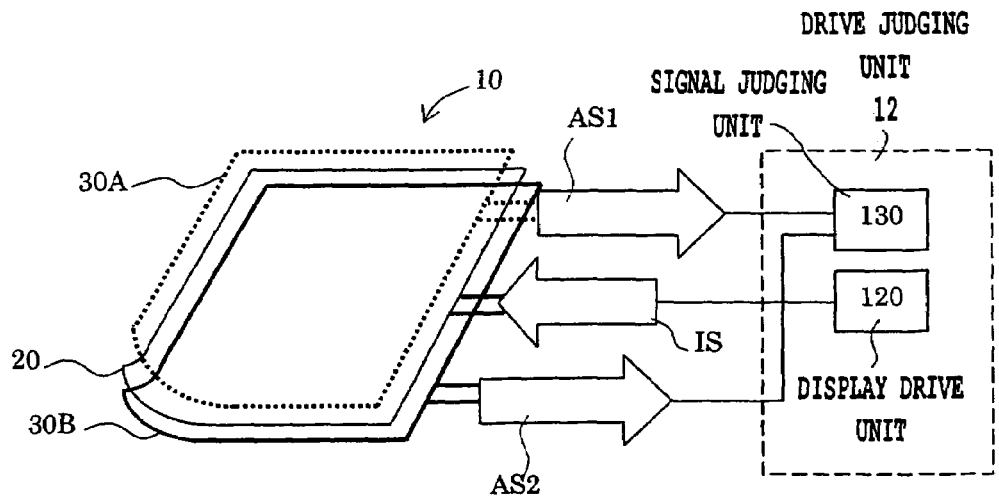
FIG. 15 is a schematic diagram which illustrates the display input device with which two or more form change detection units are laminated.

FIG. 15 is a schematic diagram which illustrates the display input device with which two or more form change detection units are laminated. That is, in the case of this example, the form change detection units 30A and 30B are laminated by the upper and lower sides of the display unit 20, respectively. Each of these form change detection units 30A and 30B may consist of two or more divided parts, as shown in FIGS. 13 through 14B.

Figure 16:
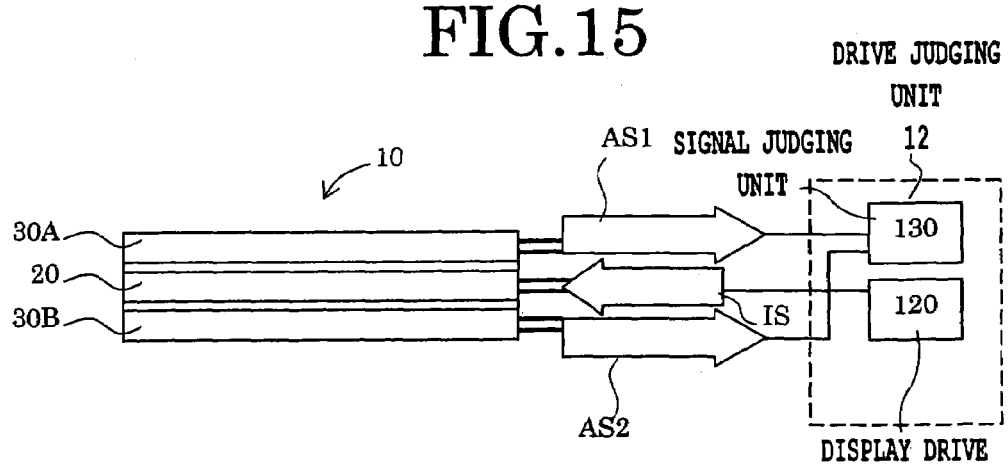
FIG. 16 shows the structure where the analog signal outputs AS1 and AS2 can be taken out from these form change detection units 30A and 30B, respectively.

As illustrated in FIG. 16, the analog signal outputs AS1 and AS2 can be taken out from these form change detection units 30A and 30B, respectively. Detection sensitivity to the bending of the display input device 10 can be made higher by adding these analog signal outputs AS1 and AS2, for example, and using them.

Figure 17:
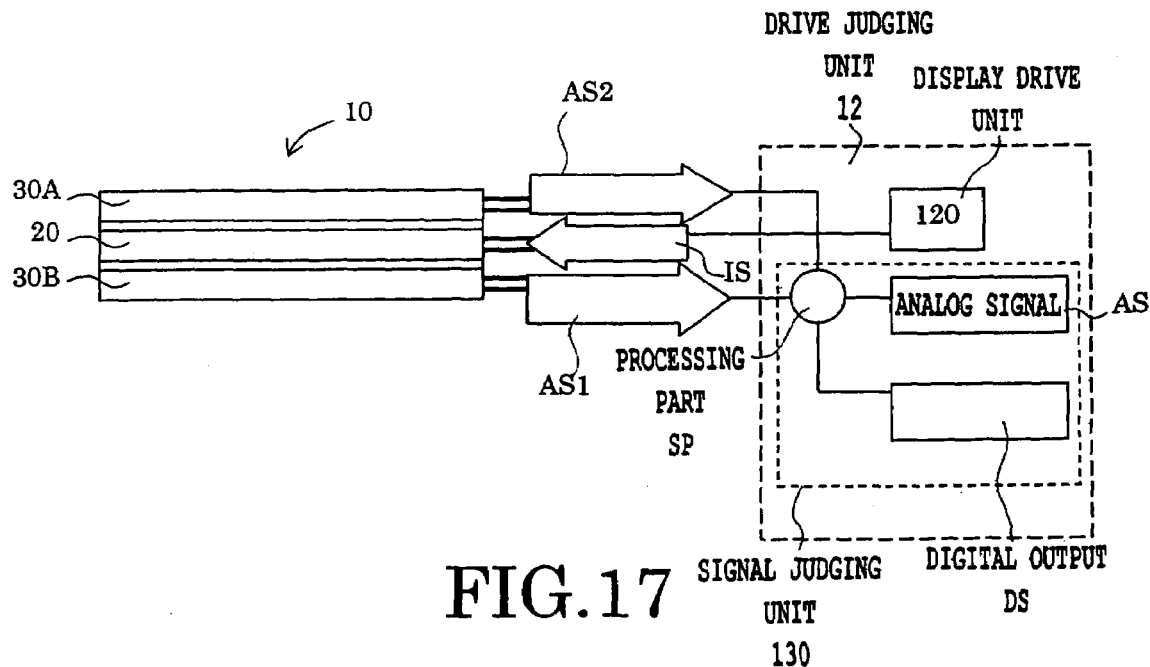
FIG. 17 shows the structure where signal processing of the analog signal outputs AS1 and AS2 in a processing part SP is carried out, and an analog output AS and a digital output DS are obtained.

As illustrated in FIG. 17, it is also possible to carry out signal processing of these analog signal outputs AS1 and AS2 in a processing part SP, and to obtain an analog output AS and a digital output DS. For example, as mentioned above with reference to FIG. 5, a difference in curvatures, displacements or stresses of upper and lower form change detection units 30A and 30B can be detected in order to determine the direction of the bending. That is, when the display input devices 10 is bent in a frontward or backward direction, curvature, displacement or stress may become larger in the inner side than in the outer side in many cases.

Therefore, it can be judged by measuring analog signal outputs AS1 and AS2 whether the bending is added to which direction. Information about this direction can be acquired as a digital output DS. For example, in a case where the bending is added frontward (upward), "1" may be output, and in a case where the bending is added backward (downward), "0" may be output. And the analog output may be determined according to the amount of the bending.

A digital output DS in this case may be used as data which expresses the sign, i.e. plus and minus, or specifies other choices. Such a data can be combined with the analog data AS.

Figure 18:
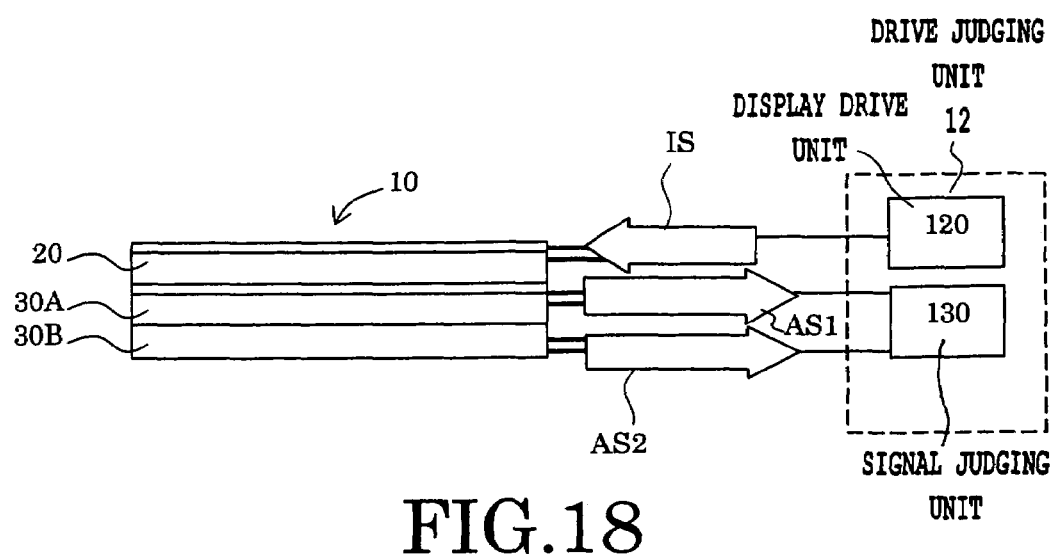
FIG. 18 is a schematic sectional diagram showing an example of a laminated type display input device.

FIG. 18 is a schematic sectional diagram showing an example of a laminated type display input device. That is, in the case of this example, two form change detection units 30A and 30B are laminated only at the surface side or the back side of the display unit 20. When these form change detection units 30A and 30B are provided in the back side, an advantage of not barring a display of a display unit 20 even if the opaque material is used for the parts 30A and 30B is acquired.

Figure 19:
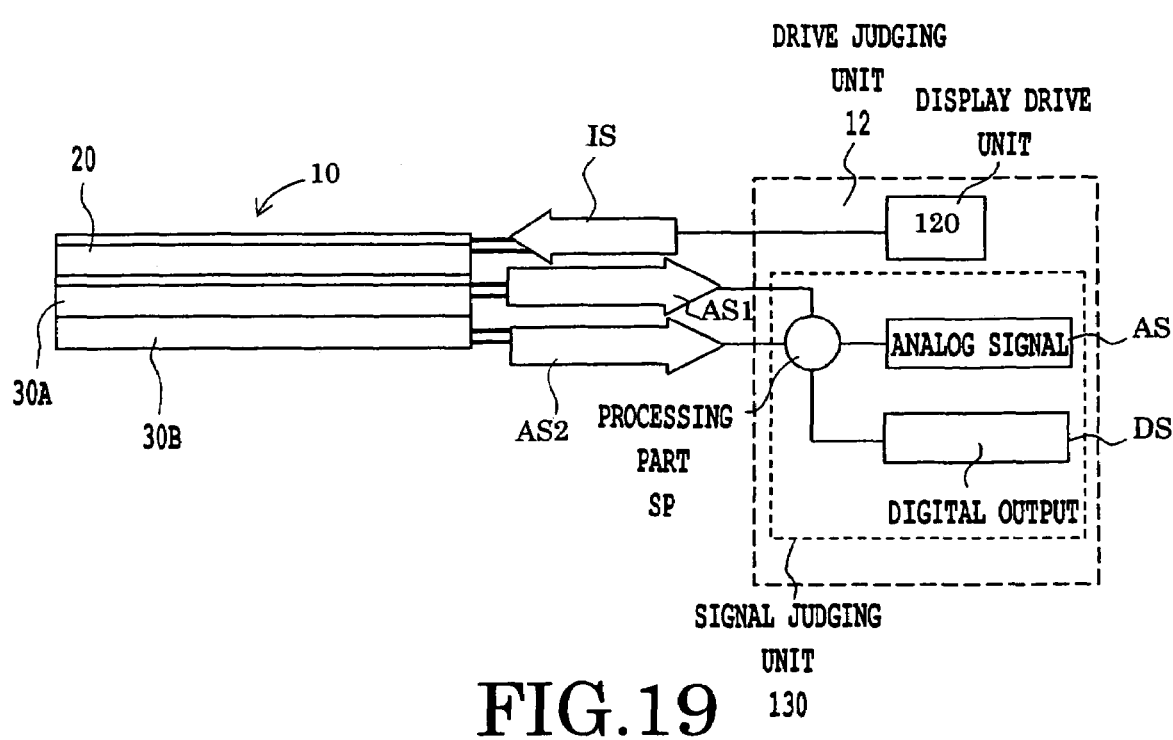
FIG. 19 shows the structure where analog signal outputs AS1 and AS2 obtained from each of form change detection units 30A and 30B can be processed, and an analog output AS and a digital output SD can be obtained.

As illustrated in FIG. 19, also in this example, analog signal outputs AS1 and AS2 obtained from each of form change detection units 30A and 30B can be processed, and an analog output AS and a digital output SD can be obtained. Since details of these outputs may be the same as that of what was mentioned above with reference to FIG. 17, the detailed explanation is omitted.

Figure 20:
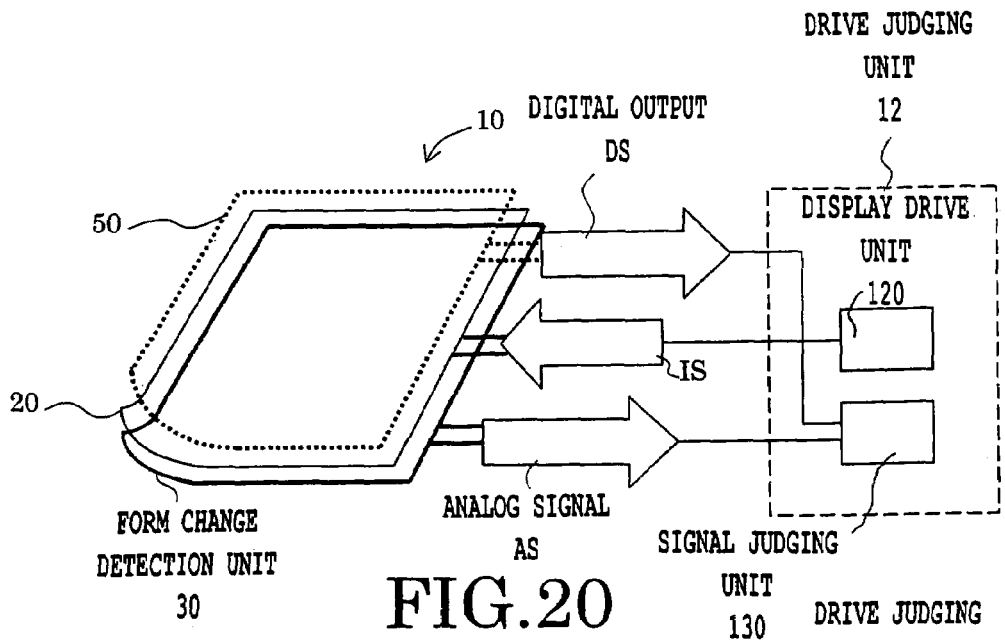
FIG. 20 is a schematic diagram showing a display input device of the example of the invention combined with a touch panel.

FIG. 20 is a schematic diagram showing a display input device of the example of the invention combined with a touch panel. That is, in the case of this example, a touch panel 50 is provided in the surface side of a display unit 20, and a form change detection unit 30 is provided in the back side. The touch panel 50 may have a structure where two or more switching elements are arranged in a matrix fashion. And a digital signal output DS that shows whether which switch element is set to ON (or OFF) is given. On the other hand, a form change detection unit 30 on the back side gives an analog signal output AS, as mentioned above with reference to FIGS. 1 through 19.

Figure 21:
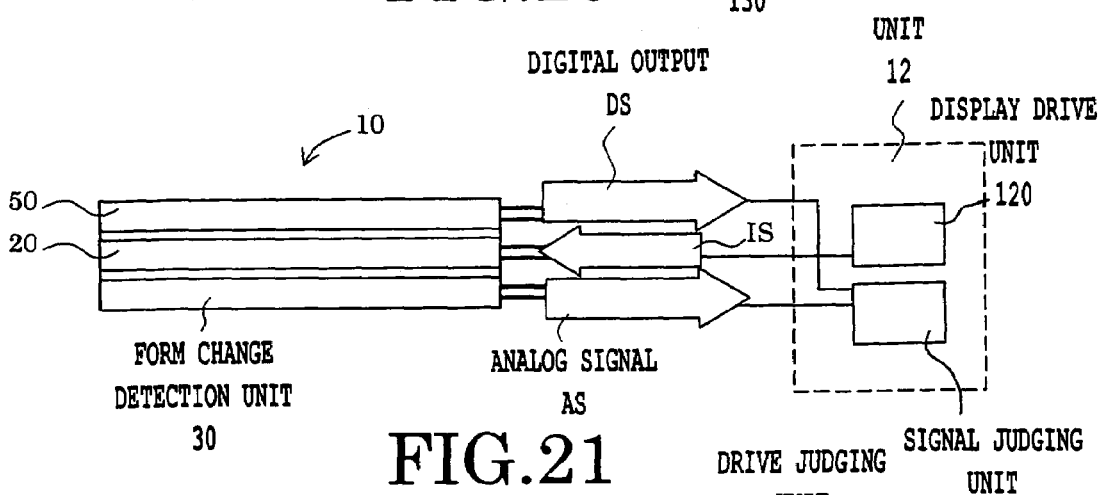
FIG. 21 shows that the outputs can be separately used.

These outputs can be separately used, respectively, as illustrated in FIG. 21. For example, when a user turns a predetermined switching element of a touch panel 50 ON, it becomes possible to carry out data input in an analog fashion, then the user adds the bending to the display input device.

Alternatively, a user may choose type of data with the touch panel, then adds a bending to input the amount of the data.

In these cases, it is not necessary to perform simultaneously an input to these touch panels 50, and an input by bending to a form change detection unit 30.

Figure 22:
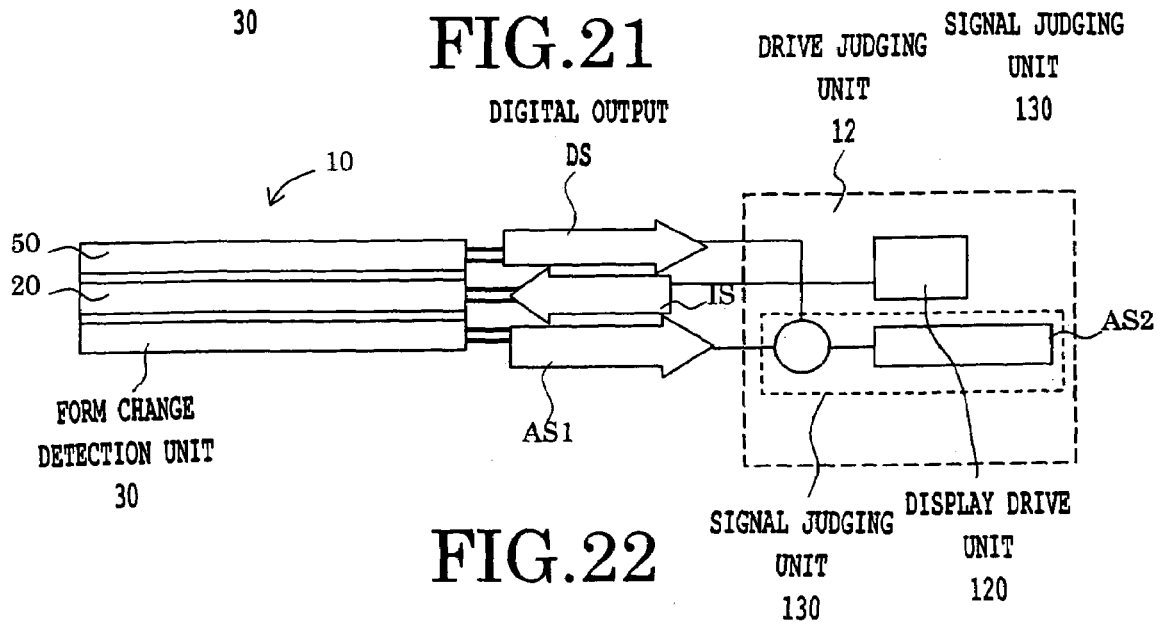
FIG. 22 shows that a digital output DS from a touch panel 50 and an analog output AS1 from a form change detection unit 30 can be processed, and an analog output AS2 can also be obtained.

On the other hand, as illustrated in FIG. 22, a digital output DS from a touch panel 50 and an analog output AS1 from a form change detection unit 30 can be processed, and an analog output AS2 can also be obtained. In this case, a digital output DS from a touch panel 50 may be used in order to give a sign (plus or minus) to an analog output AS1.

Or a digital output DS from the touch panel 50 may also be used as a multiple (or a divisor) to the analog output AS1. That is, an analog output AS2 is obtained by multiplying an analog output AS1 by a multiple assigned to the switching element according to whether which switching element of the touch panel 50 is set to ON. If a choice of the multiples by the touch panel 50 are set up broadly, it is possible to obtain a very wide range analog output AS2.

In FIGS. 20 through 22, although structures where the touch panel SO, the display unit 20, and the form change detection unit 30 are laminated in this order are illustrated, the invention is not limited to these specific examples. In addition, a structure where the touch panel SO, the form change detection unit 30, and the display unit 20 are laminated in this order, or a structure where the form change detection unit 30, the touch panel 50, and the display unit 20 are laminated in this order are also possible in the invention.

Further, the touch panel 50 may be provided in the back side of the device as seen from the user. For example, in the case where a user holds the display input device by both hands or one hand and carries out a touch input with a finger by the side of the back, a structure where the form change detection unit 20, the display unit 30, and the touch panel 50 are laminated in this order, or a structure where the display unit 30, the form change detection unit 20, and the touch panel 50 are laminated in this order as seen from the user may be also employed.

In the above, some examples of basic structure of the display of the invention were explained, referring to FIGS. 1 through 22.

Hereafter, the embodiment of the invention will be explained in more detail referring to examples.

FIRST EXAMPLE

First, a display input device of structure shown in FIG. 1 was manufactured as the first example of the invention. A liquid crystal display formed on a flexible substrate as a display unit 20 was formed. And an analog input device which has a perception layer which consists of resistance material was formed as a form change detection unit 30.

It is necessary to obtain flexibility for adding bending to the periphery part of the liquid crystal display. Therefore, in order to reduce the number of the outgoing electrodes, a liquid crystal display using a poly-silicon thin-film transistor was formed, where a part of the driver (drive circuit) can be introduced into a display unit 20. Hereafter, the structure of this liquid crystal display will be explained, referring to the manufacturing step.

FIGS. 23A through 25C are process sectional views showing the principal parts of the manufacturing process of the liquid crystal display used in this example.

First, on a fully washed non-alkali glass substrate 51, a silicon oxide film or a silicon nitride film 52 used as a under coat layer for preventing alkali ingredient elution from a glass substrate was deposited using a plasma excited metal-organic chemical vapor phase deposition method (the PEMOCVD method) by using trimethyl aluminum for source material.

Next, after growing an amorphous-like silicon film using the PECVD method, an excimer laser using KrF, for example, was irradiated to melt the film momentarily then it was crystallized into a polycrystalline state.

Figure 23A:
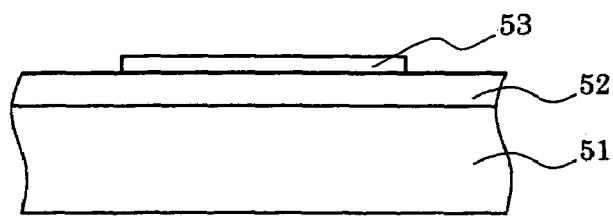
FIGS. 23A through 25C are process sectional views showing the principal parts of the manufacturing process of the liquid crystal display used in this example.

Next, element separation of a polycrystalline silicon layer was performed using a photo-etching process using the reactant ion etching method (the RIE method) by fluoride gas, and island structure 53 was formed (FIG. 23A).

Next, a silicon oxide film or a silicon nitride fin used as an insulating film 54 for gate was formed using the plasma excitation chemistry gaseous phase depositing method (the PECVD method), for example. And metal film, such as Mo, W, Ta, or their alloy, was deposited on the insulating film using a sputtering method, for example.

Figure 23B:
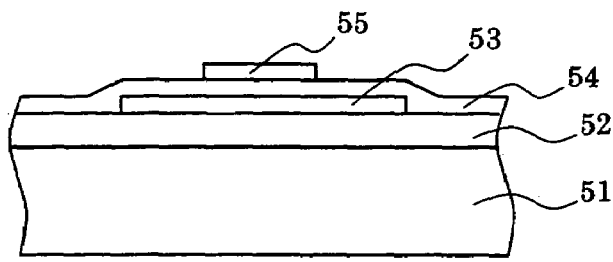

Then, a gate electrode 55 and the gate wirings were formed by using a method of selectively removing the metal film of a portion on which photoresist mask is not formed (FIG. 23B).

Figure 23C:
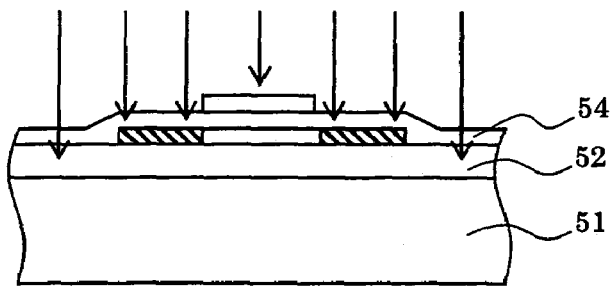

Next, in order to form a junction of the thin-film transistor, impurity was introduced into the semiconductor layer (FIG. 23C). In this example, phosphorous (P) was used as the impurity. At this time, by having used a gate electrode 55 as a mask, phosphorous was introduced so that ion concentration might become about $10^{22}$ cm$^{-3}$ by an ion doping method, and a heat-treatment was performed in order to activate the introduced phosphorous (P).

Figure 23D:
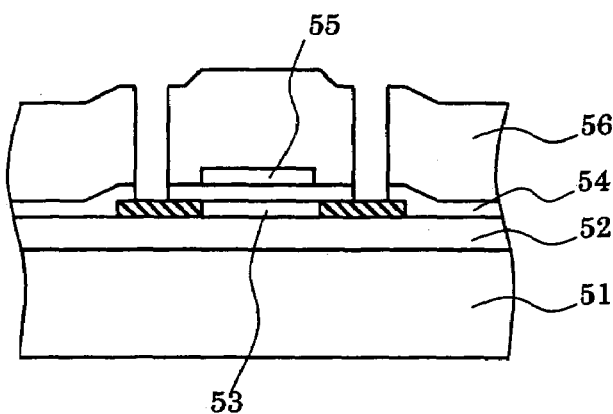

Next, a silicon oxide film or a silicon nitride film which became an interlayer insulation film 56 was formed by an atmospheric pressure chemical vapor deposition method (the APCVD method). Then, through holes for obtaining contacts between source/drain electrodes and the semiconductor layer via the interlayer insulation film 56 and the gate insulating film 54 were formed using a photography etching process (FIG. 23D).

Figure 23E:
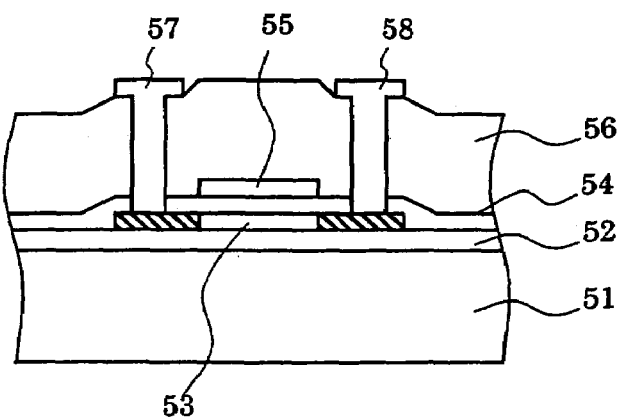

Next, by using metals such as Mo, Ta, W, Al and Ni, or their alloys, metal film or laminated structure was formed by the sputtering method, for example. And the source electrode 57, signal wirings, and the drain electrode 58 were formed using a photography etching process like the gate electrode formation (FIG. 23E).

And the pixel electrodes (not shown) were formed so that they might connect with the sauce electrodes 57. In these series of formation process of thin-film transistor and the wiring, a heat process which exceeds 500 degrees C. might be employed. However, the non-alkali glass substrate 51 used in this example can be used satisfactory, for the formation of active-matrix structure.

Next, a process which transfers this active-matrix substrate to a substrate with flexibility, such as a plastic substrate, was started.

That is, a tentative support layer 61 was formed by applying an adhesive on the surface of the work without a crevice. As the adhesive, for example the ones which is resistant to hydrofluoric-acid, and whose adhesive strength becomes weaker if ultraviolet-rays light is irradiated, can be used.

Figure 24A:
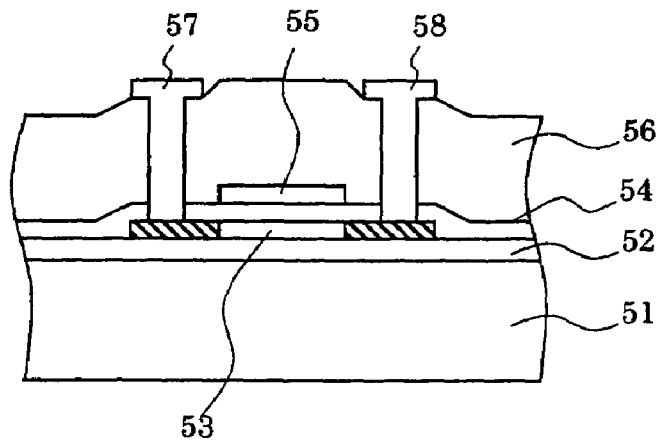
Figure 24B:
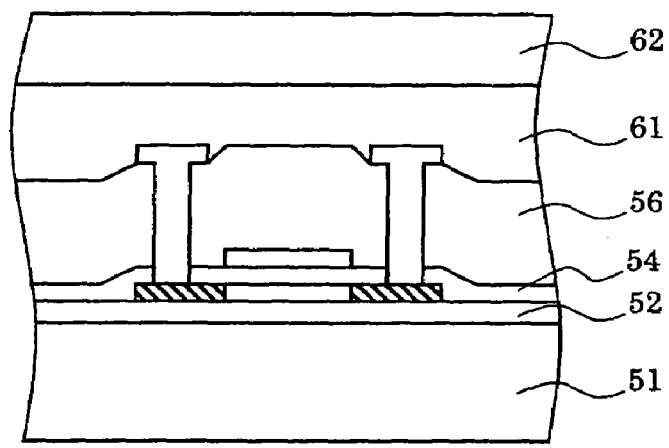

Next, the fluoride resin sheet 62 was provided on the tentative support layer 61 (FIG. 24B). The resin sheet 62 is resistant to hydrofluoric-acid, and a coating was carried out on the adhesion side of the resin sheet 62 for improving the adhesiveness to an organic material.

Figure 24C:
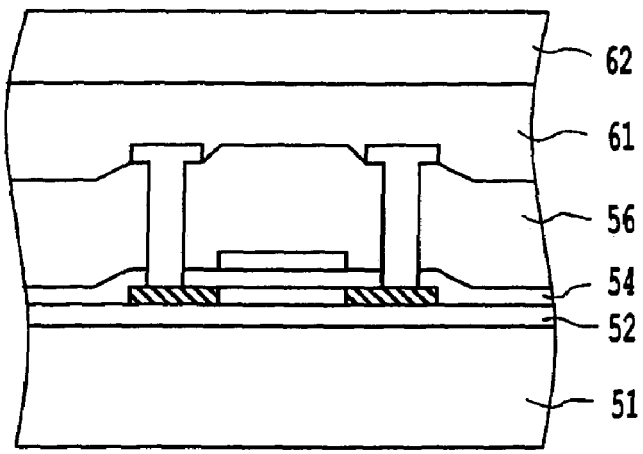

Next, this laminated structure was ground from the back side of the non-alkali glass substrate 51 to a thickness of about 0.1 mm using slurry and by adjusting the roughness of the slurry. Furthermore, it was dipped in the solvent of a hydrofluoric-acid, and the non-alkali glass substrate 63 was etched to the thickness of about 30 micrometers (FIG. 24C).

At this time, after a glass substrate 51 becomes thin, it is desirable to adjust the etching rate by adding ammonium etc. And after fully washing, the adhesive layer 64 was formed all over the etched side of the non-alkali glass substrate 51.

The adhesive excellent in adhesion nature was used as a material of the adhesive layer 64.

Figure 25A:
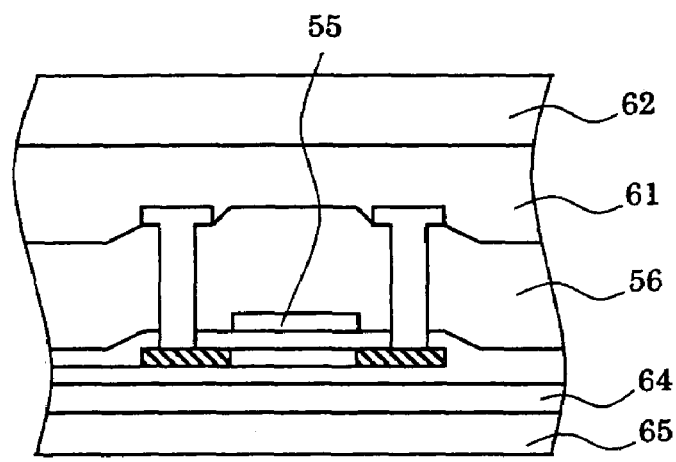

Then, a polyetheramide resin (PES) film of about 0.1 mm in thickness was pasted up on the back side of the adhesive layer 64 as a support substrate 65 by using a lamination technology (FIG. 25A)

In this example, although the PES substrate was used as the support substrate 65, other plastic substrates etc. can also be used in the invention. For example, the Inventors have checked that it was possible to use the polyethylene terephthalate resin film (PET) of 0.1 mm in thickness.

Figure 25B:
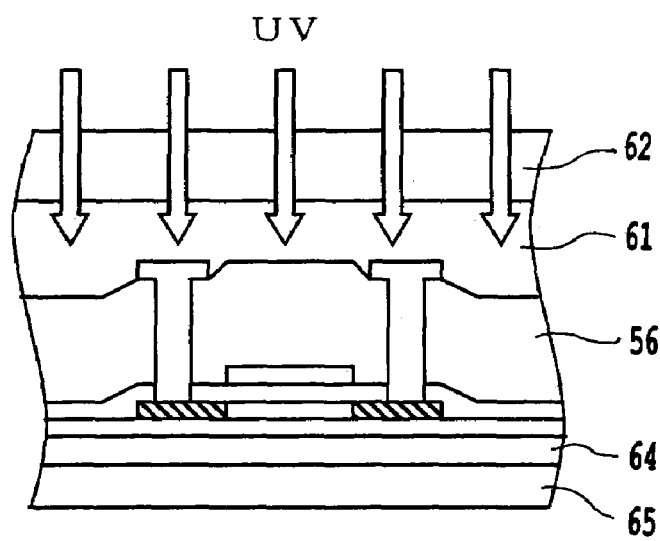

Then, the ultraviolet-rays light (UV) was irradiated from the resin sheet 62 side, and processing which weakens the adhesive strength of tentative support layer 61 was performed (FIG. 25B).

Figure 25C:
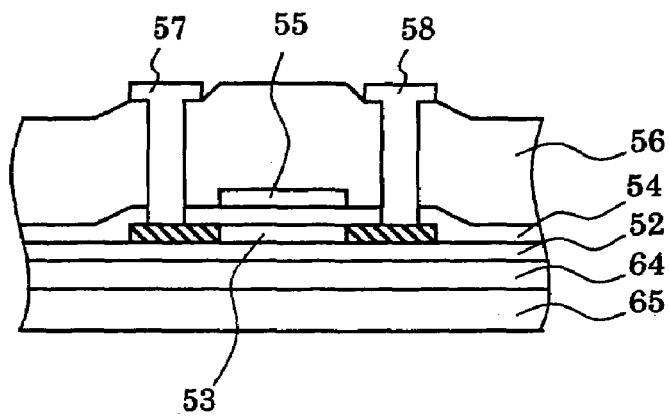

And the resin sheet 62 used as a support substrate was removed slowly, and the active-matrix layer surface, such as the interlayer insulation film layer 56, was exposed (FIG. 25C). Since the ingredient of tentative support layer 63 might remain at this time, it was washed using organic solvents, such as isopropanol, and the clean surface was exposed.

Then, a liquid crystal was filled between the active-matrix substrate with the flexibility fabricated in this way, and an opposite substrate, and the liquid crystal display was completed. The opposite substrate may be a film on which a transparent conductive layer, such as indium tin oxide is coated.

Next, the form change detection unit 30 was manufactured. Transparent conduction film, such as indium tin oxide (ITO), was formed on the surface of the polyethylene terephthalate resin film (PET) of 0.05 mmt, and the conduction film was patterned in a shape of a matrix. The analog form change detection unit was formed by making these substrates counter, and by providing polyvinylidenefluoride (PVDF) between these substrates.

And the form change detection unit 30 was pasted up on the liquid crystal display.

In the conventional touch panel, in order to perform position detection, the mechanism to detect every matrix point is added. On the other hand, in this example, since analog detection of the amount of current between two films which counter is carried out, the structure where the matrix points are connected can be employed. That is, every one electrode by which common connection was made for each film, respectively can be pulled out.

The liquid crystal display with which this analog input mechanism was added has flexibility as a display input device. For example, stress can be impressed to the form change detection unit 30 by bending one end of four corners. And since the electric conductivity between the films changes in the portion which received this stress, current becomes being easy to flow as compared with a flat state. The amount of current increases as the stress of the bending becomes larger. Similarly, the amount of current increases as the bending area becomes larger. Therefore, a user can control the amount of current which flows between films in an analog fashion by adding a bending to the display input device.

SECOND EXAMPLE

Next, the laminated type display input device illustrated in FIG. 15 was manufactured as the second example of the invention. That is, in this example, a liquid crystal display formed on the flexible substrate was used as the display unit 20. And the form change detection units 30A and 30B were given to both sides of the display unit 20, in order to enable the analog input and the signal input of the directivity.

When performing an analog input using the flexibility of a display input device, the case where the display surface side becomes concave, and the case where the display surface side becomes convex can be intentionally distinguished.

For example, when contents like a magazine are being seen, the display surface side may be made into concave to return to a former page from the page currently opened, and the display surface side may be made into a convex to progress to a latter page. Thus, the user's intention can be reflected by giving a bending stress.

Since the structure and the manufacturing method of a liquid crystal display which were used as a display unit 20 in this example are the same as that of what was mentioned above as the 1st example, the detailed explanation is omitted.

As form change detection units 30A and 30B, the polyethylene terephthalate resin (PET) films of 0.05 mmt were used like the first example. That is, a transparent electric conduction film, such as indium tin oxide (ITO), was formed on these films, and patterning was carried out into the shape of a matrix. Then, opposite arrangement of these films was carried out, and sensitive resin has been provided between them.

And these form change detection units 30A and 30B were pasted up on the both sides of liquid crystal display, i.e., display unit side, and opposite side of it, respectively.

The display input device of this example also has flexibility as well as the first example. For example, stress is added to the form change detection units 30A and 30B by bending one end of the four corners. And in the portion which received stress, since the electric conductivity between the films increases, as compared with a flat state, current becomes easy to flow. The amount of current increases as the stress of the bending becomes larger. Similarly, the amount of current increases as the bending area becomes larger. Therefore, a user can control the amount of current which flows between films in an analog fashion by adding a bending to the display input device.

Furthermore, in this example, the form change detection units 30A and 30B are added to both sides of the display unit 20. When performing an analog input using the flexibility of a display input device, the case where the display surface side becomes concave, and the case where the display surface side becomes convex can be intentionally distinguished.

For example, when a display input device is bent so that a display surface may become as an inner side, curvature differs between the form change detection unit 30A added to the display surface side, and the form change detection unit 30B added outside, therefore, the stress applied to each perception layer differs. As the result, the current values detected in the form change detection units 30A and 30B differ. Therefore, detection of the bending direction is attained by taking the difference of the output signals from the double-sided form change detection units 30A and 30B.

For example, when a magazine is considered as contents and a reader goes to the following interesting page from a current page, he may jump to the latter page or former page over a number of pages. In the case of the display input device of this example, the reader may forward to the latter page by bending the device in a convex fashion, and the reader may return to the former page by bending the device in a concave fashion.

Moreover, the amount of jump of the pages may be input by the amount of the bending in an analog fashion.

THIRD EXAMPLE

Next, as this third example of the invention, as illustrated in FIG. 20, the display input device which has the touch panel 50 in the surface side of the display unit 20 which has flexibility, and the form change detection unit 30 in the back side is explained.

In the display input device mentioned above as the 1st example, although it is possible to input an analog signal, when the item of the data to be inputted includes a large number, there is the necessity to provide a selection means separately. For example, in a case where a user views the contents like a map by scrolling the screen, it is necessary to give separately the data about a direction of the scroll, such as north, south, east and west directions, in addition to the amount of the scroll. In this case, the data about the direction can be inputted by choosing a switch element in the touch panel 50 on the side of the display surface. At the same time, the data about migration length (the amount of scroll) can be inputted by the amount of bending given to the form change detection unit 30.

Since it is the same as that of what also mentioned above the structure and the manufacture method of a liquid crystal display which were used as a display unit 20 in this example as the first example, the detailed explanation is omitted.

As form change detection units 30A and 30B, the polyethylene terephthalate resin (PET) films of 0.05 mmt were used like the first example. That is, a transparent electric conduction film, such as indium tin oxide (ITO), was formed on these films, and patterning was carried out into the shape of a matrix. Then, opposite arrangement of these films was carried out, and sensitive resin has been provided between them.

As touch panel 50, the polyethylene terephthalate resin (PET) films of 0.05 mmt were used like the first example. That is, a transparent electric conduction film, such as indium tin oxide (ITO), was formed on these films, and patterning was carried out into the shape of a matrix. Then, opposite arrangement of these films was carried out, and sensitive resin has been provided between them. However, the resistance of a cell for every matrix of an electric conduction film was able to be detected in a touch panel 50.

In the display input device of this example, determination of the necessity for an analog input is possible. That is, a needed function can be chosen by the touch panel 50 on the side of a display surface, and the amount of analogs can be inputted by the form change detection unit 30 on the side of the display back.

For example, when a magazine is considered as contents and a reader goes to the following interesting page from a current page, he may jump to the latter page or former page over a number of pages. In the case of the display input device of this example, the touch button which chooses former pages or latter pages as a display surface inner side may be set up, and the analog input of the number of pages may be attained by the bending given to the form change detection unit 30.

FOURTH EXAMPLE

Next, the display input device which incorporated the form change detection unit 30 into the display unit 20 will be explained as the fourth example of the invention.

Figure 26:
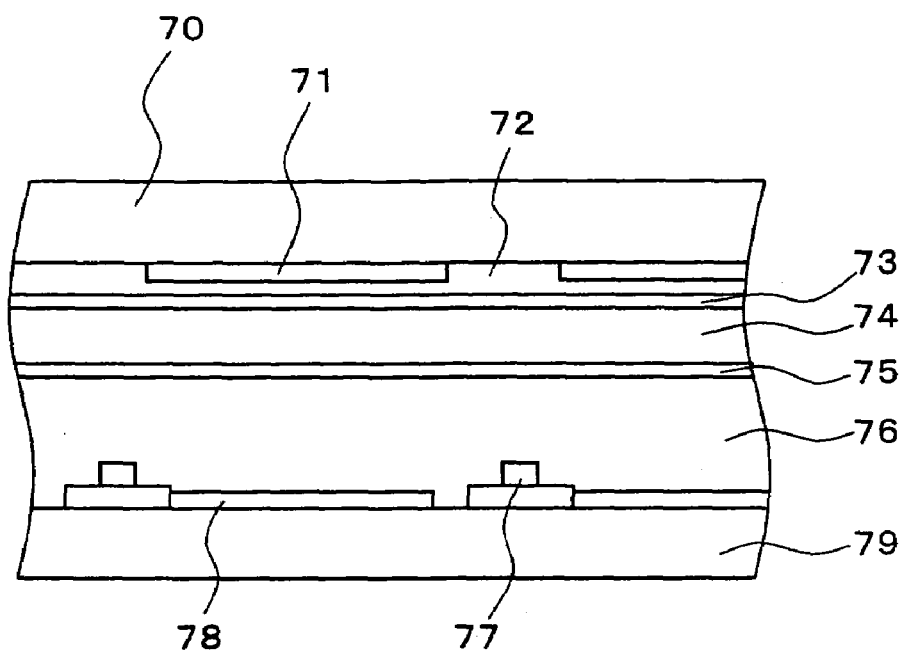
FIG. 26 is a schematic diagram showing the cross-sectional structure of the display input device of the example.

FIG. 26 is a schematic diagram showing the cross-sectional structure of the display input device of this example.

Figure 27:
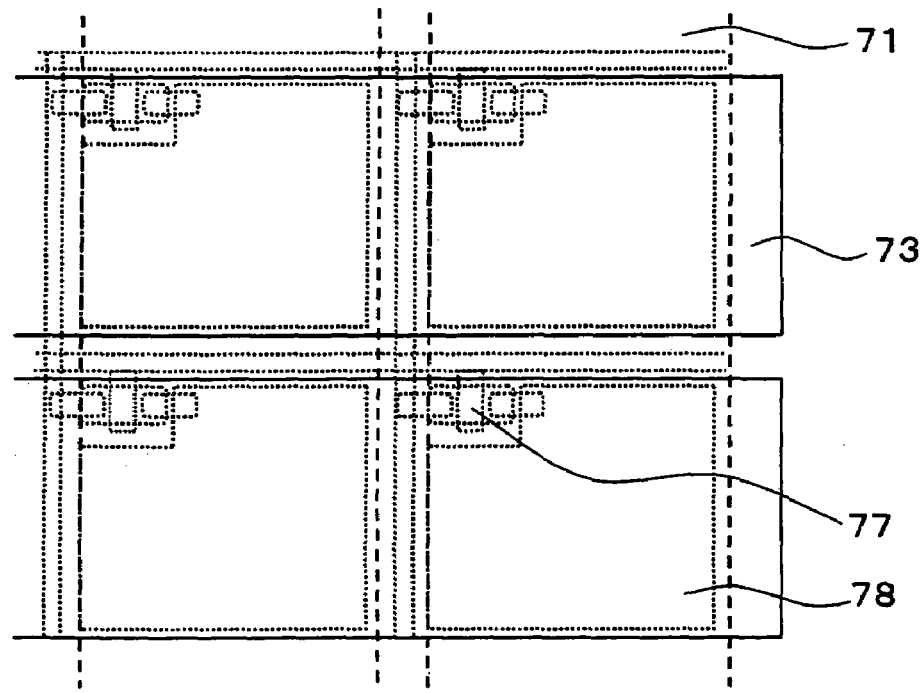
FIG. 27 is a schematic diagram showing the plane arrangement relation of the principal part.

FIG. 27 is a schematic diagram showing the plane arrangement relation of the principal part.

In the case of this example, the form change detection unit 30 is included in the opposite substrate of a liquid crystal display. That is, the indium tin film formed in the opposite substrate 70 in the shape of a stripe is formed, and it is formed as the electrode layer 71. Then, the polyvinylidene-fluoride (PVDF) layer 72 is uniformly formed thereon. Furthermore, on it, an indium tin film is formed in the shape of stripes so that they may intersect perpendicularly with the electrode layer 71, and it is formed as the electrode layer 73.

The electrode layer 71 and the electrode layer 73 which are located on both sides of the PVDF layer 72 constitute the form change detection unit 30.

Furthermore, an interlayer insulation film 74 is formed using an acrylic resin etc. At this time, in order to suppress a coupling capacity between the opposite electrode 75 and an electrode 73 etc., the interlayer insulation film 74 is needed to have a sufficient film quality.

On the other hand, on the support substrate 79, the pixel electrode 78 and a thin film transistor 77 are formed, and the liquid crystal layer 76 is filled between the support substrate 79 and the opposite substrate.

In addition, in order not to affect the display performance of a liquid crystal display, the electrode layer 71 and the electrode layer 73 were formed in form which covers the pixel electrode 78. That is, as illustrated in FIG. 27, the electrode 71 and the electrode 73 are formed with the stripe larger than the width of the pixel electrode 78.

In addition, in this example, in order to prevent the deformation of a substrate and film peeling by the stress to the electrode layer 71 and the electrode layer 73, stripe form is employed. However, in the form change detection unit 30, it is not a necessary to form the indium tin oxide films (71, 73) in a shape of stripe. Moreover, in this example, PVDF 72 is used as a resistance film. However, it will not be limited to especially this material and any material which can be used as a resistance film may be employed as well.

Moreover, in this example, although the form change detection unit 30 was included in the opposite substrate, it may be included in the support substrate on which the thin film transistor is formed, for example.

FIFTH EXAMPLE

Next, the example of the display input system using the display input device of the invention as the fifth example of the invention will be explained.

Figure 28:
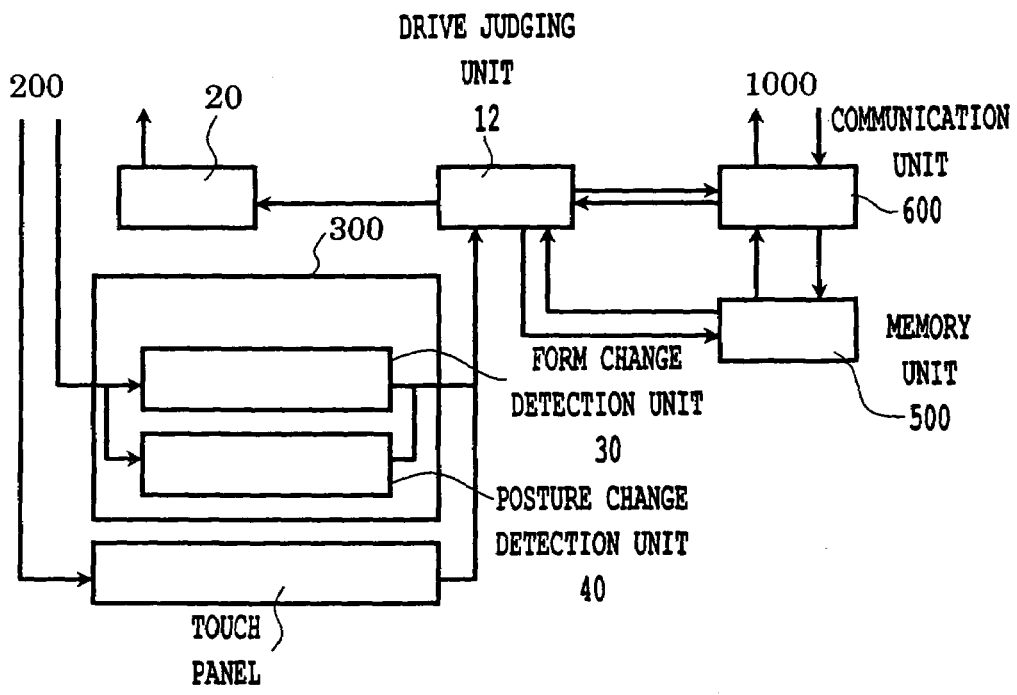
FIG. 28 is a block diagram of the display input system of the fifth example of the invention.
Figure 29:
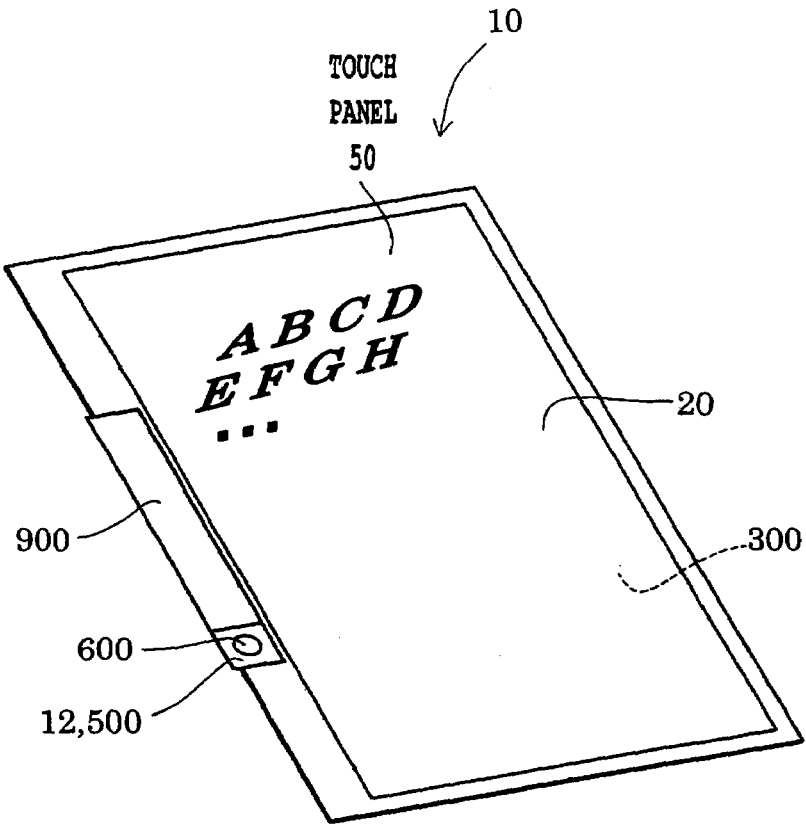
FIG. 29 shows an outline view of the display input system.

FIG. 28 is a block diagram of the display input system of the fifth example of the invention, and FIG. 29 shows an outline view of the display input system. The display input device of this example has the display unit 20, the geometric change detection unit 300, the data input part 50, the control unit 12, the memory unit 500, and the communication unit 600.

The display unit 20 has flexibility, has a thin shape like paper and displays information electronically.

The geometric change detection unit 300 detects a geometric change of form change of the display unit 20, posture change, etc. The data input part 50 acquires the position and the contents which the user 200 inputted by using a finger, a pen, etc. on the display unit 20.

The control unit 12 controls the contents of a display of the display unit 20 based on the geometric change information which were distinguished in the geometric change detection unit 300 and/or the input information acquired in the data input part 50. The memory unit 500 holds information.

The communication unit 600 communicates with external cooperation apparatus 1000.

As shown in FIG. 29, this display input system is a flexibility sheet as a whole, and this display input system has the structure where the circuit part 900 which collected the control unit 12, the memory unit 500 and the communication unit 600, various wiring, etc. was formed in the edge of the side end where stress is not added.

Arrangement of each part in FIG. 29 is an example to the last, and the invention is not limited to this specific example.

First, the display unit 20 will be explained. The display unit 20 has a thin shape and a light weight like paper, and can display a character, a figure, a picture, etc. electronically. The display unit 20 is preferably constituted by the component which can be bent and spread freely like paper The display unit 20 may be realized using the material specifically called "electronic paper (or flexible display)" generally. "Electronic paper" is a next-generation display medium which has the advantages of paper and an electronic display. This "electronic paper" is realized by using various kinds of technology, such as for example:

(1) control of the molecular arrangement by the cholesteric (chiral-nematic) liquid crystal, the ferroelectric liquid crystal, a polymer dispersed liquid crystal, etc., (2) Color material movement using electric migration etc., (3) Chemical changes, such as leuco dye, (4) EL (electroluminescence), and (5) ECD (electrochromic device).

There are the following features in "electronic paper":

(1) Power Supply is Unnecessary to Maintenance of Display (or it is Very Maintainable by Low Power Consumption).

(2) It is Rewritable.

(3) It Has Thin Shape like Paper.

Moreover, like paper, it can be bent freely, and can be spread.

The display unit 20 may be constituted using a material and realization technology other than this, as long as it has the same feature.

On the other hand, the form change detection unit 30 detects form change of the display unit 20 produced by deformation such as bending, rounding, turning over, pulling, and twisting, which a user performs to the display unit 20. The form change detection unit 30 is constituted by two or more sensors arranged on the back of the display unit 20, as will be explained in full detail later.

The form change detection unit 30 identifies the form change using the sensing result obtained from the plurality of sensors. A bending sensor can usually detect displacement and curvature with a single degree of freedom by change of the resistance which is a sensor output. By arranging these sensors in a matrix fashion on the back of the display unit 20, bending and spreading can be detected all over the display unit 20.

The sensing method explained above is an example, and the invention is not limited to this. For example, the "shape sensor" may be used as well. This is a sensor using the phenomenon in which the amount of light penetration intensity changes, when the fiber is bent or spread, and thus, displacement, curvature, acceleration, etc. are detectable.

Moreover, the arrangement of the sensors is not restricted in the matrix fashion. The arrangement can be freely changed according to form change to acquire. For example, when the portion where the form change needs to be detected is restricted, what is necessary is not to arrange a sensor all over the back of the display unit 20, and to arrange only in a required portion. Moreover, if there is a portion where the curvature of deformation needs to be detected precisely, the portion may be covered by the sensors more densely.

On the other hand, the posture change detection unit 40 detects posture change of the display unit 20. A user 200 performs this posture change to the display unit 20. For example, posture change arises by operations such as, to move hands while holding the equipment 20, to lift the equipment 20, and to shake the equipment 20.

The posture change detection unit 40 may be constituted by two or more acceleration sensors, a gyroscope sensor, etc. which were provided on the back (and/or, other parts of the apparatus) of the above-mentioned display unit 20. Posture change is identified using the sensing result obtained from those sensors. Thereby, the posture of the equipment at the time of the user 200 holding equipment and the change of state of the equipment produced by action which the user 200 is performing to equipment are detectable. The posture change is, for example, such as, "the right-hand side of apparatus being raised", and "equipment being shaken at right and left."

This invention is not limited to these form change detection unit 30 and the posture change detection unit 40. It is also possible to add suitably other detection pans which can acquire geometric changes other than form change and posture change.

Next, the data input part 50 will be explained. The data input part 50 is for acquiring the position and the contents which the user 200 inputted by a finger, a pen, etc. on the display unit 20. The data input part 50 is constituted by a transparent touch panel arranged on the display unit 20, for example. Thereby, the part where the user 200 is touching the above-mentioned display unit 20 with the finger is detectable. Moreover, it is possible to acquire the locus of the nib of the pen which the user 200 holds. That is, the data input part 50 has the same role as the touch panel 50 which was mentioned above about FIGS. 20 through 22.

The data input part 50 is not limited to a touch panel. For example, an ultrasonic wave etc. may send from the circuit part 900 arranged at the side edge part of said display unit 20 as shown in FIG. 29, and by detecting again the reflective wave which has reflected and returned to the finger of a hand etc. in the circuit part 900, thus, the data input part 50 may be constituted so that the input position may be detected. Or two or more microphones detect the ultrasonic wave sent, using the pen which sends an ultrasonic wave, and the position of a pen may be calculated busing the principle of triangulation.

It is also possible to generate a magnetic field on the display unit 20, and to compute a position from magnetic field change produced by the finger and pen on the display unit 20. It can also use combining these methods suitably. The other sensing technology may also be used.

Next, the memory unit 500 will be explained. The memory unit 500 is for storing various kinds of information, such as the contents for displaying on the display unit 20, and an internal state of the display input system. The memory unit 500 is typically constituted using semiconductor memory. The memory unit 500 may be able to be removed from the display input system in this example. In this case, it is desirable to use the semiconductor memory medium of the existing standards, such as a memory stick, SmartMedia, CompactFlash, and SD card. When the memory unit 500 is made removable, this memory unit 500 can be connected to the apparatus which is outside, and data can be outputted and inputted in the memory unit 500.

Next, the communication unit 600 will be explained. The communication unit 600 is for communicating with external cooperation apparatus 1000. The communication unit 600 communicates with external cooperation apparatus 1000 using the wireless-communications means such as Bluetooth.

Thereby, various communications, such as an input of the data from external cooperation apparatus 1000 to the display input system in this example, an output of the data from the display input system in this example to external cooperation apparatus 1000, transmission of the control information from the control unit 12 to the external cooperation apparatus 1000 mentioned later, and reception of the control information on the control unit 12 later mentioned from external cooperation apparatus 1000, are attained.

In addition, a means of communication is not limited to Bluetooth. It is possible to use the wireless LAN specified to IEEE802.11a/b/g etc., and infrared transmission, RF communication and other wireless-communications systems. By using wireless communications, the information machines and equipment of this example are not restrained by external apparatus with a cable. Therefore, the feeling to walk around with paper freely can be obtained.

Although it is desirable to use a wireless-communications means as for the communication unit 600, cable-communications means, such as serial communication, may also be used. In this case, when not communicating with external cooperation apparatus 1000, it is desirable to make the communication unit the structure removable from the display input system. By carrying out like this, it is not restrained by external apparatus other than the time of communication, but can usually carry around freely at the time of use.

Finally, the control unit 12 will be explained. Control unit 12 has the following functions (FIG. 28):

(1) Control the contents of a display of the display unit 20 based on the geometric change information which is distinguished in the geometric change detection unit 300 and/or the input acquired in the input acquisition part 3.

(2) Control reading and writing of the data stored in the memory unit 500.

(3) Control the contents of communication in the communication unit 600, a communication method, timing, etc.

(4) In addition, control predetermined operation of a display input system.

According to the display input system of this example, a user 200 can operate it by giving deformation of form and change of a posture to the display unit 20. Moreover, a user 200 can operate a display input system, combining a motion of a finger, a pen input, etc. suitably.

Next, some examples about operation realized by the display input system in this example will be explained. First, the example where the display input system in this example is applied as an Electronic Book leader terminal is explained.

Figure 30:
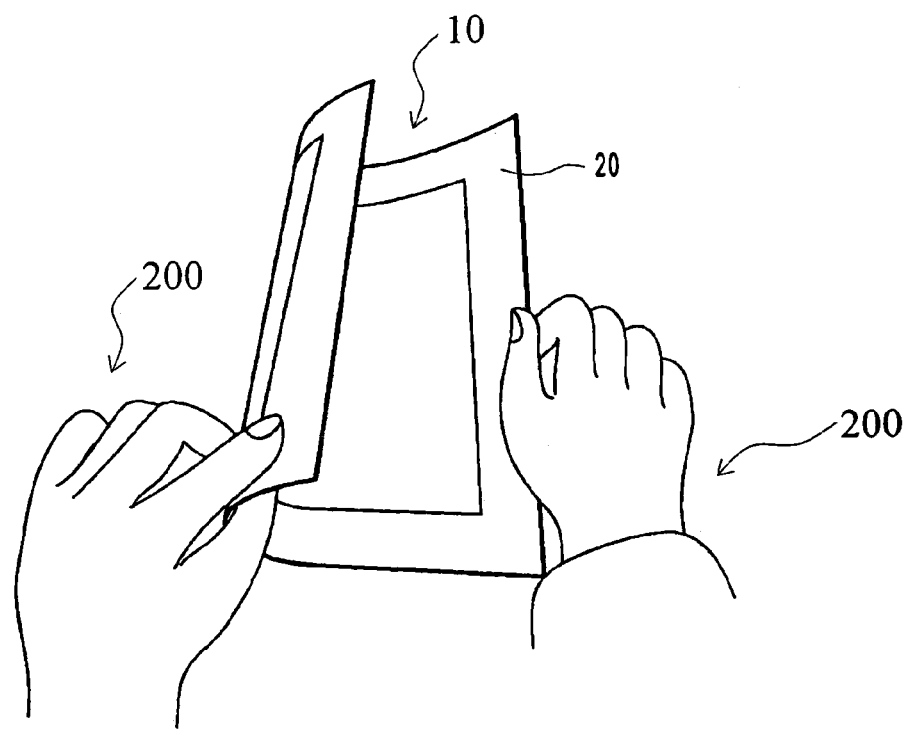
FIG. 30 shows that a user 200 holds the right-hand side of the display unit 20 (that is, display input system) with the right hand, adds bending to left-hand side to turn over a page.
Figure 31:
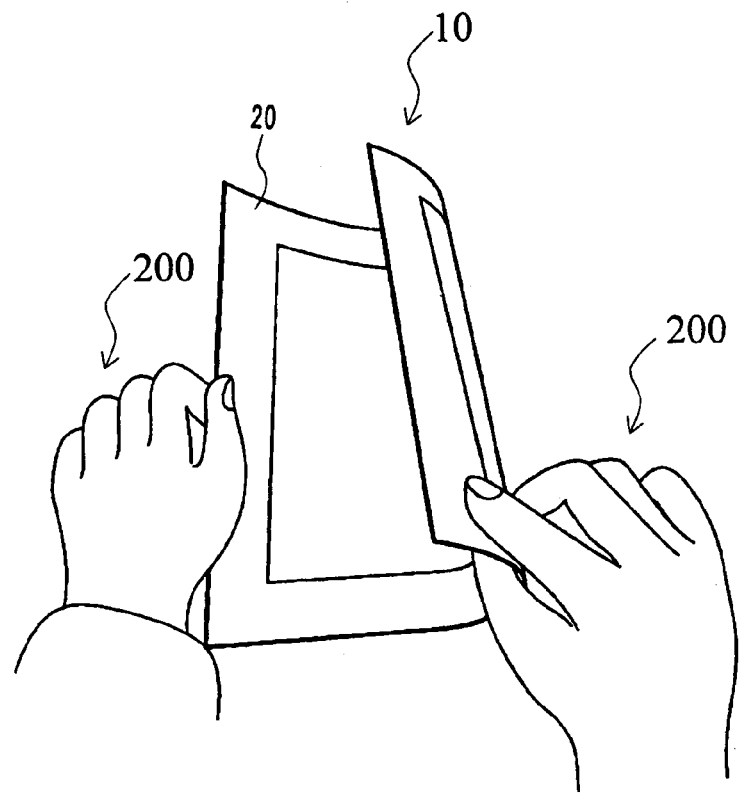
FIG. 31 shows that the user 200 holds the left-hand side of the display unit 20 (that is, display input system), adds bending to right-hand side to turn over a page

Suppose that a certain page of a novel is now displayed on the display unit 20. In this case, as shown in FIG. 30, when a user 200 holds the right-hand side of the display unit 20 (that is, display input system) with the right hand, adds bending to left-hand side to turn over a page, then the contents currently displayed on the display unit 20 are advanced by 1 page. On the contrary, as shown in FIG. 31, when the user 200 holds the left-hand side of the display unit 20 (that is, display input system), adds bending to right-hand side to turn over a page, the contents currently displayed on the display unit 20 are returned by 1 page. Thus, the user 200 has a feeling to turn over a book of paper, when he operates the display input system.

The position currently held by hand and the position of the hand which tries to turn over a page are detected by the data input part 50. Moreover, posture change and the deformation state added by the page turning-over operation to the display input system in that case are detected by the geometric change detection unit 300. When detected from these detection results that "The right-hand side of the display unit 20 (that is, display input system) is held with the right hand, and operation which turns over left-hand side is carried out", the data of the following page currently held at the above-mentioned memory unit 500 is acquired through the above-mentioned control unit 12, and the contents of a display of the above-mentioned display unit 20 are updated.

If a matrix structure which was illustrated in FIG. 10, and divided type structure which was illustrated in FIG. 13 and Pig. 14 are adopted as a form change detection unit 30, it is also detectable to which portion bending is added.

In the conventional display input system, the page skip etc. had to be operated using the button etc. On the other hand, in the display input system of this example, a user can operate it with the feeling as if he is operating a real paper medium (such as a novel). According to the embodiment, those who have not touched a computer machine also lose his uncomfortable feeling to operation of the display input system, and everyone can operate the display input system intuitively. As mentioned above with reference to FIG. 4, the amount of progress of pages can also be changed according to the speed or acceleration of the action to add the bending. That is, when bending is added quickly, the amount of progress of pages is enlarged, and when bending is added slowly, the amount of progress of pages can be lessened. Thus, very intuitive operation can be attained.

Figure 32A:
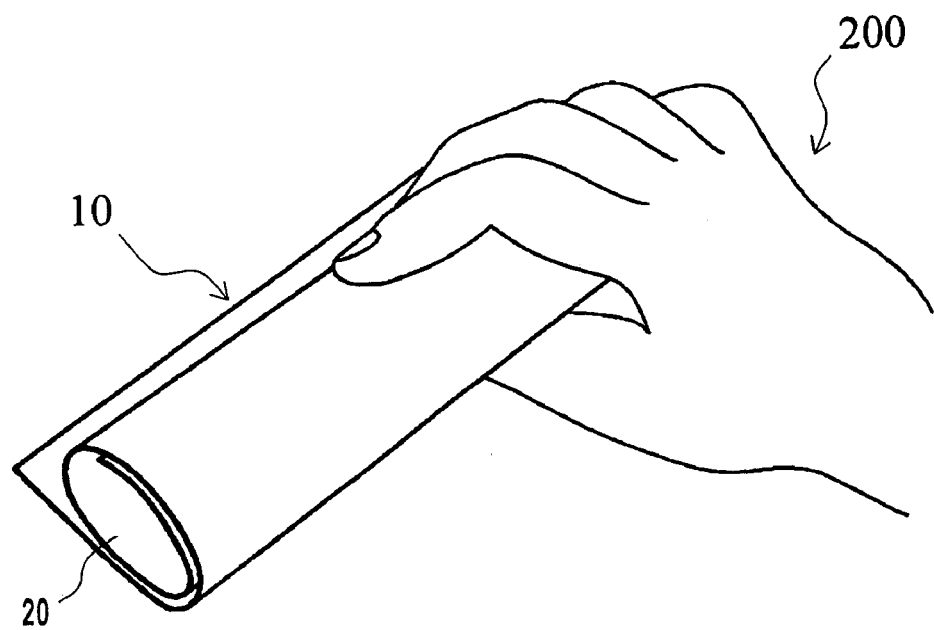
FIG. 32A shows the operation which rolls round the display unit 20.
Figure 32B:
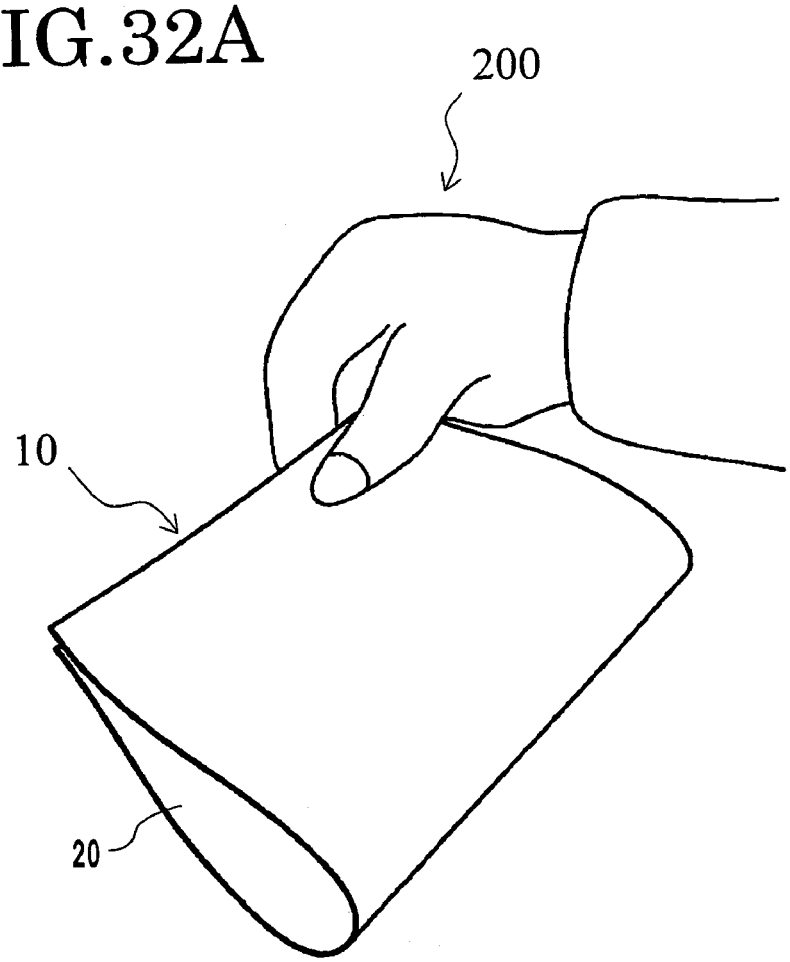
FIG. 32B shows the operation which folds the display unit 20.

Above, although the example which realizes page turning over using the geometric change of the display unit 20 (that is, display input system) was shown, the invention is not limited to this. For example, practical use that the power supply of a display input system will serve as OFF if operation which rolls round the display unit 20 (that is, display input system) is carried out as shown in FIG. 32A, or operation which folds the display unit 20 is carried out as shown in FIG. 32B, and it will be turned on if it is spread into a plane conversely is also possible.

Figure 33:
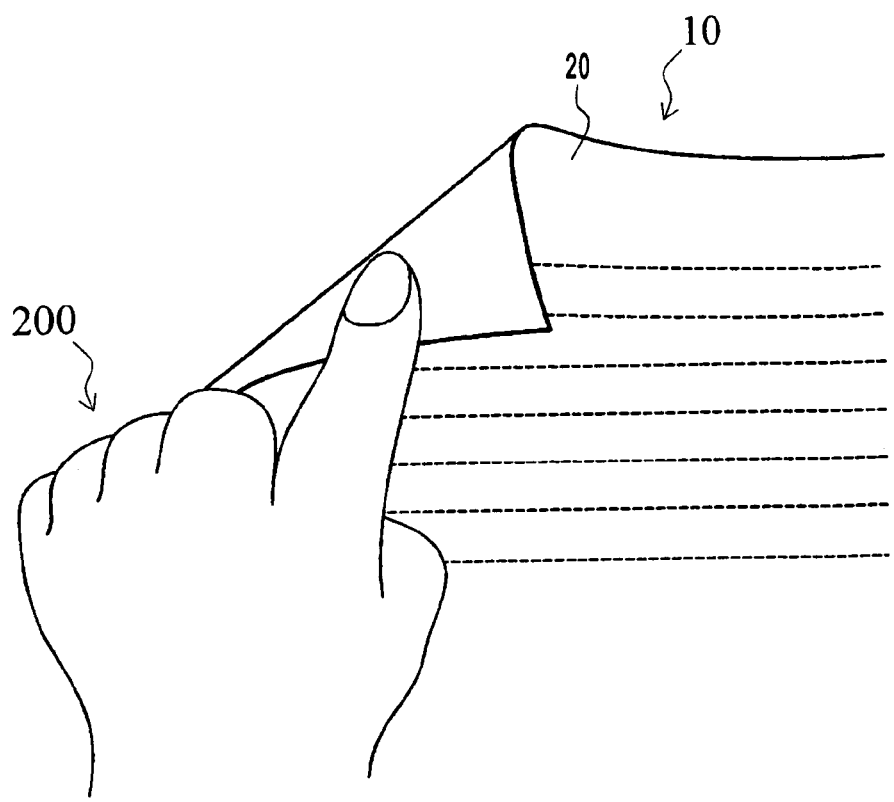
FIG. 33 shows that the upper left portion of the above-mentioned display unit 20 is turned over just for a moment by adding the bending.

As shown in FIG. 33, when the upper left portion of the above-mentioned display unit 20 is turned over just for a moment by adding the bending, a menu may be made to be displayed. Further, it is also good to insert a bookmark when the bending is added to a part for an upper right portion. Thus, all operations may be attained with the feeling as if a paper medium is handled.

Figure 34:
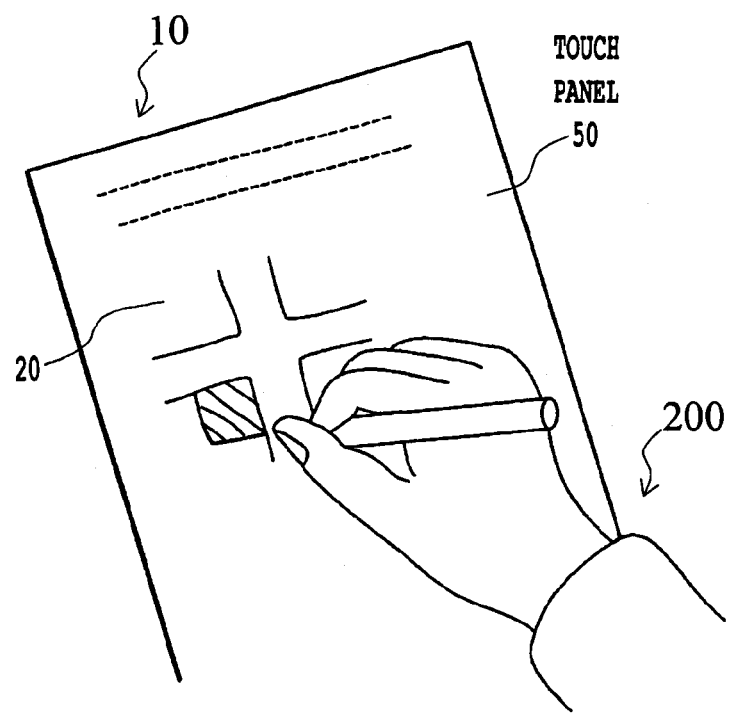
FIG. 34 shows that it is possible to perform a handwriting input using a pen.

Next, the example where the display input system is applied as an electronic memorandum terminal will be explained. According to the display input system in this example, as shown in FIG. 34, it is possible to perform a handwriting input using a pen (what does not output ink in itself (for example, stylus)).

The locus of the nib position detected in the data input part 50 is processed as stroke data in the control unit 12, and the contents are reproduced by the display unit 20 as it is.

Figure 35:
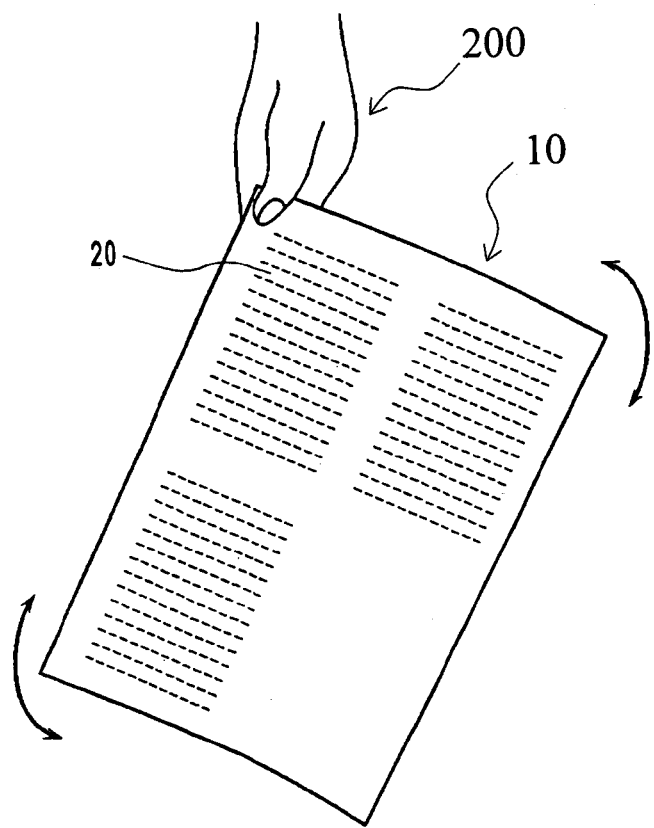
FIG. 35 shows that operation which gathers and shakes a part of display unit 20 (that is, display input system) is carried out.

In this case, as shown in FIG. 35, when operation which gathers and shakes a part of display unit 20 (that is, display input system) is carried out, the contents currently displayed on the display unit 20 may be cleared. Thus, a user 200 can eliminate the contents intuitively.

At this time, the position currently held by hand is detected by the above-mentioned data input part 50, and posture change of the equipment obtained by operation to shake is detected by the posture change detection unit 40 provided in the above-mentioned geometric change detection unit 300. Thus, it is also possible to perform freely the gesture input of a certain kind by a user 200 to the display input system.

Next, the example to which the display input system is applied as an electronic map viewer will be explained. That is, by storing map information in the memory unit 500, or by obtaining map information from the exterior through the communication unit 600, an electronic map system can be realized by displaying these map information on the display unit 20.

Also in this case, as explained with reference to FIGS. 3, 4, 5, 30, 31, or 33, etc., it is possible to scroll the contents of a display in the predetermined direction, by adding a bending to any portion of the display input system. For example, as explained with reference to FIG. 30, when a user 200 adds a bending to left-hand side of the system, the map displayed on the display unit 20 may be shifted to left-hand side. Moreover, display magnification may also be changed by adding bending. For example, operation of expanding a map when bending is added in the shape of a convex toward a user 200, and on the other hand reducing a map when bending is added to a concave toward a user 200 is possible. Furthermore, it becomes still more convenient by combining with the posture change detection unit 40. For example, if a user 200 puts a display input system in the predetermined direction, the contents of a display may scroll in the direction.

In this case, if such a scroll function always works, the contents of a display always scroll by an unprepared inclination, and it is inconvenient. Then, it is good to combine with the data input by the data input part 50.

That is, if a user 200 touches the predetermined switch portion prepared in the display input system, the data input part 50 will detect it and will turn ON a scroll function. A user 200 can scroll the contents of a display towards desired direction by making a display input system incline in the predetermined direction in this state. Moreover, at this time, the amount of scroll (or scroll speed) can also be changed according to the amount of inclinations.

For example, when the system is inclined greatly, it scrolls at high speed, and when the system is inclined slightly, it may scroll slowly. If the contents of the display unit 20 are scrolled and a desired map is displayed, a user 200 will lift a hand from a predetermined switch portion. Then, the data input part 50 detects this and turns OFF a scroll function.

In this state, even if the display input system is inclined, the contents of a display are not scrolled. Thus, undesirable scroll can be easily prevented.

As explained above, when this example is applied to an electronic map viewer, the portion of the request in a vast display area can be displayed intuitively and quickly by operation of bending or inclination. The system is not limited to a map, and may display the portion of a predetermined report quickly out of the whole newspaper, for example.

As explained above, it becomes possible by using the display input system by this example to perform intuitively predetermined operation of devices, such as ON/OFF of the power supply of a device, change of the contents of a display, selection of the contents of operation, and menu operation, with the feeling which is touching the paper medium using a geometric change of the device itself and/or the input using the finger and pen of a hand of a user 200.

Modification of the Fifth Example

Figure 36:
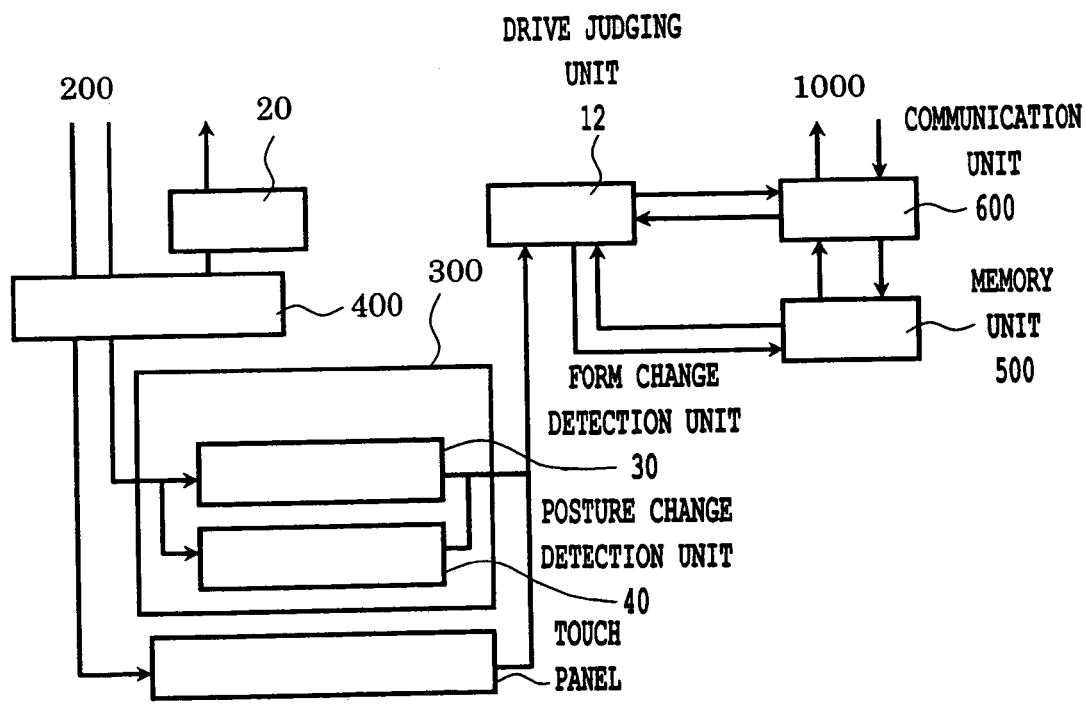
FIG. 36 shows the display unit 20 having a flex auxiliary part 400.

In the above-explained fifth example, the display unit 20 is made flexible. However, as shown in FIG. 36, the display unit 20 can also use what is not flexible form by newly adding the flex auxiliary part 400 to the structure of the first embodiment.

The flex auxiliary part 400 will be explained. The flex auxiliary part 400 is constituted by a flexible component which can be bent and can be spread freely like a paper. A user 200 can bend it instead of the display unit 20. This is arranged near the display unit 20, and same operation is performed by detecting modification of the flex auxiliary part 400 in the geometric modification detection part 2.

The flex auxiliary part 400 is made by a transparent thin film, for example, and is placed on the display unit 20. And a user 200 performs modification operation of turning-over operation etc. to the film on the display unit 20.

The realization method of the flex auxiliary part 400 is not limited to this. An opaque thin big film may be attached the display unit 20, so that the surroundings of the film may project around the display unit 20, and the film it may be used as the flex auxiliary part 400. Or the flex auxiliary part 400 may be arranged in a size equivalent to the display unit 20 beside the display unit 20, and the portion may be used. The structures except these will also be available to realize the system with the flex auxiliary pan 400.

SIXTH EXAMPLE

Next, the sixth example of the invention will be explained.

Figure 37:
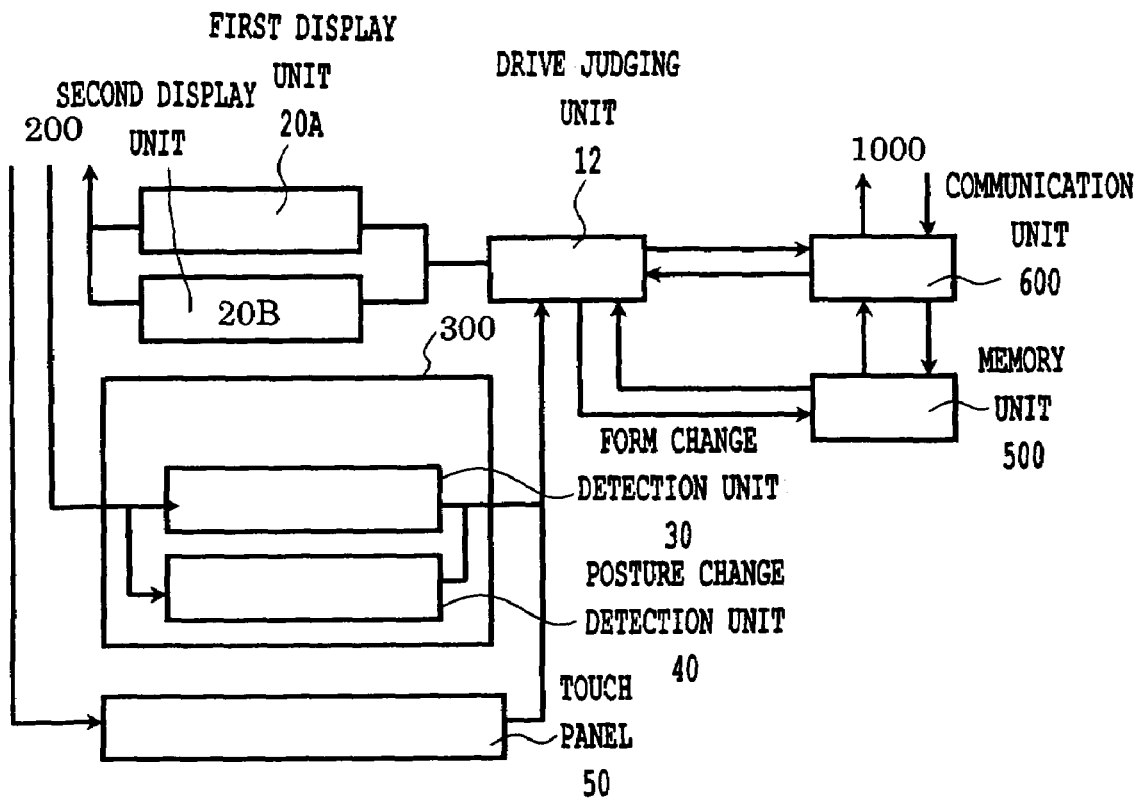
FIG. 37 shows the whole display input system structure of the sixth example of the invention.

FIG. 37 shows the whole display input system structure of the sixth example of the invention. The display input system of this example has first display unit 20A and second display unit 20B which have the same function as the display unit 20 explained with reference to the fifth example. Moreover, the control unit 12 in this example can control individually the contents of a display of first display unit 20A, and the contents of a display of second display unit 20B based on the input acquired in the data input part 50, respectively. As for the geometric change detection unit 300, the data input part 50, the control unit 12, the memory unit 500, and the communication unit 600 may be substantially the same with the fifth example.

Figure 38:
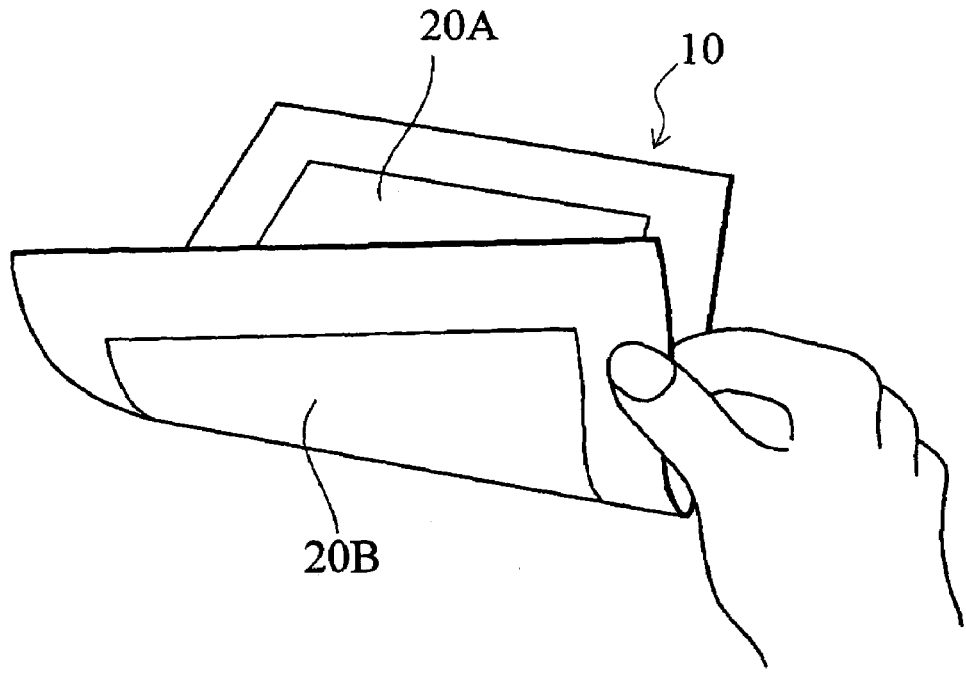
FIG. 38 shows that the user carries out the turning-over operation.

First display unit 20A and second display unit 20B will be explained. The first display unit 20A and second display unit 20B are in a thin shape with lightweight, which can display information like paper like the display unit 20 explained with reference to the fifth example, respectively. They are constituted by the component which can be bent and spread freely like paper. Typically, the first display unit 20A and second display unit 20B are arranged in the position of the relation of the both sides of paper, respectively, as shown in FIG. 38.

Next, the control unit 12 will be explained. Control unit 12 has the following functions (FIG. 37):

(1) Control the contents of a display of the first display unit 20A based on the geometric change information distinguished in the above-mentioned geometric change detection unit 300, or/and the input acquired in the above-mentioned data input part 50.

(2) Control the contents of a display of the first display unit 20B based on the geometric change information distinguished in the above-mentioned geometric change detection unit 300, or/and the input acquired in the above-mentioned data input part 50.

(3) Control reading and writing of the data stored in the above-mentioned memory unit 500.

(4) Control the contents of communication, a communication system, timing, etc. in the above-mentioned communication unit 600.

(5) In addition, it is for controlling predetermined operation of apparatus.

According to the display input system in this example explained above, a user 200 can operate the display input system in this example using deformation of the form of the first display unit 20A (and also the second display unit 20B, since display unit 20B of the above second is arranged on this back side), or change of a posture thereof.

Moreover, a user 200 can operate the display input system in this example, combining a motion of a finger, a pen input, etc., suitably. Furthermore, the user can peep into the information displayed on the second display unit 20B while referring to the information currently displayed on the first display unit 20A, by adding the bending so as to turn over a paper.

Hereafter, some examples about operation realized by the display input system will be explained.

First, the example where the display input system is applied as an Electronic Book leader terminal will be explained. Suppose that a certain page of a novel is now displayed on the first display unit 20A. In this case, suppose that notes were attached to a word in the novel. Typically, since notes are summarized at the last of the chapter and are describing in many cases, when a user is reading a usual book, he must carry out several pages of page turning-over, and must look for the page to which notes are summarized.

In contrast to this, when turning-over operation is instead performed as shown in FIG. 38, notes are displayed on the portion of the second display unit 20B according to the invention. Thus, the display input system in this example can be used with the feeling as if the user steals the information on the back side of the paper by which double-sided printing is carried out. Or suppose the user does not understand a certain word in the text currently displayed on first display unit 20A. Then he touches the portion where the word is displayed with his finger, or makes a mark by a pen. After that, when he carries out the turning-over operation as shown in FIG. 38, a part of a dictionaries which describes the meaning of the word is displayed in the portion of the second 2nd display unit 203.

Moreover, a translation of the text displayed on the first display unit 20A may be displayed on the second display unit 20B.

When turning-over operation is carried out as shown in FIG. 38, it is necessary to display the contents on the second display unit 9 in upside down. This is because the upper and lower sides of the display unit which is visible from a user 200 are reversed in turning-over operation of this direction. In the above-mentioned control unit 12, such a situation is also taken into consideration.

Next, the example where the display input system is applied as a map display terminal will be explained.

Now, the address of a place (for example, restaurant) to go is inputted into the first display unit 20A. Then, if operation which turns over the bottom is performed as shown in FIG. 38, service that the inputted map around the address is displayed on the turning-over portion of the second display unit 20B can be offered. Moreover, different information may be made to be acquired when the position to turn over is changed.

For example, if an upper end is turned over, the abbreviation map having shown the usual route to a point to go to may be displayed on the turning-over portion of the second display unit 20B. Moreover, the menu information or the business status of the restaurant may be displayed when a right end is turned over.

That is, it is possible to change the contents to peep depending on how to turn over the system.

Operation of the display input system in this example explained above is summarized. While a user 200 refers to the information in the surface of a display input system or inputs information into the surface by using the display input system in this example, the pertinent information corresponding to it is displayed on the back by performing operation accompanied by a geometric change of the cover input device itself, such as turning-over operation, and it becomes possible to peep into the pertinent information on the back.

SEVENTH EXAMPLE

Next, the seventh example of the invention will be explained.

Figure 39:
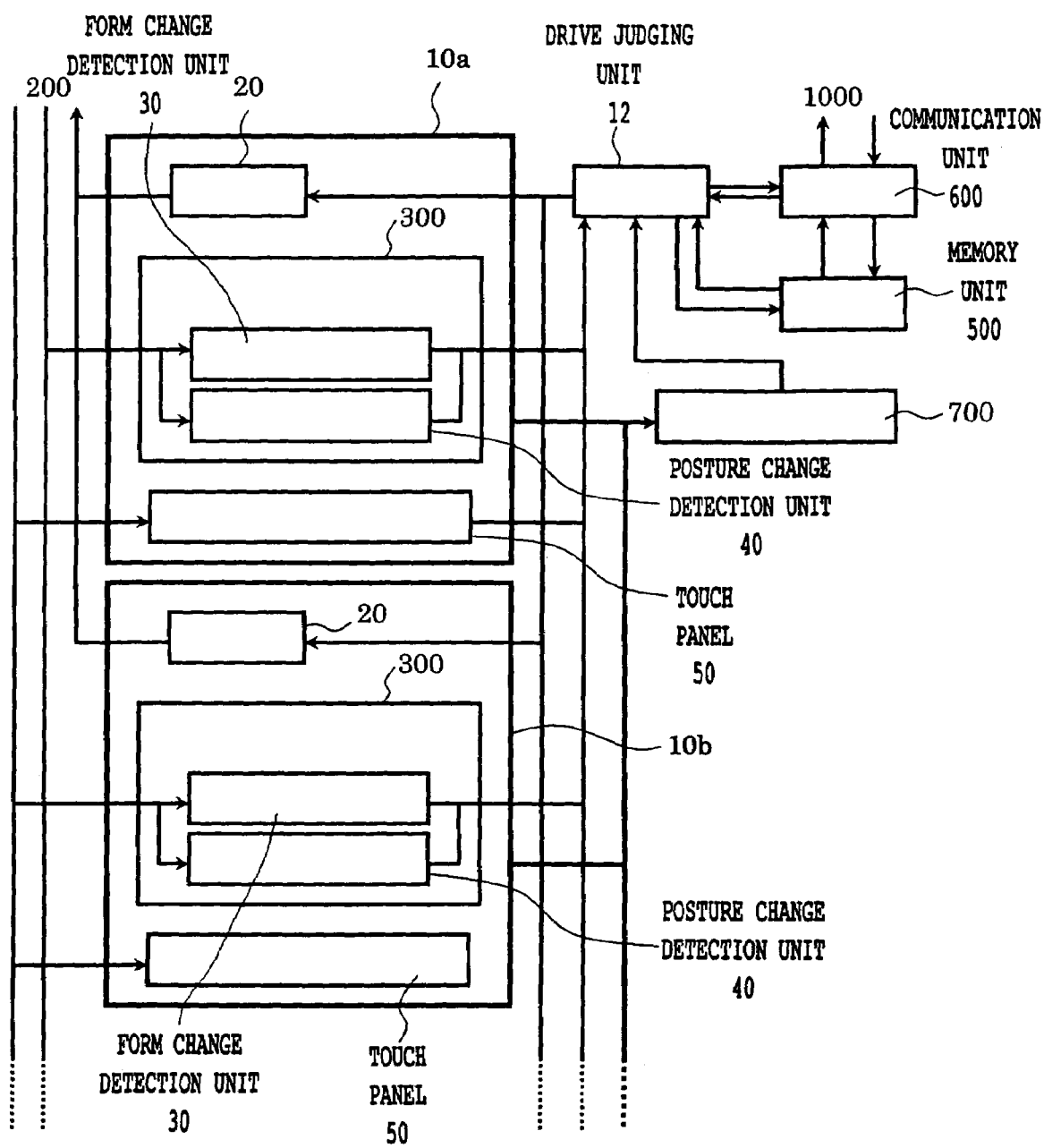
FIG. 39 shows the structure of the display input system of the seventh example of the invention.
Figure 40:
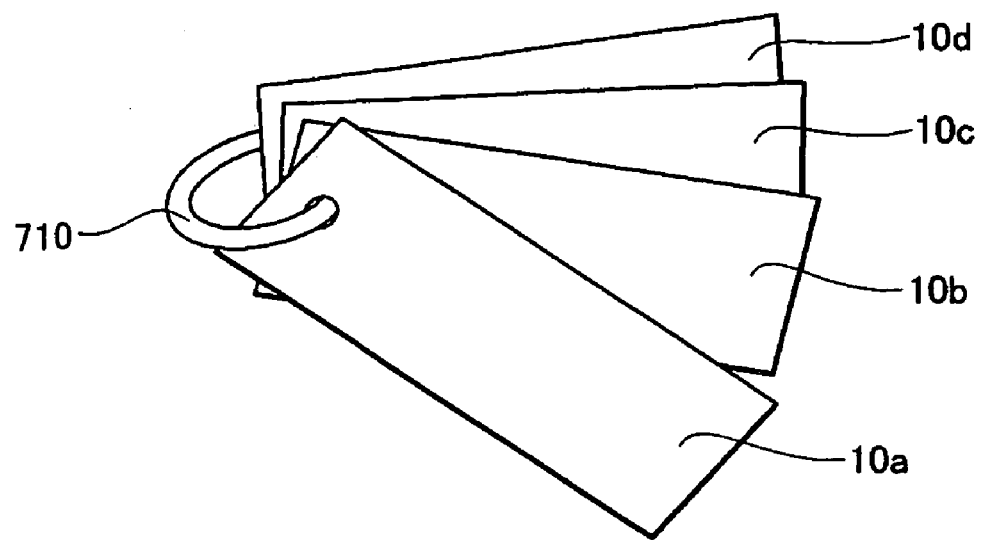
FIG. 40 is an outline view of the display input system concerning the example.

FIG. 39 shows the structure of the display input system of the seventh example of the invention. FIG. 40 is an outline view of the display input system concerning this example. The display input system of this example has two or more input-and-output parts 10a, 10b, . . . . Each of the input-and-output parts 10a, 10b, . . . has the display unit 20, the geometric change detection unit 300, and the data input part 50. Moreover, the display input system of this example has the position change detection unit 700. The position change detection unit 700 detects the position change of the input-and-output part 10, and physical relationship between each of the two or more input-and-output parts 10. Moreover, the display input system of this example has the control unit 12, the memory unit 500, and the communication unit 600, as already explained with reference to the fifth and sixth examples.

As shown in FIG. 40, the above-mentioned control unit 12, the memory unit 500, and the communication unit 600 are summarized to one inside the ring 710 same with having bundled the word book, and have bundled two or more above-mentioned input-and-output parts 10a, 10b, . . .

Figure 41:
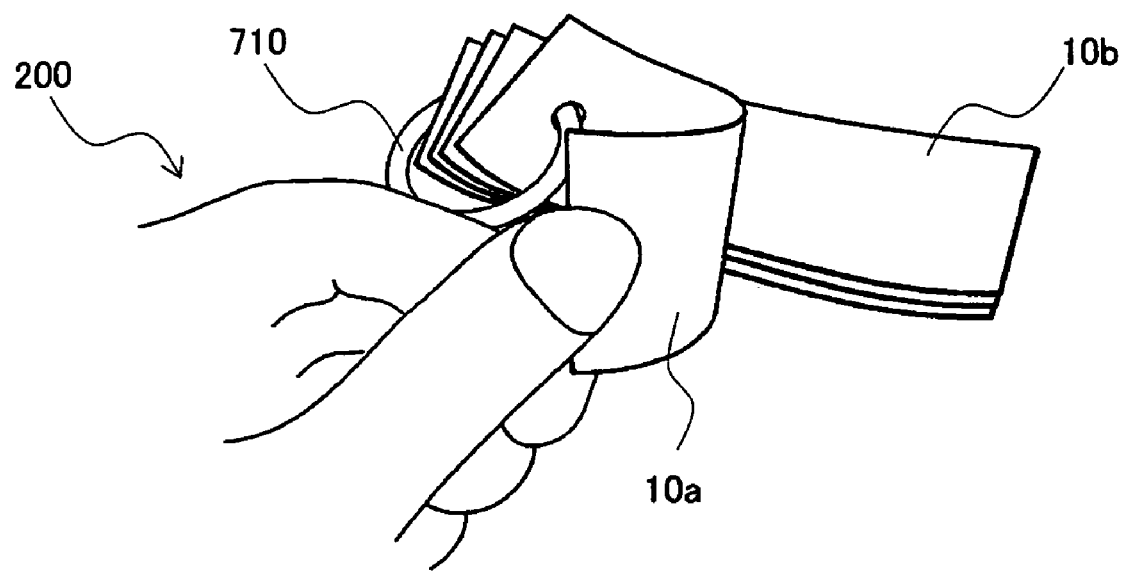
FIG. 41 shows that the page turning over is performed by bringing the paper to the bottom.

First, the position change detection unit 700 will be explained. Usually, in case the word book of paper is operated, after turning over the paper which exists in the present top and making it go around along with a ring 710 as shown in FIG. 41, page turning over is performed by bringing the paper to the bottom. In case a page is returned, the paper is brought to the top through the reverse operation, i.e., the bottom paper is moved along with a ring 710. In case the overlapping portion of the paper is referred to, overlapping paper is shifted off and the target paper portion is exposed. The position change detection unit 700 can perform operation of the same concept as the above for the above-mentioned input-and-output parts 10a and 10b in this example.

For example, a sensor is attached to the ring 710 along which the input-and-output parts 10a, 10b, . . . pass. And the passing action and the relative positional relationship of the input-and-output parts 10a, 10b, . . . are monitored by the position change detection unit 700. As the sensor, a combination of LED and a photodiode may be used. This sensor irradiates near-infrared light by the LED, and acquires the reflected light by the photo-diode. Since reflected light does not come on when there is nothing on the sensor, nothing is acquired in a photo-diode.

On the other hand, the moment the input-and-output part 10 passed through the sensor top, since the reflected light is acquired. Moreover, the passage direction, speed, etc. can be known by measuring the time lag of detection between sensors, using two or more sensors. Alternatively, discernment tags, such as IR tag, can be attached to the input-and-output parts 10a, 10b, . . . as the position change detection unit 700.

The invention is not limited to these examples. For example, although the ring 710 was used in the above-mentioned example as a means to bundle the input-and-output parts 10a, 10b, . . . , the form to bundle is not limited in the shape of a ring.

Next, the control unit 12 will be explained. Control unit 12 has the following functions (FIG. 39):

(1) Control the contents of a display of the each of the above-mentioned input-and-output parts 10a, 10b, . . . based on the geometric change information acquired as an output from the input-and-output parts 10a, 10b, . . . input information.

(2) Control the contents of a display of each of the input-and-output parts 10a, 10b, . . . based on the detection result in the position change detection unit 700.

(3) Control reading and writing of the data stored in the above-mentioned memory unit 500.

(4) Control the contents of communication, a communication system, timing, etc. in the above-mentioned communication unit 600, (5) In addition, it is for controlling predetermined operation of apparatus.

In addition to the function which was explained with reference to the fifth and sixth example, the contents of a display of the each of the input-and-output parts 10a, 10b, . . . , based on the detection result in the above-mentioned position change detection unit 700. Specifically according to the result of page turning over detected by the position change detection unit 700, the display of the input-and-output part which is in the upper part most now is updated, for example.

According to the display input system in this example explained above, a user 200 has the same feeling as the case where the word book of the paper is operated, and can operate the display input system in this example. That is, even for persons who do not know the concept (WIMP metaphor) of the conventional computer, it becomes possible to operate a display input system intuitively with the feeling to touch a word book of paper Modification of the Seventh Example In the 7th example mentioned above, as shown in FIG. 39, the geometric change detection unit 300 and the data input part 50 are provided in the inside of the each of the input-and-output parts 10a, 10b, . . . , respectively. In contrast to this, the control unit 12 and the memory unit 500 can be shared like the communication unit 600. That is, detection of a geometric change of two or more input-and-output parts 10a, 10b, . . . , and acquisition of input are acquirable with one geometric change detection unit 300 and the data input part 50.

EIGHTH EXAMPLE

Figure 42:
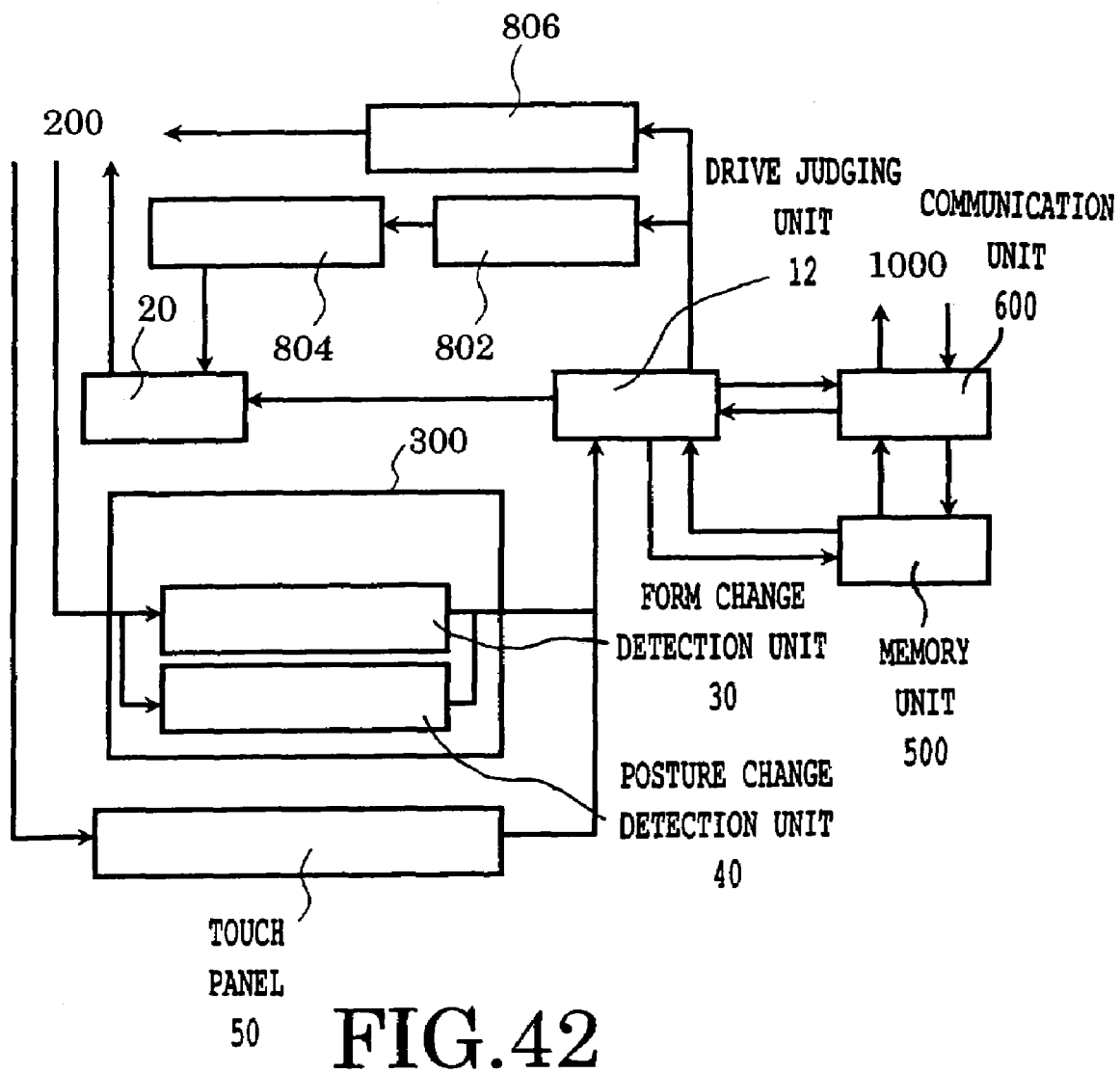
FIG. 42 is the whole display input system structure figure concerning the example.

Next, the 8th example of a the invention will be explained. FIG. 42 is the whole display input system structure figure concerning this example. The display input system of this example has the structure to which the position Management Unit 802, the position presentation part 804, and the feedback part 806 were added in the fifth example. The position Management Unit 802 manages the position of the information which is presented to the display unit 20. The position presentation part 804 has the role which presents the position that is managed at the position Management Unit 802.

The feedback part 806 has the role which feeds back by sound or vibration, when the above-mentioned position presentation part 804 top is touched by hand etc. Henceforth, the position Management Unit 802 and the position presentation part 804 and The feedback part 806 which are added in this example will be explained.

First, the position Management Unit 802 will be explained. The position Management Unit 802 manages the position of the information currently displayed on the display unit 20 now among all the information that should be displayed on the display unit 20. For example, suppose that the 4th page of the novel which Consists of 9 pages is displayed on the display unit 20. In this case, it manages like that number of page is 9, that the present position is the 4th page, that it is four ninths of the whole, etc.

Figure 43A:
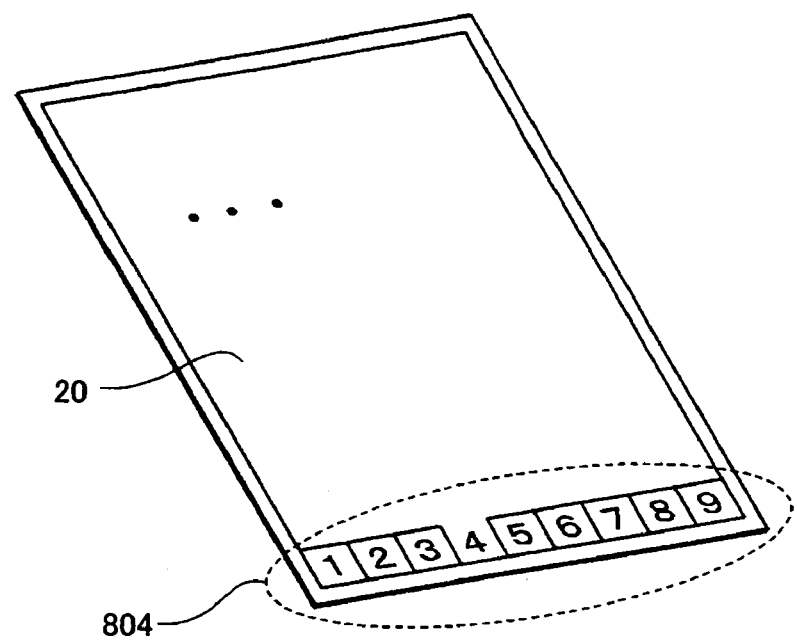
FIG. 43A shows that the lower part of the display unit 20 is used for position presentation part 804.
Figure 43B:
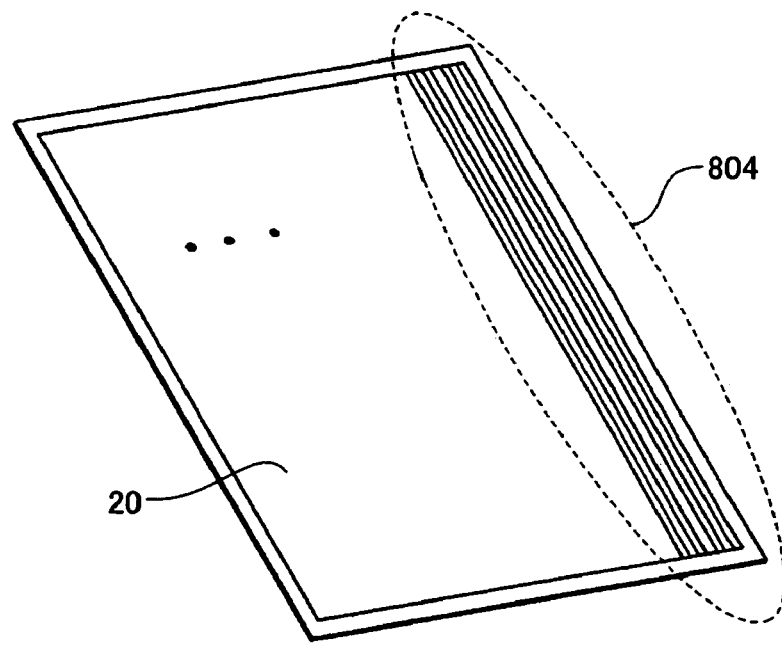
FIG. 43B shows that the image of accumulation of paper is displayed on the left-hand side of the display unit 20.

Next, the position presentation part 804 will be explained. In the position presentation part 804, the position managed at the above-mentioned position Management Unit 802 is shown on the above-mentioned display unit 20. As the lower part of the above-mentioned display unit 20 was used and it was shown in FIG. 43A, the position presentation part 804 expresses a page in the shape of a tab, and presents it in the form which can imagine intuitively existence of all the number of pages, the present page position, and other pages etc. to a user 200. Or as shown in FIG. 43B the image of accumulation of paper (also refer to FIG. 44) may be displayed on the left-hand side of the display unit 20. Anyway, in the position presentation part 804, the position of information currently displayed on the above-mentioned display unit 20, such as existence of all the number of pages, the present page position, and other pages, is visually shown to a user 200 by the way a user 200 tends to imagine actual books etc.

Next, the feedback part 806 will be explained. The feedback part 806 feeds back by sound or vibration, when the above-mentioned position presentation part 804 top is touched by hand etc. Thus, a user 200 can understand intuitively the contents presented by the above-mentioned position presentation part 804 by the tactile sense, hearing, etc. Hereafter, although feedback by vibration will be explained as an example, feedback is not limited to this specific example.

Figure 44:
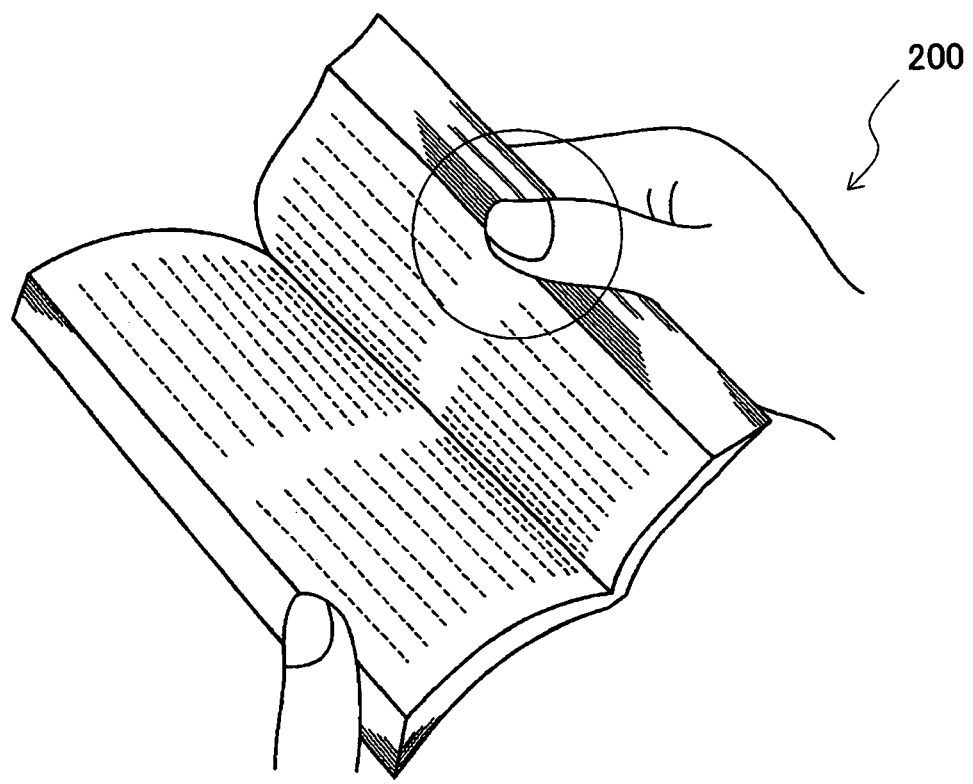
FIG. 44 shows that the page of actual books is turned over.

In case the page of actual books is turned over, as shown in FIG. 44, page turning over is usually performed with a clatter by letting the finger of a hand slide in a part for the end of paper in many cases. Then, on the finger of a hand, the reader can know intuitively how many pages were turned over now by tactile feedback being carried out for every sheet by friction at the time of a page passing by turning-over operation. The feedback part 806 is for introducing this feeling into the paper type electric device of this example.

Figure 45:
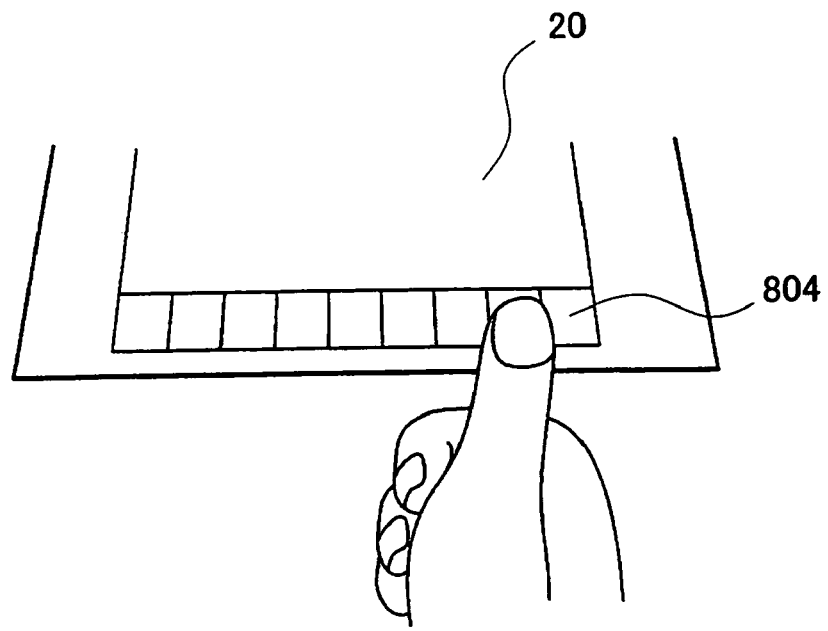
FIG. 45 shows that the finger slides on the position presentation part 804.
Figure 46A:
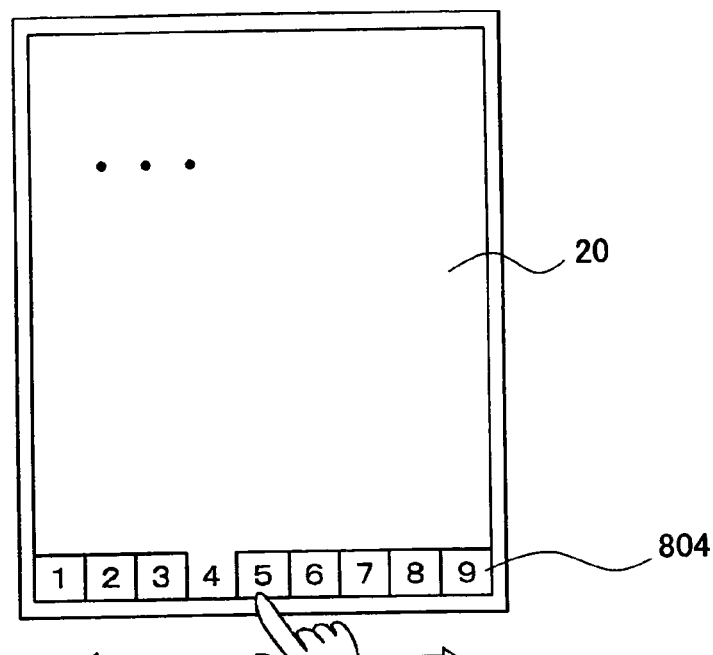
FIG. 46A shows that the finger slides on the position presentation part 804.
Figure 46B:
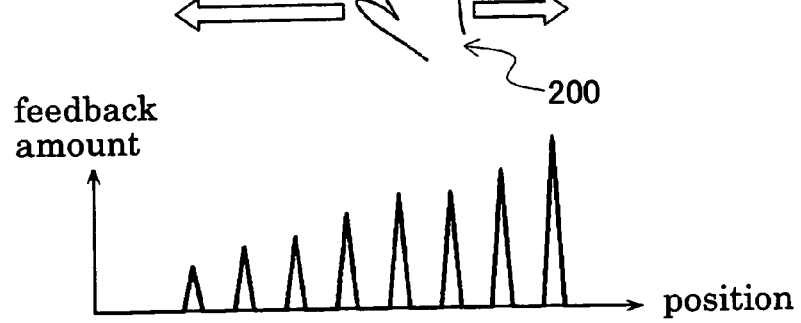
FIG. 46B shows that the quantity of vibration is changed according to the position of a page where a user 200 touches.

Vibration is generated, when it lets the finger of a hand slide on the above-mentioned position presentation part 804 and passes through the page boundary top which the above-mentioned position presentation part 804 shows, as specifically shown in FIG. 45. It is effective, if the quantity of vibration is changed according to the position of a page where a user 200 touches as expressed in FIGS. 46A and 46B. For example, when the finger of a hand is in a boundary of page 1 and 2, the page position corresponding to a position with the finger of a hand can be intuitively known now by giving a gradually big vibration as this page position increases in number a small vibration. Moreover, the distance from the present page to the page corresponding to a position of the finger can be intuitively known by enlarging vibration as the finger goes away from the present page.

And when the finger is lifted, the page corresponding to the position is displayed in the display unit 20. Thus, it becomes possible to perform page turning over simply intuitively.

According to the display input system in this example explained above, a user 200 can change the position of the information having the feeling same with turning over a real book with his finger. When the display input system in these examples, such as an electronic book leader, is applied, the finger of the user can be used and, specifically, the page turning over can be performed. In this case, feedback of vibration etc. can also be obtained with the feeling same with being obtained from actual books. Thereby, even if it is those who do not know the concept (WIMP metaphor) of the conventional computer, it becomes possible to operate a display input system intuitively with the feeling which touches the books of paper.

NINTH EXAMPLE

Next, the 9th example of the invention will be explained.

Figure 47:
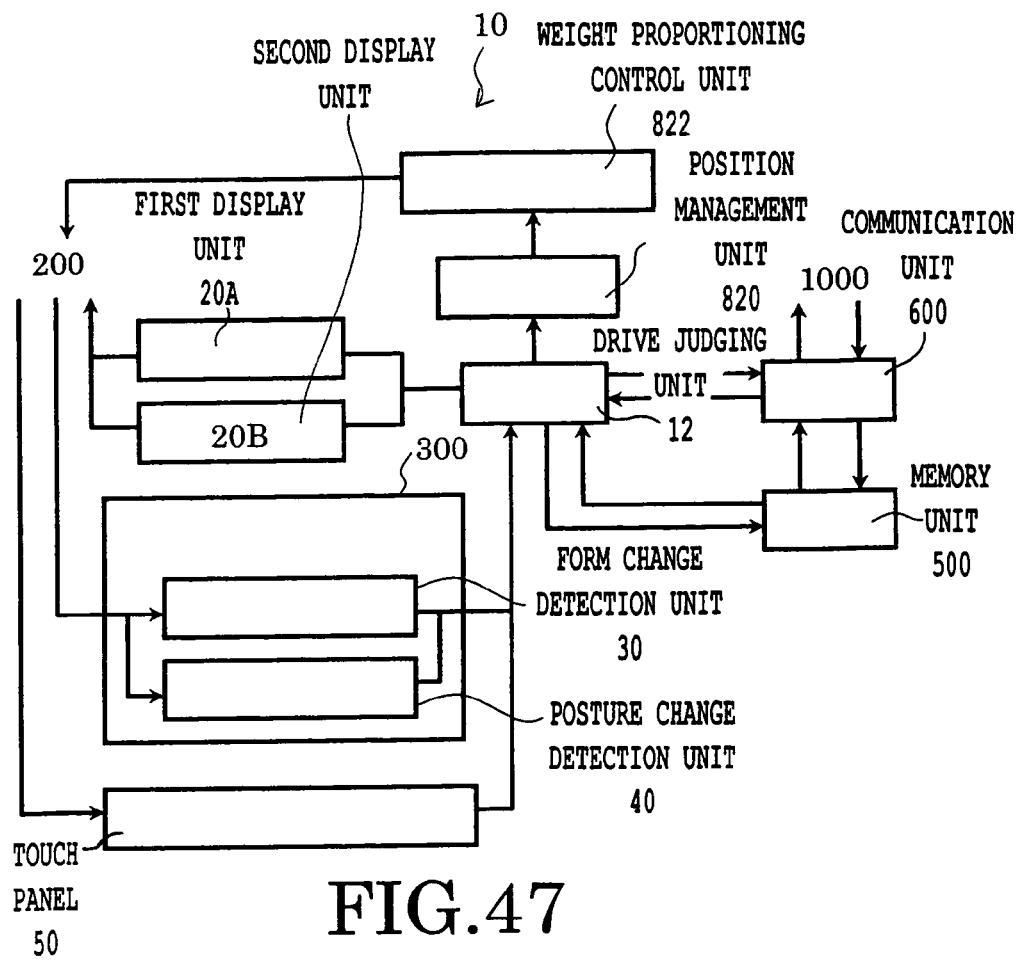
FIG. 47 shows the whole display input system structure of the example.

FIG. 47 shows the whole display input system structure of the example. The display input system of this example has a first display unit 20A and a second display unit 20B instead of the display unit 20 explained about the fifth example, which have the same function. The control unit 12 in this example can control individually the contents of a display of the first display unit 20A, and the contents of a display of the second display unit 20B based on the input acquired in the data input part 50, respectively.

Furthermore, the position Management Unit 820 which manages the position of the information which is presented to the first display unit 20A and the second display unit 20B is added. Further, the weight proportioning control unit 822 which controls weight distribution of the first display unit 20A and the second display unit 20B based on the position managed at the above-mentioned position Management Unit 820 is added.

As for the geometric change detection unit 300, the data input part 50, the control unit 12, the memory unit 500, and the communication unit 600, the function thereof may be substantially the same as the fifth example.

First, the first display unit 20A and the second display unit 20B will be explained.

Figure 48:
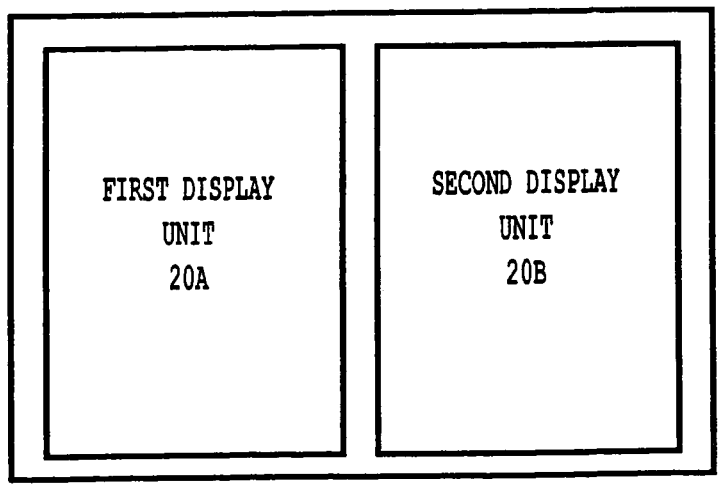
FIG. 48 is a plane view which illustrates the arrangement relation of the display unit.

FIG. 48 is a plane view which illustrates the arrangement relation of these display unit. Although 1st display unit 20A and 2nd display unit 20B are the same as that of what was explained about the sixth example, the physical relationship arranged differs. That is, typically, the first display unit 20A and the second display unit 20B are arranged like two pages of the spread of books in the position of a relation on either side.

Next, the position Management Unit 820 will be explained. The position Management Unit 820 manages the position of the information currently displayed on the first display unit 20A and the second display unit 208 like what was mentioned above about the eighth example.

Next, the weight proportioning control unit 822 will be explained. The weight proportioning control unit 822 controls weight distribution of the first display unit 20A, and the second display unit 20B based on the position managed at the above-mentioned position Management Unit 820. For example, a spherical weight which can move over both the first display unit 20A and the second display unit 20B is provided, and by controlling the position of the weight, the weight distribution in the first display unit 20A and the second display unit 20B can be changed. The above-explained method is just a one example, the invention is not limited to this.

By change of the weight distribution explained above, it becomes possible to control the weight distribution, for example, so as to make the first display unit 20A side heavier by a predetermined ratio than the second display unit 20B side etc.

Figure 49A:
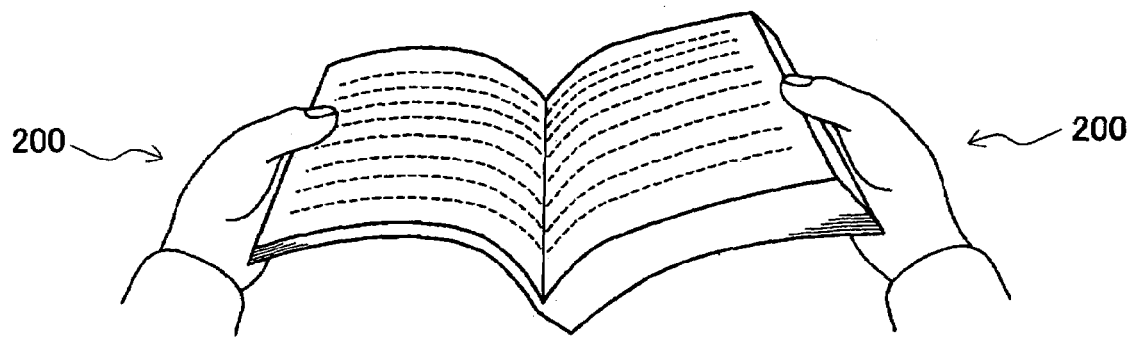
FIG. 49A shows the early stage of having begun to read the book.
Figure 49B:
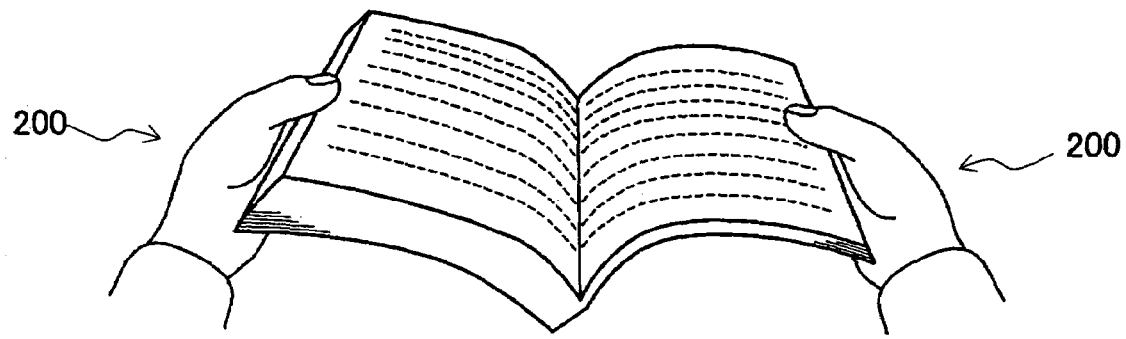
FIG. 49B shows that the left page side is becoming heavier.

As shown in FIG. 49, the situation where actual books are read is considered. As shown in FIG. 49A, in the early stage of having begun to read the book, since there is less number of pages in a left page side, the left page side lighter, and the right page side is heavier. On the contrary, if the document of books is being read, the left page side is becoming heavier, and the right page side is becoming lighter, as shown in FIG. 49B. Thus, when reading books, the reader intuitively feels that the weight distribution is changing. When reading a novel, the reader intuitively feels the change of the weight distribution in addition to visual information that the number of pages to go becomes fewer. Moreover, in case predetermined information is accessed in a dictionary etc., weight distribution of the right and left is felt intuitive, and it is thought that the user feels unconsciously "the left page must have been heavier surely."

Thus, weight change of books is also considered to be one of the important information for accessing information intuitively by the user 200. The display input system in this example gives the user 200 the feeling of this weight change intuitively. According to the display input system in this example explained above, a user 200 can know intuitively the position of the information which the user 200 has currently accessed by a change of the weight distribution between the first and the second display units.

Modification of ninth Example

In the ninth example, the system is constituted from the first display unit 205 and the second display unit 206 which have been arranged like two pages of the spread of a book at right and left. It can be also changed so that the system may consist of only one display unit 20 which was explained with reference to the fifth example.

Figure 50:
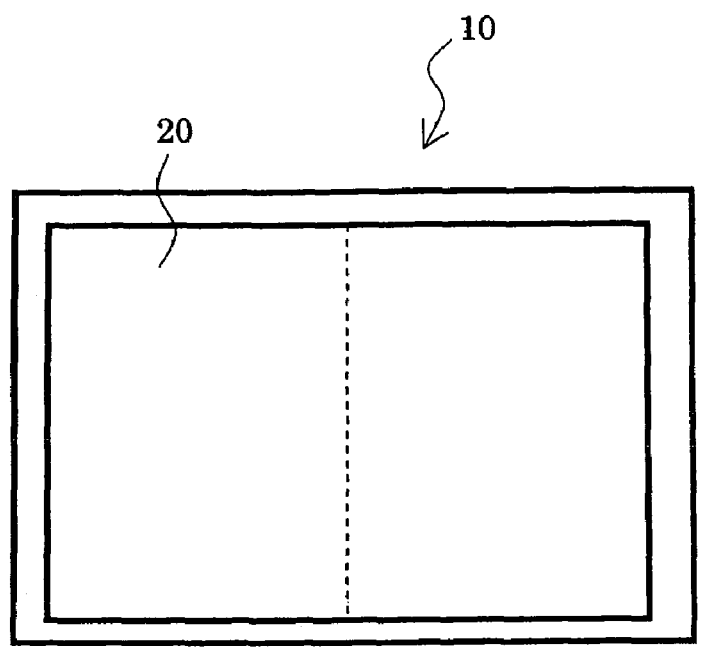
FIG. 50 is a plane view which illustrates the display unit 50 in the display input system of this modification.

FIG. 50 is a plane view which illustrates the display unit 50 in the display input system of this modification. In this case, what is necessary is to divide the display area of the above-mentioned display unit 20 into two regions, and just to display altogether the information for 2 pages in the display unit 20. And what is necessary is just to make it control by the above-mentioned weight proportioning control unit 822 to change the weight distribution in the above-mentioned display unit 20.

THE TENTH EXAMPLE

Next, the tenth example of the invention will be explained.

Figures 51A, 51B:
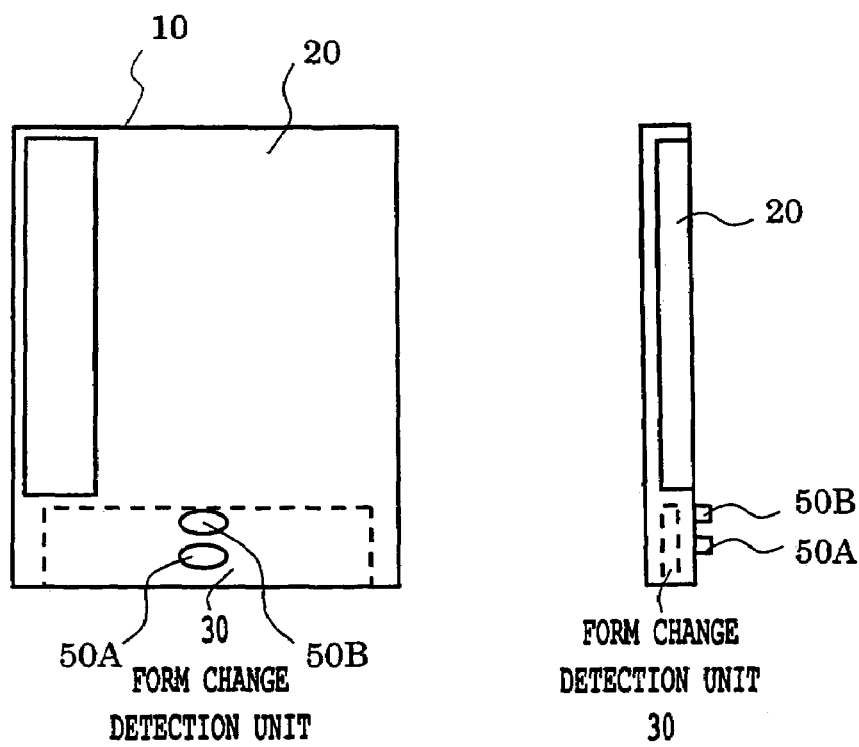
FIGS. 51A and 51B are conceptual diagrams showing the whole display input system structure concerning this example.

FIG. 51 is a conceptual diagram showing the whole display input system structure concerning this example.

Figure 54:
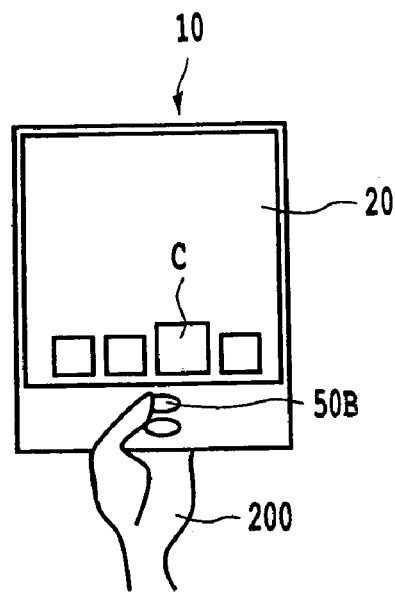

FIGS. 52 through 54 are schematic diagrams showing the operation. The display input device 10 of this example also has the display unit 20 and the form change detection unit 30. However, the form change detection unit 30 does not necessarily cover the whole area of the display unit 20, and is alternatively prepared below the display unit 20. This form change detection Unit 30 has the role which detects the bending added to the display input device 10, and changes a display. Furthermore, the device has the first and second data input parts 50A and 50B.

The first data input part 50A is used in order to control ON/OFF of a display change function. The second data input part 50B is used in order to choose a state after a display change. The display input system of this example has the size of A4, for example, at which a document can be checked at a glance.

A user 200 can operate a button with the thumb, supporting across the lower central part of the display input device 10. Although not expressed in FIGS. 51 and 52, this display input device 10 may also have the control unit 12, the memory unit 500, the communication unit 600, etc. if needed. The first and second data input parts 50A and 50B may be suitably provided in any other positions in order to improve the user-friendliness.

Figure 52A:
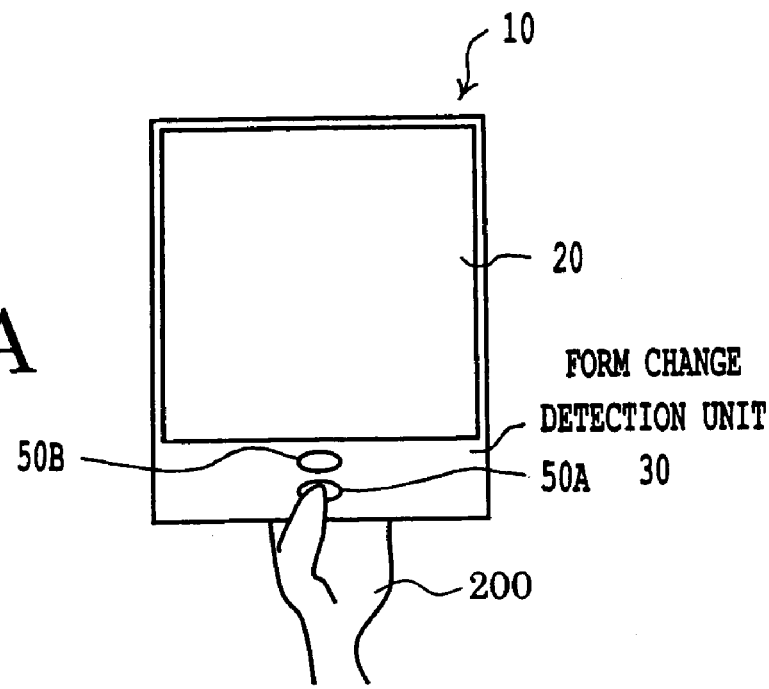
FIGS. 52A through 54 are schematic diagrams showing the operation.
Figure 52B:
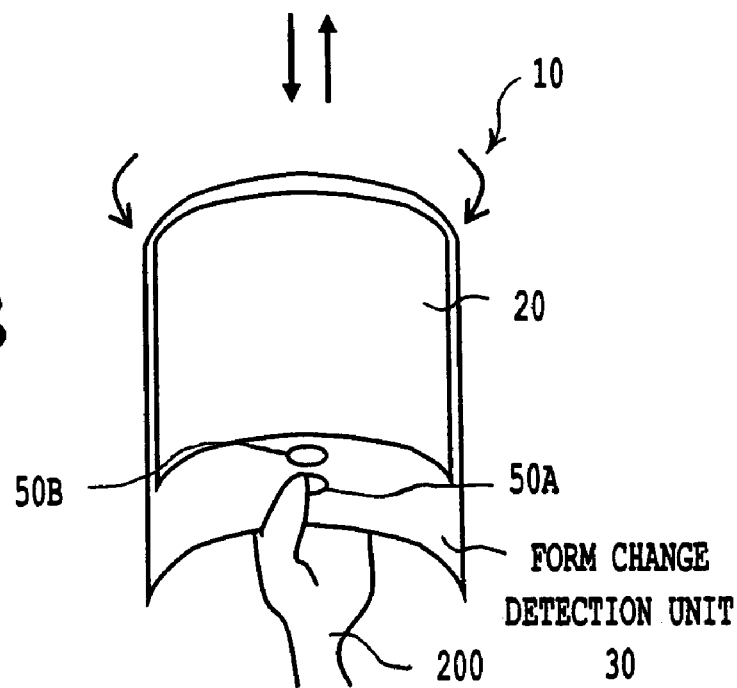
Figure 53A:
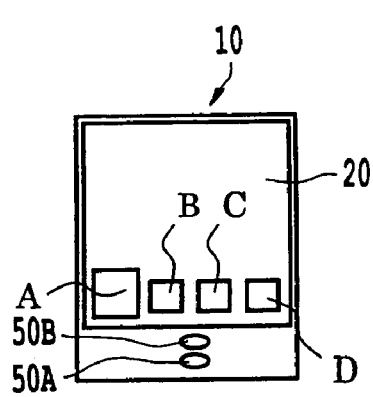
Figure 53B:
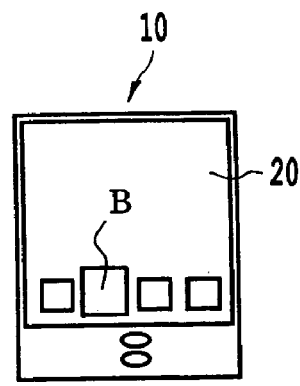
Figure 53C:
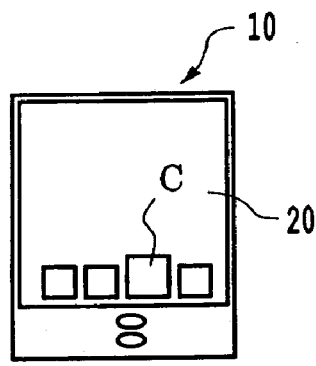
Figure 53D:
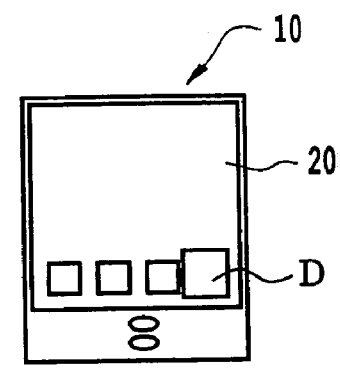

Pushing first data input part 50A, the user 200 makes it change into the order expressed in FIGS. 52A and 52B and 52A, and bends the display input device 10 temporarily. This bending is detected by the form change detection unit 30.

Then, the contents of the display unit 20 are changed to one of the contents which are expressed in FIGS. 53A through 53D. For example, FIG. 52A expresses the state where choice A becomes active, and FIG. 52B shows the state where choice B becomes active. As expressed in FIGS. 52A and 52B, an active choice can be switched by the operation of adding bending temporarily.

In FIGS. 53A through 53D, the case where four choices A through D are prepared is illustrated for the sake of simplicity. However, the invention is not limited to this. The number of choices, and arrangement and the display appearance at the time of active may be suitably changed.

By repeating the operation of adding bending temporarily as expressed in FIGS. 52A and 52B, a menu is scrolled and a desired choice is activated. Then, as expressed in FIG. 54, the choice activated can be chosen by pushing the second data input part 50B. It is possible to perform all the above operations by a single hand. The device can manage a hierarchical type menu by providing many stages.

According to this example, an operation mistake is avoidable, since the input by the bending is possible only while pushing the first data input part 50A.

Then, an active choice can be selected by pushing the second data input part 50B. That is, it can be operated with rough feeling at the time of menu scrolling, without caring about a button position. And the choice is selected more consciously. Here, after adding the bending as shown in FIG. 52B, in the state where it returned to the flat condition as shown in FIG. 52A, the whole equipment may bend lightly.

If the device is bent lightly around the longer axis of the display unit 20 and deformation is lightly added as illustrated in FIG. 52B, a bending deformation around a direction perpendicular to this may be prevented.

Thus, operation is stabilized when the First and second data input parts 50A and 50B are pushed.

ELEVENTH EXAMPLE

Next, the 11th example of the invention will be explained.

Figure 55A:
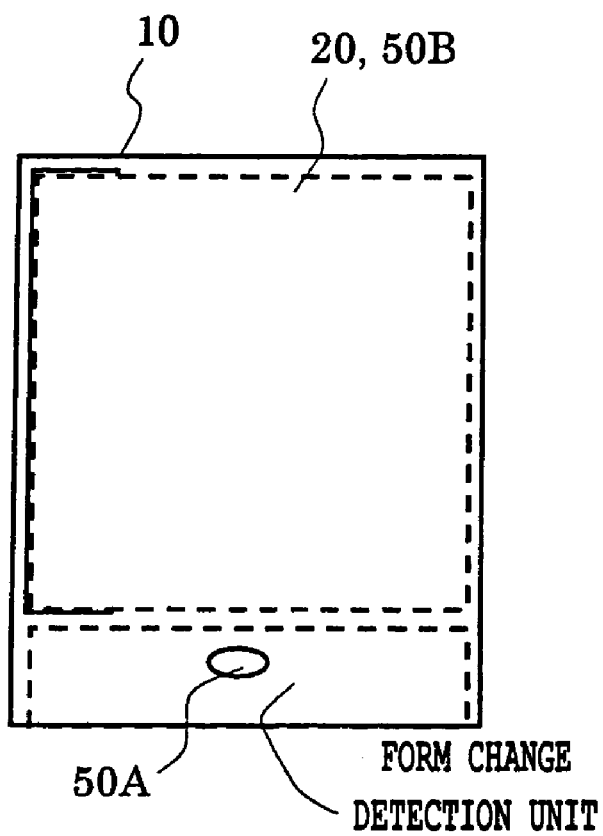
FIGS. 55A and 55B are schematic diagrams showing another display input system concerning the invention.
Figure 55B:
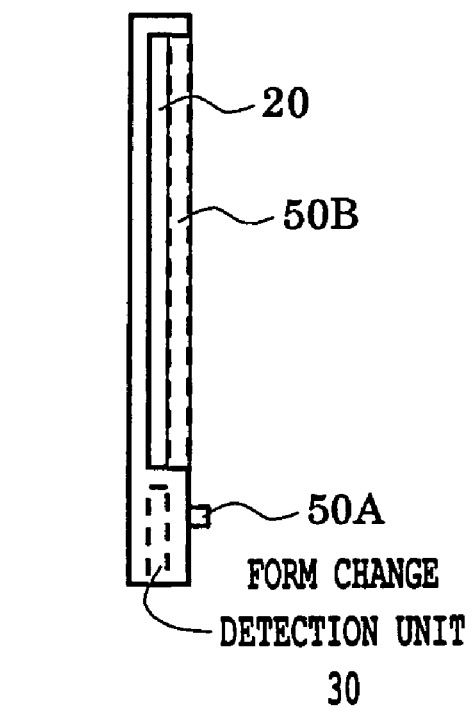

FIGS. 55A and B are schematic diagrams showing another display input system concerning the invention.

FIGS. 56A through 58 are conceptual diagrams showing the operating procedure. That is, the display input device 10 of this example has the similar structure as the tenth example. However, the touch panel is provided as second data input part 50B. Touch-panel 50B is laminated on the display unit 20, and it is used in order to determine the activated choice.

Figure 56A:
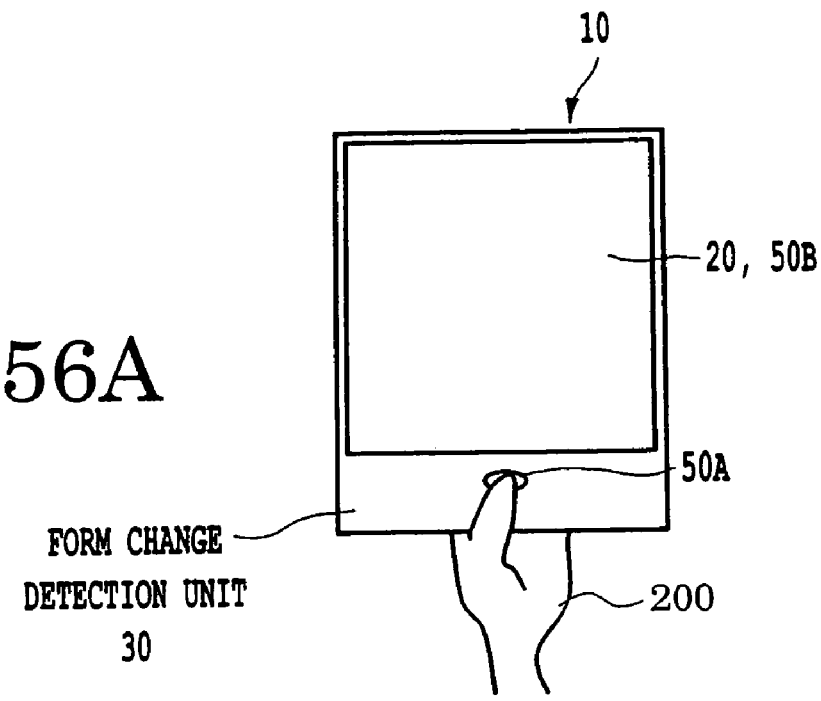
Figure 56B:
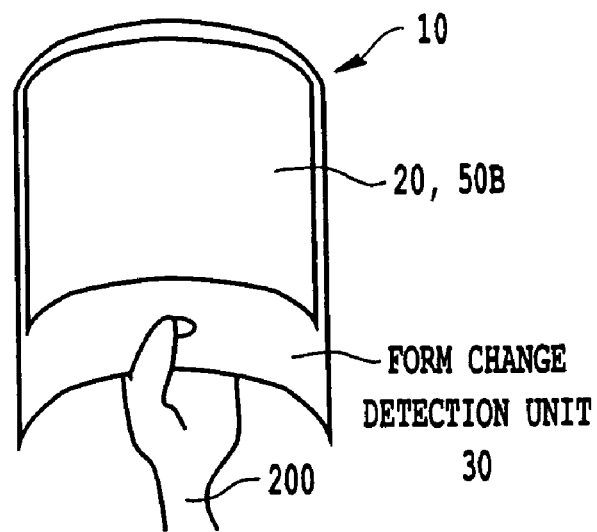

In this example, the user 200 holds the device by his one hand and adds a temporal bending, while pushing the first data input part 50A, as shown in FIGS. 56A and 56B. Whenever he adds the bending, either of choices A through D becomes active in order. For example, FIG. 57A expresses the state where choice A is activated, and FIG. 57B expresses the state where choice B is activated. Thus, choices A through D on a menu bar is scrolled in order by repeating the operation of bending the display input device 10 temporarily. And after activating the desired choice, the small item in the choice is chosen by the directions means 210, as expressed in FIG. 58. That is, he inputs into touch-panel 50B.

The directions means 210 is not limited to a pen type stylus, but the user may touch the display directly with a finger. An eyeshot detection system may be employed instead of the touch panel.

Since the greater part of a series of operations can be performed by a single hand, its operationality under the environment where both hands always do not open, such as the time of use in a vehicles, a bus or a train where a shake is intense, improves.

TWENTIETH EXAMPLE

Next, the twentieth example of the invention will be explained.

Figure 59A:
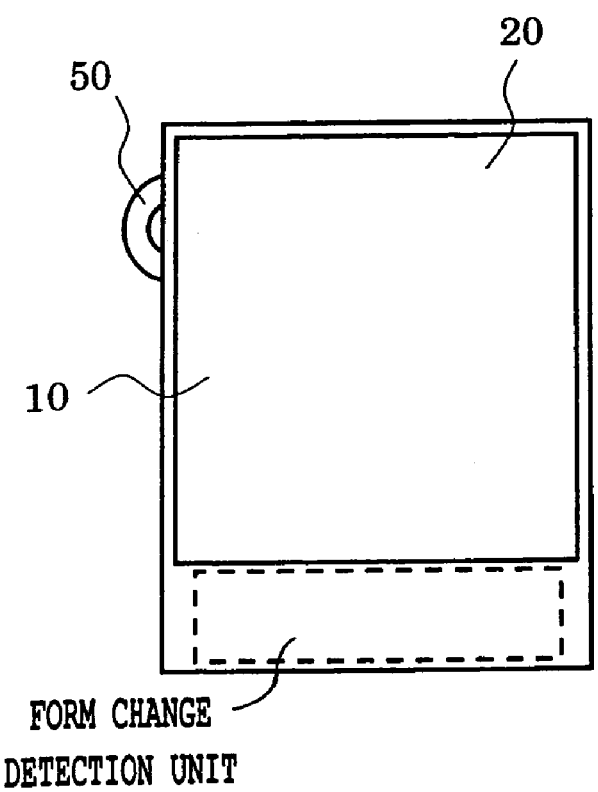
FIGS. 59A and 59B are schematic diagrams showing the display input system concerning the example.
Figure 59B:
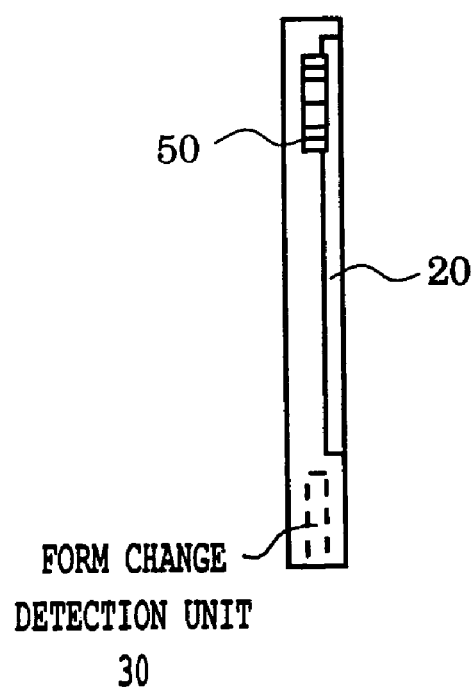

FIGS. 59A and 59B are schematic diagrams showing the display input system concerning this example.

Figure 60A:
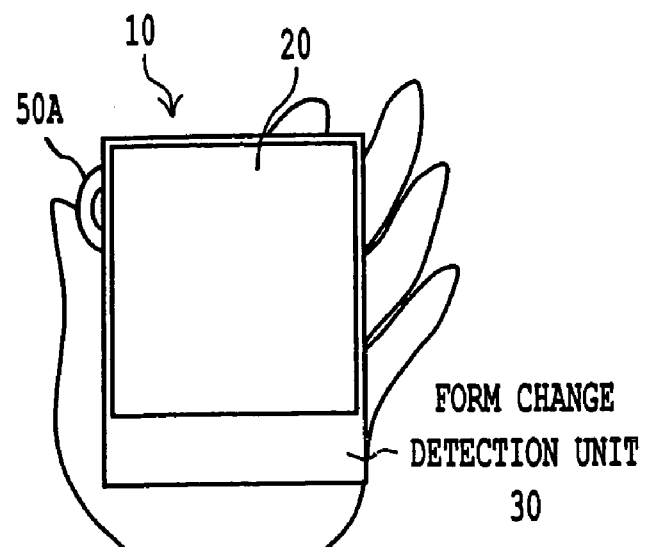
FIGS. 60A and 60B are conceptual diagrams showing the operating procedure.
Figure 60B:
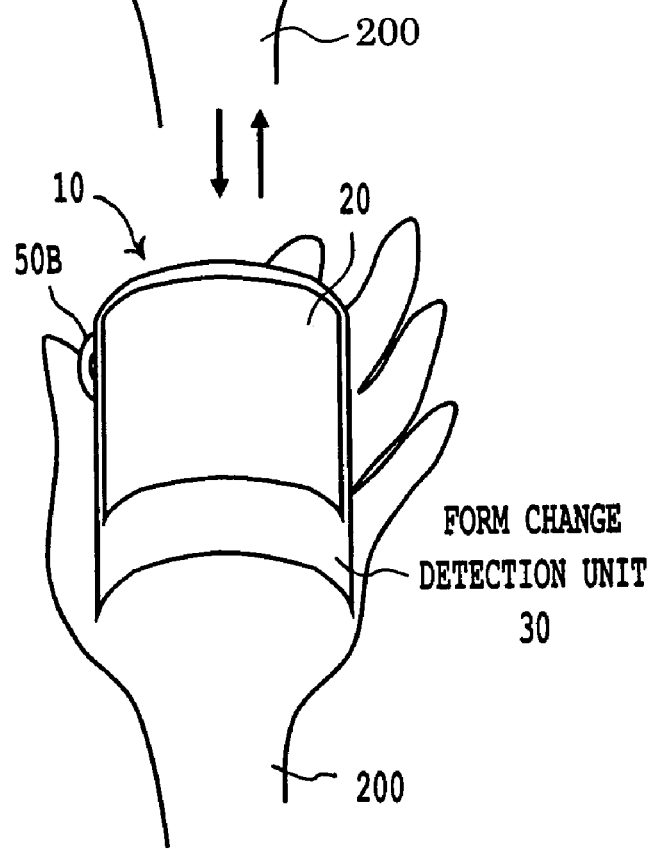

FIGS. 60A and 60B are conceptual diagrams showing the operating procedure. The display input device 10 of this example has a size settled in a palm, and the form change detection unit 30 and the data input part 50 of a jog wheel type are provided.

The data input part 50 serves both as the ON/OFF change of detection of a bending, and a selection button. That is, while pushing the data input part 50, an input function by bending is turned ON. Moreover, an active choice can also be selected by pushing the data input part 50.

On the other hand, scrolling of a selection item or a display screen can be performed by rotating the wheel of the data input part 50. In the drawings, the case where the jog wheel-like data input part 50 is operated with the thumb is illustrated, while holding and supporting in the left palm. However, the device may be made to be operated on a right palm of the user.

Pushing the data input pan 50 in the state holding by a single hand, the user 200 changes the menu display by bending the display input device 10 temporarily in the order of FIGS. 60A, 60B and 60A. Then, either of the choices is activated by rotating the wheel of the data input part 50. Then, the choice activated can be selected by pushing the data input part 50.

THIRTEENTH EXAMPLE

Next, the thirteenth example of the invention will be explained.

Figure 61A:
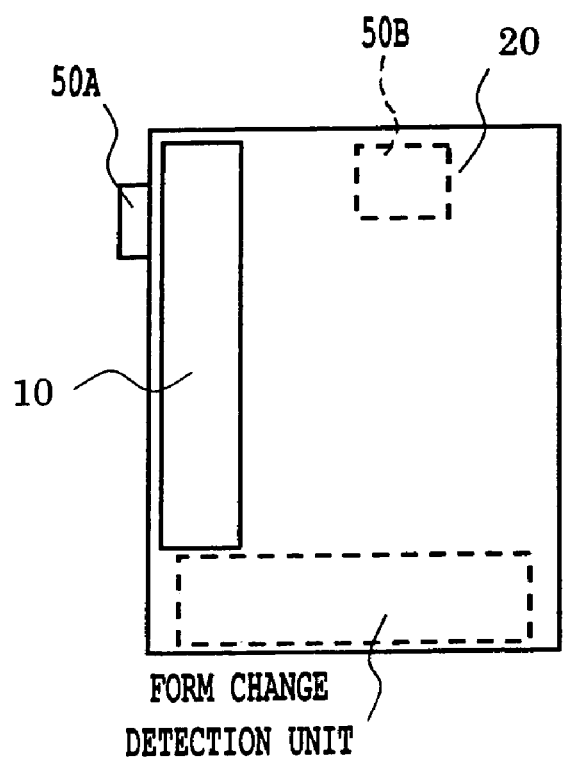
FIGS. 61A and 61B are schematic diagrams showing the display input system concerning the example.
Figure 61B:
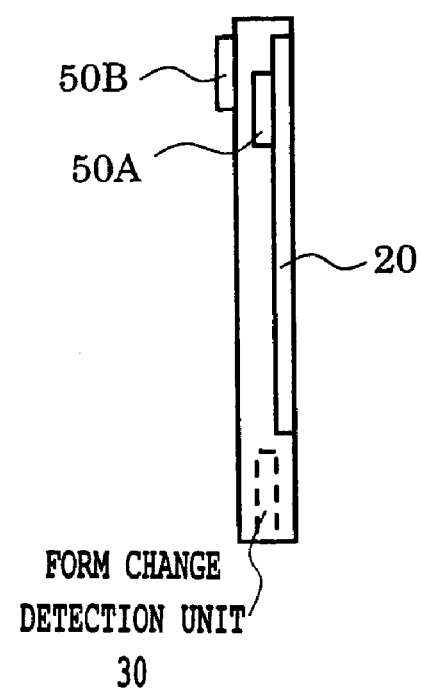

FIGS. 61A and 61B are schematic diagrams showing the display input system concerning this example.

Figure 62A:
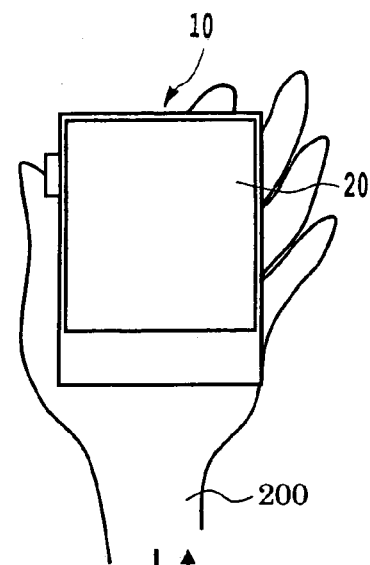
FIGS. 62A through 63 are conceptual diagrams showing the operating procedure.
Figure 62B:
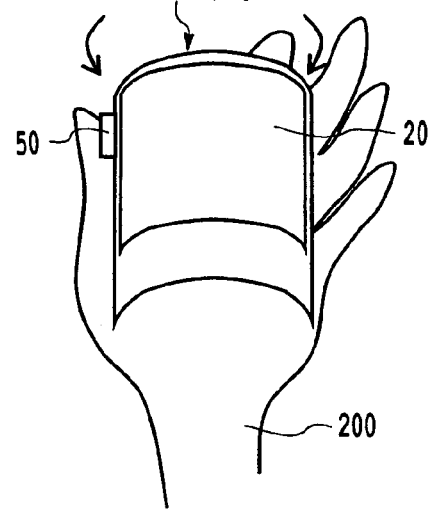
Figure 63:
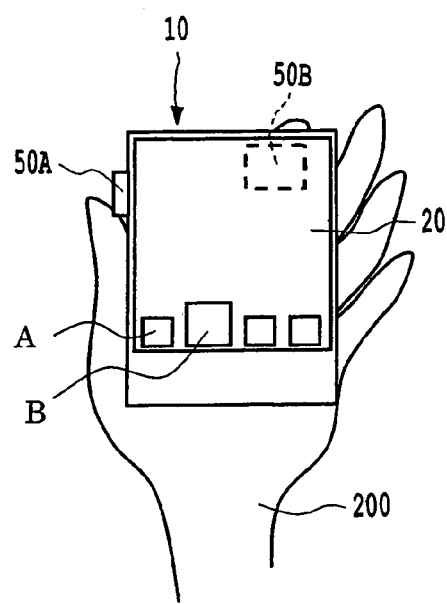

FIGS. 62A through 63 are conceptual diagrams showing the operating procedure. The display input device 10 of this example is an equipment of size settled in a palm, as well as the twentieth example And the first data input part 50A is prepared in the side of equipment, and the second data input part 50B is prepared in the back of equipment.

The first data input part 50A is the ON/OFF switch for the bending detection function. The second data input part 50B is a button type switch for selecting a final state. These switches can be pushed and operated with a respectively different finger. The second data input part 50B may not be a mere pressing button but a button which has directivity in the pressing direction, a jog dial, a jog wheel, a tracking pad, etc.

A user 200 holds the device in one hand, and while pushing the first data input part 50A, changes the contents of the display unit 20 by adding temporary bending to the display input device 10, as shown in FIGS. 62A and 62B. For example, choices A through D which are shown in FIG. 63 are activated in order whenever bending is added to the device.

FIG. 63 illustrates the state where choice B is activated. In this state, an active choice can be selected by pushing the second data input part 50B.

FOURTEENTH EXAMPLE

Next, the fourteenth example of the invention will be explained.

FIGS. 64A and 64*b* are schematic diagrams showing the display input system concerning this example. The display input device 10 of this example has the posture change detection unit 40 On both sides of the upper end.

This display input device 10 can be used as an electronic viewer which can peruse the books contents for example, covering many pages at high speed. Under the display unit 20, first data input part 50A and second data input part 50B are provided. The form change detection unit 30 is provided in the inside.

Pushing the first data input part 50A, the user 200 is adding temporary bending to the display input device 10, as illustrated in FIG. 64B, then he can perform page turning-over operation. Moreover, in this way, while pushing the first data input part 50A and adding the bending, the user inclines the whole device as shown in FIG. 65A. Then, the posture change detection unit 40 detects this inclination, and pages are turned over from the right to the left in the display unit 20.

Alternatively, if the whole device is conversely inclined as shown in FIG. 65B, pages will be turned over from the left to the right. The posture change detection unit 40 may detect the absolute value of all inclination, or may detect the speed or acceleration of an inclination. Moreover, one posture change detection unit 40 may be provided. However, when an acceleration sensor etc. is used as a posture change detection unit 40, it becomes possible to detect the inclination of a horizontal direction by high sensitivity, by preparing then in right and left of equipment 10, respectively.

Gradual operation from under a threshold value (page turning-over stop) to the high-speed page turning-over mode of exceeding maximum value is possible according to the level of the detection signal acquired from the posture change detection unit 40. Moreover, if the button of 1st data input part 50A is detached, the page turning over operation can be compulsorily stopped, so that it can change from high-speed page turning-over mode to a halt condition instantly.

Moreover, operation selection of contents exchange etc. can be performed by using the second data input part 50B.

FIFTEENTH EXAMPLE

Next, the fifteenth example of the invention will be explained.

FIG. 66 is a schematic diagram showing the display input system concerning this example. In the display input device 10 of this example, the position of the posture change detection unit 40 in the fourteenth example is changed. In this example, as expressed in FIG. 67, page turning over (operation similar to crying out in a block-calendar) of the up-and-down direction can be performed by making equipment 10 incline forward and backward. The other operation methods can be made to be the same as that of the fourteenth example etc.

Moreover, the posture change detection unit 40 may detect the absolute value of an inclination, or may detect the speed or acceleration of an inclination also in this example. One posture change detection unit 40 may provided. However, when an acceleration sensor etc. is used as a posture change detection unit 40, it becomes possible to detect the inclination of a vertical direction by high sensitivity, by preparing then in upper and lower sides of equipment 10, respectively.

In the above, some embodiments of the invention were explained, referring to examples. However, the invention is not limited to these examples.

For example, as for the form, structure, material, size, conducting type, etc. of the each element thereof may be changed by a killed person, and these modifications would be included in the invention.

For example, the semiconductor layer used in the invention can also be formed by amorphous silicon, i.e., the silicon of non-crystalline nature.

It is also possible to realize various processing used by the embodiment of the invention by the program which can be executed by computer, and to memorize and provide with this program the storage medium which can be read by computer.

As a memory unit in the invention, a magnetic disk, a floppy disk, a hard disk, optical discs (CD-ROM, CD-R, DVD, etc.), magneto-optical discs (MO etc.), semiconductor memory, etc. can memorize a program, and as long as it is the memory unit which a computer or an inclusion system can read, it would be included in the invention.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A display input device comprising:
   a display unit having a flexibility; and
   a first form change detection unit having a flexibility, at least a part of the display unit being laminated with the first form change detection unit, the first form change detection unit being configured to detect a type of deformation of the laminated part including bending, rounding, turning over and torsion as a change in an electrical property, wherein the change in the electrical property depends on an amount and type of deformation.

2. A display input device according to claim 1, wherein the first form change detection unit extends around a screen of the display unit.

3. A display input device according to claim 1, wherein
   the first form change detection unit has a pair of conductive layers and a perception layer interposed between the conductive layers, the perception layer being constituted by a layer having an electric property that changes by at least one of stress and displacement, and
   a resistance between the pair of conductive layers changes when the deformation is added.

4. A display input device according to claim 1, wherein the first form change detection unit has a plurality of divided parts, and each of the divided parts is able to detect the deformation independently.

5. A display input device according to claim 1, further comprising a second form change detection unit laminated with the first form change detection unit,
   the second form change detection unit having a flexibility, and being able to detect a deformation ascribed to the flexibility as a change in an electrical property, and
   the changes in an electrical property of the first and second form change detection units being different when the deformation is added.

6. A display input device according to claim 1, wherein
   the display unit has a pair of substrates which have a flexibility,
   the first form change detection unit has a pair of substrates which have a flexibility, and
   the display unit and the first form change detection unit are agglutinated.

7. A display input device according to claim 1, wherein
   the display unit has a pair of substrates which have a flexibility, and
   the first form change detection unit is provided between the pair of substrates.

8. A display input system comprising:
   a display input device including:
      a display unit having a flexibility; and
      a first form change detection unit having a flexibility, at least a part of the display unit being laminated with the first form change detection unit, the first form change detection unit being configured to detect a type of deformation of the laminated part including bending, rounding, turning over, and torsion as a change in an electrical property, the change in electrical property depending on an amount and type of the deformation;
   a display driving unit that supplies a display signal to the display unit; and
   a signal judging unit that judges an input data based on the change in the electrical property in the first form change detection unit, and
   an input of a first data being performed by adding the deformation to the display input device.

9. A display input system according to claim 8, wherein the signal judging unit judges the input data based on a speed or an acceleration of the deformation.

10. A display input system according to claim 8, further comprising a data input unit that receives a second data,
    wherein the input of the first data is disabled based on the second data inputted to the data input unit.

11. A display input system according to claim 8, further comprising a posture change detection unit that detects a change in posture of the display input device,
    wherein the signal judging unit judges the input data considering the change in posture detected by the posture change detection unit.

12. A display input system according to claim 8, wherein the first form change detection unit is extending around a screen of the display unit.

13. A display input system comprising:
    a display input device including:
       a display unit having a flexibility; and
       a first form change detection unit having a flexibility, at least a part of the display unit being laminated with the first form change detection unit, the first form change detection unit being configured to detect a type of deformation of the laminated part including bending, rounding, turning over, and torsion as a change in an electrical property;
    a display driving unit that supplies a display signal to the display unit; and
    a signal judging unit that judges an input data based on the change in an electrical property in the first form change detection unit,
    wherein
    the change in the electrical property corresponds to an amount and type of the deformation,
    the electrical property changes continuously in accordance with the amount of the deformation, and
    the signal judging unit converts the change in the electrical property into a numerical data.

14. A display input system according to claim 13, wherein the signal judging unit judges the input data based on a speed of acceleration of the deformation.

15. A display input system according to claim 13, further comprising a data input unit that receives a second data,
    wherein the input through the first form change detection unit is disabled based on the second data inputted to the data input unit.

16. A display input system according to claim 13, further comprising a posture change detection unit that detects a change in posture of the display input device,
    wherein the signal judging unit judges the input data considering the change in posture detected by the posture change detection unit.

17. A display input system comprising:
    a display input device including:
       a display unit having a flexibility;
       a first form change detection unit having a flexibility, at least a part of the display unit being laminated with the first form change detection unit, the first form change detection unit being configured to detect a type of deformation of the laminated part including bending, rounding, turning over, and torsion as a change in an electrical property; and
       a second form change detection unit laminated with the first form change detection unit, the second form change detection unit having a flexibility, and being configured to detect a type of deformation including bending, rounding, turning over, and torsion as a change in an electrical property, a display driving unit that supplies a display signal to the display unit; and a signal judging unit that judges an input data based on the change in a electrical property in the first form change detection unit, wherein the change in electrical property of the first form change detection unit depends on an amount and type of the deformation, the change in the electrical property of the second form change detection unit depends on an amount and type of deformation, and the changes in the electrical property of the first and second form change detecting units being different when the deformation is added to the display device, and an input of a first data that depends on a direction of the deformation is enabled.

18. A display input system according to claim 17, wherein the signal judging unit judges the input data based on a speed of acceleration of the deformation.

19. A display input system according to claim 17, further comprising a data input unit that receives a second data, wherein the input of the first data is disabled based on the second data inputted to the data input unit.

20. A display input system according to claim 17, further comprising a posture change detection unit that detects a change in posture of the display input device, wherein the signal judging unit judges the input data considering the change in posture detected by the posture change detection unit.

* * * * *